(12) United States Patent
Ooi et al.

(10) Patent No.: US 11,378,877 B2
(45) Date of Patent: Jul. 5, 2022

(54) HOMOGENIZER, ILLUMINATING OPTICAL SYSTEM, AND ILLUMINATOR

(71) Applicant: AGC INC., Tokyo (JP)

(72) Inventors: Yoshiharu Ooi; Koichi Tashima, Fukushima (JP); Kensuke Ono, Tokyo (JP); Atsushi Koyanagi, Tokyo (JP)

(73) Assignee: AGC INC., Tokyo (JP)

(*) Notice: Subject to any disclaimer, the term of this patent is extended or adjusted under 35 U.S.C. 154(b) by 30 days.

(21) Appl. No.: 17/021,482

(22) Filed: Sep. 15, 2020

(65) Prior Publication Data
US 2021/0003911 A1    Jan. 7, 2021

Related U.S. Application Data

(63) Continuation of application No. PCT/JP2019/011931, filed on Mar. 20, 2019.

(30) Foreign Application Priority Data

Mar. 20, 2018   (JP) .............................. JP2018-052652

(51) Int. Cl.
G03B 21/00     (2006.01)
G03B 21/20     (2006.01)
(Continued)

(52) U.S. Cl.
CPC ......... *G03B 21/208* (2013.01); *G02B 3/0062* (2013.01); *G02B 5/1814* (2013.01);
(Continued)

(58) Field of Classification Search
CPC .............. G02B 5/1814; G03B 21/208; G03B 21/2033; G03B 3/0062; G03B 27/30
See application file for complete search history.

(56) References Cited

U.S. PATENT DOCUMENTS 6,177,222 B1    1/2001  McAneney et al.
6,326,085 B1   12/2001  McAneney et al.
(Continued)

FOREIGN PATENT DOCUMENTS

JP          1-153506 U    10/1989
JP          5-251309 A     9/1993
(Continued)

OTHER PUBLICATIONS

International Search Report dated Jun. 25, 2019 in PCT/JP2019/011931 filed Mar. 20, 2019, 2 pages.

*Primary Examiner* — Gerald J Sufleta, II
(74) *Attorney, Agent, or Firm* — Oblon, McClelland, Maier & Neustadt, L.L.P.

(57) ABSTRACT

A homogenizer includes a convex-lens array pair including a first convex-lens array disposed on a light entrance side and a second convex-lens array disposed on a light emission side. The first convex-lens array and the second convex-lens array are disposed so as to face each other such that each of the convex-lens arrays has a lens surface opposed to each other outward or inward. The first convex-lens array includes a plurality of first convex lenses in an array arrangement. The second convex-lens array includes a plurality of second convex lenses in an array arrangement. The first convex lens has an average internal transmission angle for incident light entering a lens-surface center region in the lens cross-section and being in parallel with the symmetry axis being equal to or more than 1.3 times an average internal transmission angle of a spherical convex lens.

20 Claims, 32 Drawing Sheets

(51) Int. Cl.
    *G02B 3/00*     (2006.01)
    *G02B 5/18*     (2006.01)
    *G02B 27/30*    (2006.01)
(52) U.S. Cl.
    CPC ......... *G02B 27/30* (2013.01); *G03B 21/2033* (2013.01); *G02B 2003/0093* (2013.01)

(56) References Cited

U.S. PATENT DOCUMENTS

| | | | | |
|---|---|---|---|---|
| 6,497,488 | B1 * | 12/2002 | Yamauchi | ............ H04N 9/3105 |
| | | | | 353/38 |
| 6,552,760 | B1 * | 4/2003 | Gotoh | .................. H04N 9/315 |
| | | | | 349/56 |
| 6,741,394 | B1 | 5/2004 | Tanitsu et al. | |
| 10,025,108 | B2 * | 7/2018 | Mitra | ................ G02B 27/0966 |
| 10,534,250 | B2 * | 1/2020 | Akiyama | .............. G03B 21/208 |
| 2002/0028339 | A1 | 3/2002 | McAneney et al. | |
| 2004/0125459 | A1 | 7/2004 | Tanitsu et al. | |
| 2010/0053565 | A1 | 3/2010 | Mizushima et al. | |
| 2012/0086916 | A1 * | 4/2012 | Miura | ................ G03B 21/2033 |
| | | | | 353/38 |
| 2013/0229654 | A1 * | 9/2013 | Tatsuta | .................. G01J 3/0297 |
| | | | | 356/328 |
| 2016/0116750 | A1 * | 4/2016 | Mitra | ...................... B29C 65/16 |
| | | | | 250/492.1 |
| 2018/0210211 | A1 * | 7/2018 | Akiyama | ........... G03B 21/2033 |
| 2021/0239805 | A1 * | 8/2021 | Ito | ......................... G01S 7/4817 |

FOREIGN PATENT DOCUMENTS

| | | |
|---|---|---|
| JP | 2001-176772 A | 6/2001 |
| JP | 4880746 B2 | 2/2012 |
| JP | 2012-63488 A | 3/2012 |
| JP | 2014-38314 A | 2/2014 |
| JP | 2015-166313 A | 9/2015 |
| JP | 2016-74556 A | 5/2016 |

\* cited by examiner

HOMOGENIZER, ILLUMINATING OPTICAL SYSTEM, AND ILLUMINATOR

TECHNICAL FIELD

The present invention relates to a homogenizer which converts an incident light having an uneven light-intensity spatial distribution into a light having an even light-intensity distribution on an irradiation plane, and to an illuminating optical system and an illuminator each including the homogenizer.

BACKGROUND ART

A homogenizer including a pair of lens arrays called integrator lenses or fly-eye lenses is a common technique for enabling illuminating optical systems, such as liquid-crystal projectors, which are for enlarging and projecting images produced by liquid-crystal display elements, and exposure devices, to attain an even light-intensity distribution on irradiation planes.

FIG. 23A and FIG. 23B are cross-sectional views showing one example of illuminating optical systems used in liquid-crystal projectors. The illuminating optical system 200 shown in FIG. 23A and FIG. 23B includes a discharge lamp 50, a parabolic mirror 51, a homogenizer 52 including a pair of convex-lens arrays (52a and 52b), and a field lens 53. FIG. 23A and FIG. 23B further show a liquid-crystal display element 54, which is an irradiation plane, and a projection lens 55, as components of a liquid-crystal projector. FIG. 23A is a cross-sectional view showing an example of the arrangement of the major components of the illuminating optical system 200. FIG. 23B is a cross-sectional view in which an example of optical paths in the illuminating optical system 200 has been added.

In this example, the light emission point of the discharge lamp 50 has been disposed at the focal point of the parabolic mirror 51. A visible light emitted by the light emission point is reflected by the parabolic mirror 51 to become approximately parallel light and enters the homogenizer 52. The approximately parallel visible light which has entered the homogenizer 52 is condensed and caused to strike on the surface of the convex lenses of the convex-lens array 52b by the convex lenses of the convex-lens array 52a, the convex lenses of the convex-lens array 52b being paired with the convex lenses of the convex-lens array 52a and being disposed in the vicinity of the focal points of the convex lenses of the convex-lens array 52a. The light is emitted, by the convex lenses of the convex-lens array 52b, as divergent light which is superimposed at the irradiation plane (display surface of the liquid-crystal display element 54).

The field lens 53 has been disposed in order to cause the optical axes of the individual convex lenses (521a and 521b) of the homogenizer 52 to meet each other at the center of the irradiation plane (display surface of the liquid-crystal display element 54). The light emitted by the individual lenses of the convex-lens array 52b is caused to strike on the display surface of the liquid-crystal display element 54 by the field lens 53 to become light for projecting images produced by the liquid-crystal display element 54, on a screen which is not shown. In this example, the images produced by the liquid-crystal display element 54 are enlarged and projected by the projection lens 55.

In this illuminating optical system 200, fluxes of incident light which differ in light-intensity distribution on the surface of the convex-lens array 52a are emitted from the convex lenses 521a of the convex-lens array 52a and the convex lenses 521b of the convex-lens array 52b and superimposed at the irradiation plane. Thus, the light-intensity distributions of the light which has entered the individual convex lenses are averaged in accordance with the number of arrayed convex lenses and an even light-intensity distribution is obtained.

FIG. 24A and FIG. 24B are views which illustrate a more detailed example of the configuration of the homogenizer 52. FIG. 24A is a cross-sectional view of the homogenizer 52, while FIG. 24B is a plan view of one convex-lens array (52a or 52b) of the homogenizer. The concentric dotted-line circles within each lens surface are contour lines each connecting points equal in lens depth (sag value) (hereinafter the same applies in other plan views).

In the homogenizer 52, in each of the convex-lens arrays 52a and 52b, lenses having the same convex-lens shape are closely disposed in an array arrangement on one surface of a light-transmitting substrate. The convex-lens arrays 52a and 52b in this example are each a convex-lens array in which lenses having an X-axis-direction width of Wx and a Y-axis-direction width of Wy are disposed in an array arrangement such that the X-axis-direction number of lenses is Nx and the Y-axis-direction number of lenses is Ny and there is no flat boundary. Hereinafter, the individual convex lenses of the convex-lens array 52a are often referred to as convex lenses 521a and the individual convex lenses of the convex-lens array 52b are often referred to as convex lenses 521b. In the case where the convex-lens arrays 52a and 52b are inclusively mentioned without distinction, the convex lenses of either or both of the arrays 52a and 52b are often referred to as convex lenses 521. Hereinafter, the same applies to other homogenizers.

The incident light which has entered the homogenizer 52 becomes divergent light having a Z-axis-direction maximum incidence angle $\alpha$, depending on the light-emission length (on the order of millimeter) of the discharge lamp 50. The maximum incidence angle $\alpha$ corresponds to a maximum diffusion angle (half angle) of fluxes of the light emitted by the discharge lamp 50. The maximum diffusion angle (half angle) is also called a maximum emission angle (half angle).

As shown in FIG. 24A, parallel-light components of the light which has entered the convex-lens array 52a are condensed on the axes on the focal plane of each of the convex lenses 521a, and are caused to pass through the top flat portions of the convex lenses 521b disposed in the vicinity of the focal plane. The light then becomes a divergent light having a maximum diffusion angle (half angle) $\beta$ to illuminate the liquid-crystal display element 54. In the case where each of the convex lenses has the lens width Wx being different from the lens width Wy, that is, where each of the convex lenses has a rectangular outer shape (in periphery shape), the X-axis-direction maximum diffusion angle (half angle) $\beta x$ differs from the Y-axis-direction maximum diffusion angle (half angle) $\beta y$ and the relationship therebetween is as follows: $\sin(\beta x)/\sin(\beta y)=Wx/Wy$. Consequently, the X-axis-direction maximum diffusion angle $\beta$ of the light to be emitted from the homogenizer 52 and the Y-axis-direction maximum diffusion angle $\beta$ thereof can be independently regulated.

Meanwhile, divergent-light components of the light which has entered the convex-lens array 52a are condensed outside the axes on the focal plane of the convex lenses 521a. In the case where the positions where the condensation occurs are within the surface of the convex lenses 521b, which are paired with the convex lenses 521a, the light that has been refracted by the convex lenses 521b and emitted therefrom illuminates the liquid-crystal display element 54.

That is, the divergent light having a maximum diffusion angle α which has entered the convex-lens array 52a including the convex lenses 521a having lens widths of Wx×Wy is converted, by the convex lenses 521b of the convex-lens array 52b, into divergent light having an outer shape analogous to Wx×Wy and having a maximum diffusion angle β, and is enlarged and projected on the irradiation plane.

FIG. 25A and FIG. 25B are cross-sectional views showing one example of illuminating optical systems used in ultraviolet exposure devices. The illuminating optical system 210 shown in FIG. 25A and FIG. 25B includes a discharge lamp 60, an ellipsoidal mirror 61, a dichroic mirror 66, a homogenizer 62 including a pair or convex-lens arrays (62a and 62b), and a field lens 63. FIG. 25A and FIG. 25B further show a condenser lens 65 as a component of an ultraviolet exposure device. Although the irradiation plane in this example is not shown, an effective region of the entrance surface of the condenser lens 65 corresponds to a simulated irradiation plane. FIG. 25A is across-sectional view showing an example of the arrangement of the major components of the illuminating optical system 210, while FIG. 25B is a cross-sectional view in which an example of optical paths in the illuminating optical system 210 has been added.

In this example, the light emission point of the discharge lamp 60 has been disposed at the first focal point of the ellipsoidal mirror 61. Ultraviolet light emitted by the light emission point is reflected by the ellipsoidal mirror 61 and the dichroic mirror 66, and condensed so as to strike on the homogenizer 62, which has been disposed at a second focal point of the ellipsoidal mirror 61. The light which has entered the homogenizer 62 is condensed by the convex lenses of the convex-lens array 62a so as to strike on the apertures of the convex lenses of the convex-lens array 62b, which is paired with the convex-lens array 62a and has been disposed in the vicinity of the focal points of the convex lenses of the convex-lens array 62a. The light is emitted by the convex lenses of the convex-lens array 62b, as divergent light which is superimposed on an irradiation plane (not shown).

The field lens 63 has been disposed in order to cause the optical axes of the individual convex lenses (621a and 621b) of the homogenizer 62 to meet each other at the center of the irradiation plane. The condenser lens 65 is a lens for converting the divergent light emitted from the field lens 63 into approximately parallel light. Thus, the light emitted by the homogenizer 62 passes through the field lens 63, which causes the optical axes of the convex lenses of the homogenizer 62 to meet each other at the center of the irradiation plane, is converted to approximately parallel light by the condenser lens 65, and reaches the irradiation plane (not shown).

Also in the illuminating optical system 210, fluxes of incident light which differ in light intensity distribution on the surface of the convex-lens array 62a are emitted from the convex lenses 621a of the convex-lens array 62a and the convex lenses 621b of the convex-lens array 62b and superimposed at the irradiation plane. Thus, the light-intensity distributions of the light which has entered the individual convex lenses are averaged in accordance with the number of arrayed convex lenses and an even light-intensity distribution is obtained. The term "even light-intensity distribution" herein means a light-intensity distribution of, for example, 85% or higher.

FIG. 26A and FIG. 26B are views which illustrate a more detailed example of the configuration of the homogenizer 62. FIG. 26A is a cross-sectional view of the homogenizer 62. FIG. 26B is a plan view of one convex-lens array (62a or 62b) of the homogenizer.

The homogenizer 62 is a both-side convex-lens array including an entrance surface and an emission surface which have been processed respectively into a convex-lens array 62a and a convex-lens array 62b. In each of the two convex-lens arrays (62a and 62b), two or more convex lenses are disposed in an array arrangement such that the boundaries therebetween include neither a flat surface nor a gap. In the case of ultraviolet exposure devices, the homogenizer 62 typically employs synthetic quartz, which shows little absorption in an ultraviolet wavelength range. Synthetic quartz has a softening temperature as high as 1,000° C. or higher and it is difficult to produce a lens array therefrom by die forming. Because of this, the following configuration has been frequently used: synthetic-quartz blocks having a prismatic outer shape are ground to form a convex lens in each of the upper and lower faces and the resultant both-side convex lenses 621 are disposed in an array arrangement. This configuration is poor in mass productivity.

FIG. 26B shows an example of a convex-lens array (62a or 62b) including columnar lenses each having convex-lens surfaces having the shape of a regular hexagon, which are disposed in a fly-eye arrangement at the same intervals as the lens width W. However, the convex-lens array (62a or 62b) may be one obtained by disposing columnar lenses each having convex-lens surfaces of a quadrilateral shape, in an array arrangement. Although the homogenizer 62 in this example differs in configuration from the homogenizer 52, the principle of even illumination is common therebetween.

FIG. 27 is a view (YZ cross-sectional view) illustrating a relationship between the entrance surface and emission surface of a pair of convex lenses (i.e., a pair of convex lenses 621a and 621b) in the homogenizer 62 and the irradiation plane. In the illuminating optical system 210 in this example, divergent light having a maximum diffusion angle α which strikes on the convex lens 621a is refracted at the surface of the convex lens 621a and is condensed so as to strike on the focal plane thereof. If some of the divergent light which has entered the aperture of the convex lens 621a reaches the outside of the convex lens 621b, which is paired with the convex lens 621a, the some of the divergent light become stray light, which is not condensed so as to strike on the desired irradiation plane, resulting in a poor illumination-plane intensity distribution and a decrease in light utilization efficiency. In order that the divergent light which has entered the aperture of the convex lens 621a is condensed so as to strike on the aperture of the convex lens 621b, which is paired with the convex lens 621a, it is necessary that the convex-lens array 62a should have a convex-lens surface having a large numerical aperture. In addition, since spherical convex lenses having a large numerical aperture have off-axial aberration and poor condensing properties, it is preferred to employ an aspherical shape.

The distance between the entrance surface of the convex lens 621a and the principal point of the convex lens 621b, which is paired with the convex lens 621a, is expressed by $S_1$, and the distance between the principal point of the convex lens 621b and the irradiation plane (denoted by numeral 65 in the figure) is expressed by D ($D=S_2$). Furthermore, the focal distance of the convex lenses 621b is expressed by f. Then, the $S_1$, $S_2$, and f are correlated with each other by a paraxial approximate expression for convex lenses, and an entrance pupil A (more specifically, the width W of the aperture shape) which has entered the aperture of the convex lens 621a is caused, by the convex lens 621b, to form an image as an emission pupil B on the given irradiation plane (numeral 65). In the case where the $S_2$ is sufficiently larger than the $S_1$, the aperture B (maximum width of the irradiation plane) of the emission pupil B is approximated by $B=2 \cdot S_2 \cdot \tan(\beta)$, from the maximum diffusion angle $\beta$ of the light emitted by homogenizer 62 upon reception of incident light parallel with the optical axis.

Thus, by using a homogenizer including a pair of convex-lens arrays including convex-lens pairs each having a common symmetry axis which are disposed in an array arrangement, the light-intensity distributions on the individual convex-lens entrance surfaces are superimposed and averaged, thereby illuminating the irradiation plane at an even light intensity. The larger the number of convex lenses (number of arrayed convex lenses), the more the evenness improves. The number of arrayed convex lenses in the same surface is, for example, preferably 16 or more, more preferably 25 or more, still more preferably 50 or more. There is no particular upper limit on the number of arrayed convex lenses. An upper limit of the number of arrayed convex lenses per $mm^2$ may be 10,000.

Meanwhile, LEDs and semiconductor lasers (LDs) have come to be practically used as high-intensity light sources in place of the discharge lamps, and are spreading increasingly because these light sources have the feature of being small and having a high luminescent efficiency. In the illuminating optical system 210 shown above, light is emitted over a wide light distribution angle by the discharge lamp having a light-emission length on the order of millimeter and the light is condensed by the condenser mirror (ellipsoidal mirror 61) so as to strike on the homogenizer. Thus, the illuminating optical system 210 is difficult to be reduced in size. In the case where an LD light source having a light-emission length on the order of micrometer and efficiently emitting light having high directivity (that is, the emitted light has a narrow light distribution angle) is used, a size reduction in illuminating optical systems can be realized. Consequently, LDs are expected to be utilized in a wide range of illumination applications as light sources in place of the discharge lamps.

Patent Literatures 1 and 2 describe examples of illuminators or illuminating optical systems in which laser light sources are used as light sources for illumination. For example, Patent Literature 1 describes a laser illuminator including a laser light source and a homogenizer including a first lens and a second lens each of which includes a plurality of minute lens elements. Patent Literature 2, for example, describes an illuminating optical system for use in semiconductor exposure devices employing laser light as a light source for illumination, the illuminating optical system having a configuration in which a fly-eye integrator is used as a homogenizer.

CITATION LIST

Patent Literature

Patent Literature 1: Japanese Patent No. 4880746
Patent Literature 2: JP-A-H05-251309

SUMMARY OF THE INVENTION

Technical Problems

As described above, use of a laser light source attains a size reduction in the light-source part including a condens-ing system. For example, an LD light source having a light-emission length on the order of micrometer efficiently gives illuminating light having high directivity. Furthermore, a vertical-cavity surface-emitting laser (VCSEL) which produces laser light having a wavelength in the near infrared range of 780 nm to 1,300 nm has an advantage in that a structure including laser light emission points two-dimensionally arrayed at intervals of several tens of micrometers in a semiconductor wafer can be easily produced and that a high-power laser light source having a power of several tens of watts to several hundreds of watts is obtained by increasing the number of light emission points.

FIG. 28A and FIG. 28B is respectively a cross-sectional view and a plan view which show an example of laser light sources. The laser light source 11 shown in FIG. 28 includes a semiconductor substrate 11a and surface emitting laser light emission points (VCSEL light-emitting layers) 11b disposed in an array arrangement on the semiconductor substrate 11a. The laser light source 11 having such configuration emits divergent light having a light-intensity distribution of emitted light which can be approximated to a Gaussian distribution. For example, in the case where the laser light source 11 includes laser light emission points in an X-axis direction at intervals of "a", the number of the light emission points being Na, and includes laser light emission points in a Y-axis direction at intervals of "b", the number of the light emission points being Nb, on the surface of the substrate, this laser light source 11 as a whole has a light intensity of $P=p \cdot Na \cdot Nb$, where p is the light intensity of the light emitted by each light emission point. For example, in the case where $a=b=30$ μm, $Na=Nb=100$, and $P=10$ mW, a laser output of $P=100$ W is obtained from an emission surface of 3 mm×3 mm.

In the case where such a VCSEL array is used as a light source, a laser light source having an increased output can be obtained by increasing the number of arrayed laser light emission points. However, the light emitted by each laser light emission point has a narrow emission angle (half angle) δ, which is the maximum emission angle (half angle) of the light emitted by the laser array light source (see FIG. 28A). Because of this, for illuminating a wide area, it is necessary to elongate the distance L to an irradiation plane (the entrance surface of the homogenizer in the aforementioned illuminating optical system). This results in an illumination-plane light-intensity distribution which is an uneven Gaussian distribution.

If the emission angle δ of the light emitted by each unit laser light emission point in an array-based laser light source is defined as an angle at which a light-intensity ratio determined by normalizing the light-intensity distribution with Gaussian-distribution center intensity (emission angle: 0°) is $e^{-2}$, a light-intensity distribution $I(\theta)$ for the laser light source alone at any laser light emission angle θ is expressed by formula (1).

$$I(\theta)=\exp\{-2(\theta/\delta)^2\} \qquad (1)$$

The light-intensity distribution of a laser light source including an assembly of individual laser light emission points changes depending on the Z-axis-direction distance L from the light emission points. When $a=b$ and $Na=Nb$, the diameter φ of an irradiation plane where the light-intensity ratio for the light emitted by a laser light emission point is $e^{-2}$ is expressed by $\varphi=2 \cdot L \cdot \tan(\delta)$. Because of this, where the distance L satisfies $\varphi \geq a$, the light emitted by adjoining light emission points is superimposed. Where the distance L satisfies $\varphi \geq \sqrt{2} \cdot a$, the light-intensity ratio for the light emitted from the overall array area $(Na \times a) \times (Nb \times b)$ is $e^{-2}$ or more.

Furthermore, where the distance L satisfies φ>√2·a·Na, the irradiation plane has an increased area and the light-intensity ratio for the light emitted from the overall array area is close to the Gaussian light-intensity distribution I(θ) for a laser light emission point.

The laser array light source shown above as an example is a VCSEL array light source obtained by two-dimensionally arraying VCSELs producing laser light having a wavelength in the near infrared range of 780 nm to 1,300 nm. It is, however, possible to convert the near infrared light emitted by the VCSEL array light source into visible laser light through second harmonic generation (SHG) using a nonlinear optical crystal such as $LiNbO_3$.

In the case of a Fabry-Pérot laser, which includes a laser emission active layer having a waveguide structure, laser light having wavelengths in the ultraviolet to the near infrared range is obtained. By one-dimensionally arraying light emission points of such a laser or by enlarging the width of the waveguide of the laser emission active layer, a high-output laser light source can be obtained. However, the emitted laser light has a Gaussian intensity distribution, and in the case of the laser light source operated in a multi-mode in which the laser emission active layer has a larger width, the emitted light has a more uneven intensity distribution.

Use of such a laser light source attains a remarkable size reduction in light-source parts including a condensing system. However, a widely diffusing homogenizer is necessary for causing the divergent light having an uneven light-intensity distribution emitted by a laser light source to strike on an irradiation plane evenly (for example, a light-intensity distribution on the irradiation plane of 85% or higher), while a high condensing efficiency is maintained.

In the conventional illuminating optical system in which a discharge lamp is used as a light source, the light having a wide distribution angle emitted by the light source is condensed with a condensing mirror so as to strike on the entrance surface of the homogenizer. Because of this, the light-intensity distribution on the entrance surface is uneven and the maximum diffusion angle α of the incident light is regulated to 10° or less such that the number of the apertures of the convex-lens arrays in the entrance surface and emission surface is small. As a result, the outer shape of the condensing mirror becomes large, and the effective diameter φ of the entrance surface of the homogenizer is also enlarged. Consequently, a homogenizer including an entrance surface and an emission surface constituted of convex-lens arrays including spherical convex lenses or aspherical convex lenses having a close shape to spherical ones has been able to be used to attain even illumination even under such illumination conditions that the maximum diffusion angel β is relatively small. However, in the case of a homogenizer configured to convert divergent light which has been emitted at a narrow angle by a laser light source and which is a light flux having a maximum diameter φ on the entrance surface of the homogenizer into light having an even light-intensity distribution on a given irradiation plane, it is necessary that the convex lenses constituting each of the convex-lens pairs in the pair of convex-lens arrays of the homogenizer should have an XY-surface width W of φ/4 or less (in the case where the number of arrayed convex lenses is 4×4=16). In the case where the X-direction width differs from the Y-direction width, the XY-surface width W of each convex lens is defined as the larger one of the widths along the two directions. The width W is more preferably φ/5 or less (assuming the case where the number of arrayed convex lenses is 5×5=25), still more preferably φ/7 or less (assuming the case where the number of arrayed convex lenses is 7×7=49).

For example, in the case where the homogenizer has an effective diameter of 2.0 mm, i.e., φ=2.0 mm, it is required that W≤0.5 mm, or W≤0.4 mm, or W≤0.3 mm. Furthermore, in the case where the homogenizer has an effective diameter of 1.0 mm, i.e., φ=1.0 mm, it is required that W≤0.25 mm, or W≤0.2 mm, or W≤0.15 mm.

As already explained above, in an illuminating optical system, the light emitted from the homogenizer is enlarged at a maximum diffusion angle β to strike on an irradiation plane having a width B. Consequently, the convex-lens array (52b or 62b) lying on the emission side in the homogenizer corresponds to diffusing micro light sources. The intensity of light emitted from such diffusing micro light sources, on an irradiation plane, is restricted by the "cosine fourth power law" for illuminating optical systems, which is based on the "inverse square law of distance" and the "cosine characteristics of oblique incident light" both regarding illumination.

FIG. 29A and FIG. 29B are respectively a schematic view and a graph which show that a light flux emitted by diffusing micro surface light sources has light intensities according to the cosine fourth power law on an irradiation plane facing the emission surface of the light sources. FIG. 29B shows a light-intensity ratio ($E_θ/E_0$), which is the ratio of a light intensity ($E_θ$) as measured at any angle θ in the diffusion angle β direction to a light intensity (directly-under-light-source intensity $E_0$) as measured at a perpendicularly opposed position. As FIG. 29A schematically shows, in the case where a plane opposite to the emission surface of the diffusing micro surface light sources is illuminated, the light intensity $E_θ$ as measured at a point on the irradiation plane which lies at an angle θ is $cos^4 θ$ times the light intensity (directly-under-light-source intensity $E_0$) as measured on a surface perpendicularly opposite to the light sources. FIG. 29B is a graph showing calculated values of light-intensity ratio $cos^4 θ$ for an area in the irradiation plane lying in the angle range of θ=0 to 50°.

As FIG. 29B shows, the light-intensity ratio on the irradiation plane has values larger than 0.9 in the case where θ≤10°, but decreases to less than 0.8 in the case where θ=20° and to less than 0.6 in the case where θ=30°.

Because of this, in the case where the light emitted from a homogenizer is made to have a larger maximum diffusion angle β (e.g., β≥12°) than in conventional configurations by a method in which the light fluxes emitted from the individual convex lenses of the emission-side convex-lens array are made to have a larger diffusion angle, for example, by merely regulating the lens shape of the convex lenses, the resultant light-intensity distribution on the irradiation plane is uneven due to restrictions by the cosine fourth power law, etc. That is, the method in which the convex lenses of the emission-side convex-lens array in a conventional homogenizer are merely made to emit light fluxes at a wider angle cannot necessarily attain an even light-intensity distribution of 0.9 or higher in the case where the maximum diffusion angle β≥12°, due to restrictions by the cosine fourth power law, etc.

Although Patent Literature 1 shows a laser illuminator including a laser light source, the unevenness of light-intensity distribution on an irradiation plane due to the use of the laser light source is not considered. Patent Literature 1 contains no specific disclosure regarding the diffusion of the light emitted from the homogenizer or the light-intensity distribution on irradiation planes. The same applies to Patent Literature 2.

An object of the present invention is to provide a homogenizer which is small and has a satisfactory utilization efficiency and which can emit light showing high evenness on irradiation planes, and to provide an illuminating optical system and an illuminator.

Another object of the present invention is to provide a homogenizer by which divergent light having an uneven light-intensity distribution emitted by a laser light source can be projected at a maximum diffusion angle of 12° or larger on an irradiation plane so as to result in a light-intensity distribution as even as 85% or more while a high condensing efficiency is maintained, and to provide an illuminating optical system and an illuminator employing the homogenizer. In particular, the object is to provide a homogenizer showing such properties for divergent light having a Gaussian intensity distribution emitted by a semiconductor laser light source, and to provide an illuminating optical system and an illuminator employing the homogenizer.

Solution to Problem

A homogenizer in the present invention includes a convex-lens array pair including a first convex-lens array disposed on a light entrance side and a second convex-lens array disposed on a light emission side, in which the first convex-lens array and the second convex-lens array are disposed so as to face each other such that each of the convex-lens arrays has a lens surface opposed to each other outward or inward, in which the first convex-lens array includes a plurality of first convex lenses having a same shape which are disposed in an array arrangement on one surface, in which the second convex-lens array includes a plurality of second convex lenses having a same shape which are disposed in an array arrangement on one surface, in which the first convex lenses and the second convex lenses form convex-lens pairs in each of which the first convex lens and the second convex lens face each other and have a common symmetry axis, in which the first convex lens, in a lens cross-section including the symmetry axis, has an average internal transmission angle for incident light entering a lens-surface center region in the lens cross-section and being in parallel with the symmetry axis, the average internal transmission angle being equal to or more than 1.3 times an average internal transmission angle in a lens-surface center region of a spherical convex lens.

In addition, another homogenizer in the present invention includes two convex-lens array pairs each including a first convex-lens array disposed on a light entrance side and a second convex-lens array disposed on a light emission side, in which in each of the convex-lens array pairs, the first convex-lens array and the second convex-lens array are disposed so as to face each other such that each of the convex-lens arrays has a lens surface opposed to each other outward or inward, in which the first convex-lens array includes a plurality of first convex lenses having a same shape which are disposed in an array arrangement on one surface, each of the first convex lenses being a convex cylindrical lens, the plurality of first convex lenses being disposed such that lens-function axes of the first convex lenses are parallel with each other, in which the second convex-lens array includes a plurality of second convex lenses having a same shape which are disposed in an array arrangement on one surface, each of the second convex lenses being a convex cylindrical lens, the plurality of second convex lenses being disposed such that lens-function axes of the second convex lenses are parallel with each other, in which the first convex lenses and the second convex lenses in each of the convex-lens array pairs form convex-lens pairs in each of which the first convex lens and the second convex lens face each other and have a common symmetry axis, in which the two convex-lens array pairs are serially disposed along an optical-axis direction, which is a traveling direction of incident light, such that the two convex-lens array pairs differ from each other in lens-function axis direction by 90°, in which in each of the convex-lens array pairs, when a cross-section of each convex lens which is perpendicular to a base-line direction of the convex lens is referred to as a lens cross-section and a position of a symmetry plane in the lens cross-section is referred to as symmetry axis, the first convex lens has an average internal transmission angle for incident light entering a lens-surface center region in the lens cross-section and being in parallel with the symmetry axis, the average internal transmission angle being equal to or more than 1.3 times an average internal transmission angle in a lens-surface center region of a spherical convex lens.

An illuminating optical system in the present invention includes a laser light source configured to emit a divergent light having an uneven light-intensity distribution and any one of the homogenizer described above, in which the divergent light emitted by the laser light source enters the homogenizer, is emitted as more widely diffused divergent light from the homogenizer, and is expanded and projected on a given irradiation plane with an even light-intensity distribution.

An illuminator in the present invention includes the illuminating optical system described above.

Advantageous Effects of Invention

The present invention can provide a homogenizer which is small and has a satisfactory utilization efficiency and which can emit light showing high evenness on irradiation planes, and an illuminating optical system and an illuminator.

Furthermore, the present invention can provide a homogenizer by which divergent light having an uneven light-intensity distribution emitted by a laser light source can be projected at a maximum diffusion angle of 120 or larger on an irradiation plane so as to result in a light-intensity distribution as even as 85% or more while a high condensing efficiency is maintained, and an illuminating optical system and an illuminator employing the homogenizer. In particular, the present invention can provide a homogenizer showing such properties for divergent light having a Gaussian intensity distribution emitted by a semiconductor laser light source, and an illuminating optical system and an illuminator employing the homogenizer.

BRIEF DESCRIPTION OF THE DRAWINGS

FIG. 2A and FIG. 2B are respectively a cross-sectional view and a plan view of a convex lens 121a.

DESCRIPTION OF EMBODIMENTS

Embodiment 1

Figure 1A:
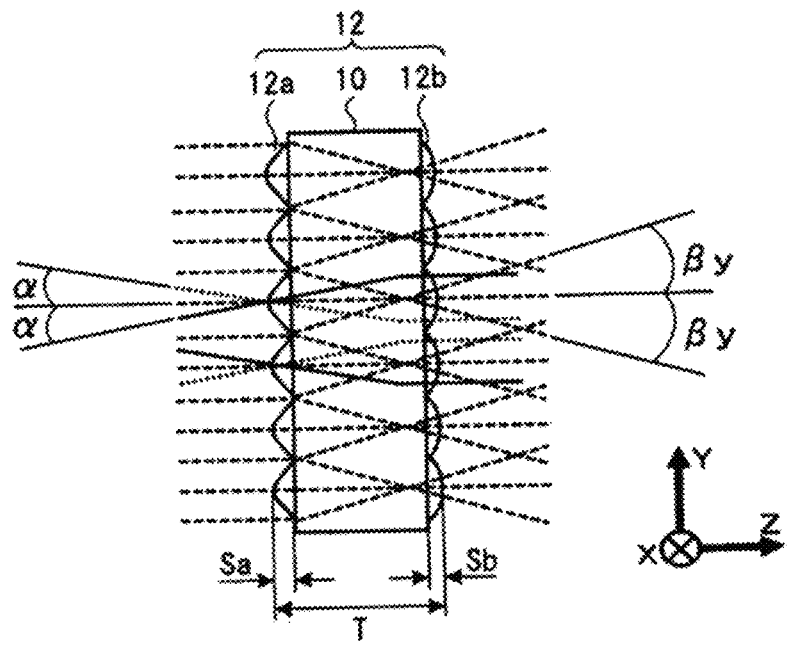
FIG. 1A and FIG. 1B are respectively a cross-sectional view and a plan view which show an example of a homogenizer according to a first embodiment.
Figure 1B:
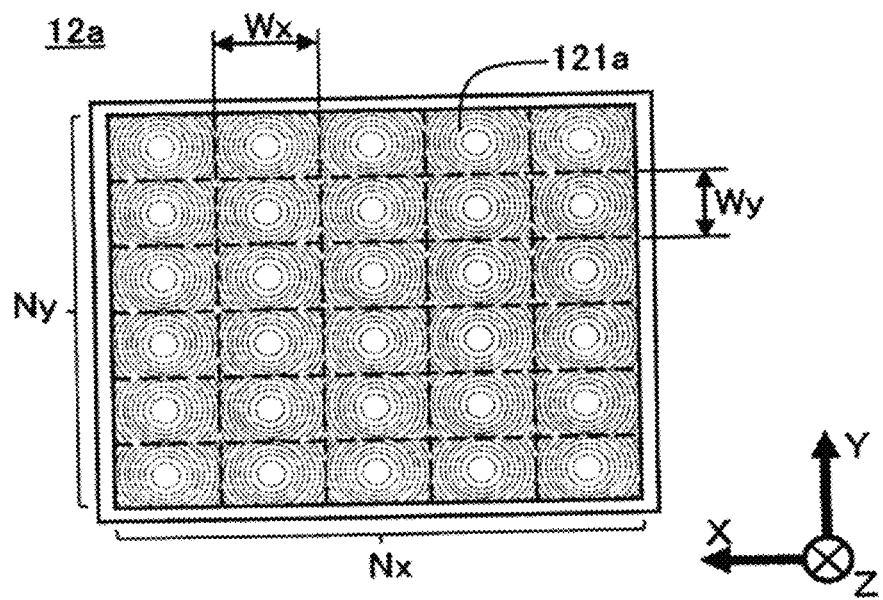

Examples of embodiments of the present invention are explained below by reference to drawings. FIG. 1A and FIG. 1B are respectively a cross-sectional view and a plan view which show an example of a homogenizer according to a first embodiment. As FIG. 1A shows, the homogenizer 12 according to this embodiment includes a light-transmitting substrate 10 having a flat-plate shape and a first convex-lens array 12a and a second convex-lens array 12b, which are disposed respectively on two surfaces (first surface and second surface) of the light-transmitting substrate 10.

In the first convex-lens array 12a and the second convex-lens array 12b, convex lenses 121a constituting the first convex-lens array are respectively paired with convex lenses 121b constituting the second convex-lens array. More specifically, the first convex-lens array 12a and the second convex-lens array 12b are each a gap-less lens array in which flat portions between adjoining convex lenses are small, and each of the convex lenses 121a constituting the first convex-lens array 12a has a lens symmetry axis coinciding with that of the convex lens 121b paired therewith and has the same XY-plane widths W (Wx and Wy) as the paired convex lens 121b. The term "symmetry axis" for a lens has the same meaning as an optical axis, and means the center axis of the lens or a symmetry axis having at least two-fold symmetry.

The offset in symmetry axis between the convex lens 121a and the convex lens 121b is preferably 5% or less, more preferably 2% or less, with respect to lens width. In the convex-lens arrays 12a and 12b, the width G (see FIG. 3, which will be described later) of a boundary portion which lies between adjoining convex lenses and which has a shape deviated from a desired convex-lens shape is preferably 5% or less with respect to the lens width (that is, 2.5% or less per convex lens ($G/2/W \times 100 = 5/2 = 2.5$), more preferably 2% or less (1% or less per convex lens). For example, in the case where W=100 µm, G≤5 µm is preferably satisfied.

In the homogenizer 12 according to this embodiment, in the case where light from a light source strikes at a maximum incidence angle α (which corresponds to the maximum emission angle δ in the case of a laser light source) on the convex lenses 121a of the first convex-lens array 12a, the light is refracted at the surfaces of the convex lenses 121a, is transmitted through the light-transmitting substrate 10, and reaches the surfaces of the convex lenses 121b of the second convex-lens array 12b. The light is then refracted at the surfaces of the convex lenses 121b and is finally emitted as divergent light having a maximum diffusion angle β.

Here, the lens surface shape of the convex lenses 121a and the thickness of the substrate (distance between the first convex-lens array 12a and the second convex-lens array 12b) are set such that the incident light which has entered the convex lenses 121a reaches effective surfaces of the convex lenses 121b which are paired with the convex lenses 121a, as in the homogenizers 52 and 62 described above.

Figure 2A:
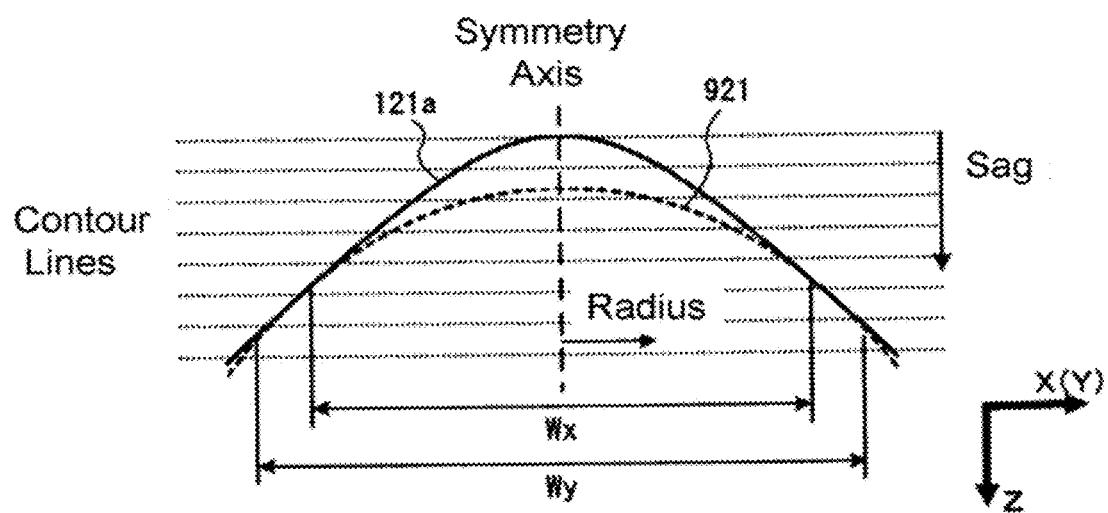
Figure 2B:
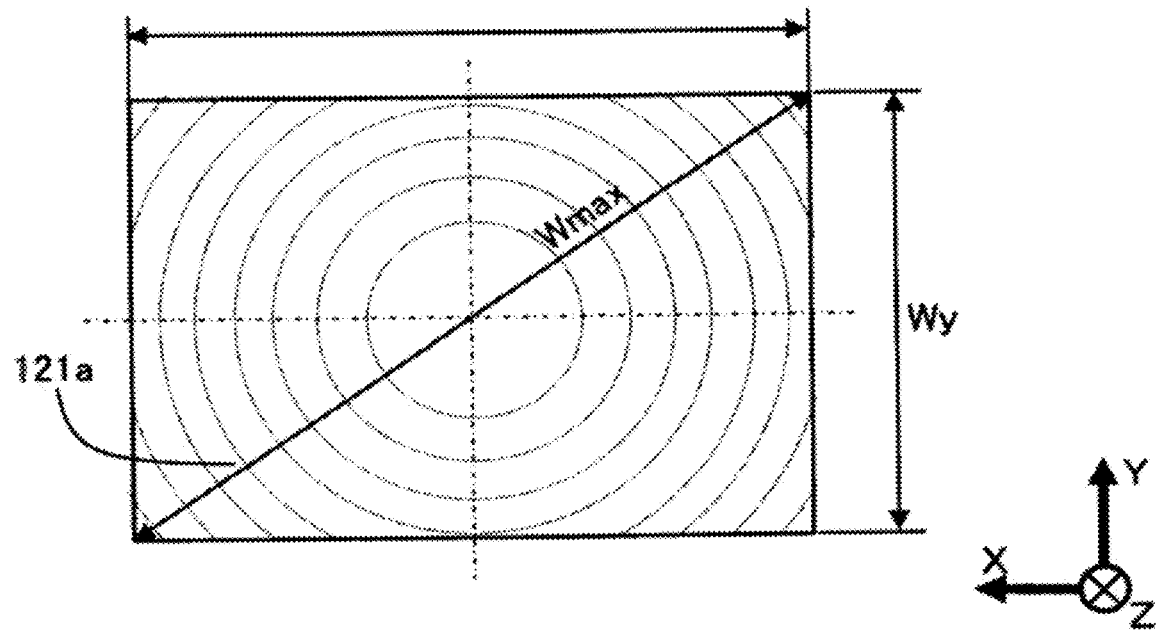

FIG. 2A and FIG. 2B are respectively a cross-sectional view and a plan view of a convex lens 121a included in the first convex-lens array 12a. As FIG. 2A shows, the homogenizer 12 according to this embodiment differs from conventional homogenizers in the cross-sectional shape of the convex lenses 121a of the first convex-lens array 12a, which are disposed on the entrance side. More specifically, as compared with the cross-sectional shape of a conventional convex lens having approximately the same maximum diffusion angle β, that is, the cross-sectional shape of a spherical convex lens 921 having approximately the same inclination in the peripheral portion, in the cross-sectional shape of the convex lenses 121a, the surface flat portion in the vicinity of the symmetry axis is smaller, and the surface in the vicinity of the symmetry axis other than the flat portion is more inclined. Namely, the convex lenses 121a each have a cross-sectional shape which is close to those of conical lenses having conical shapes and which includes a curved surface having a small radius of curvature near the top.

In FIG. 2A and FIG. 2B, the lens-surface depth (sag value) distribution of the convex lens 121a, based on the symmetry axis, is shown by contour lines (dotted lines). In FIG. 2A, the cross-sectional shape of the spherical convex lens 921 is indicated by a broken line for comparison.

The surface shapes of a convex lens 121a and a convex lens 121b can be expressed using the formula (2), which is an aspherical-lens formula indicating a sag value Z at a radial-direction radius r as a radial distance from the symmetry axis.

[Math. 1]

$$z(r) = \frac{cr^2}{1 + \sqrt{1 - (1+k)c^2 r^2}} + \alpha_1 r^4 + \alpha_2 r^6 + \alpha_3 r^8 + \alpha_4 r^{10} \quad (2)$$

In the formula (2), c is the inverse of radius of curvature R ($c=1/R$), k is conic constant, and $\alpha_1$ to $\alpha_4$ are aspherical constants. The sag value Z corresponds to convex-lens depth, and setting the symmetry axis (r=0) as a base (Z=0), the sag value Z decreases (Z<0) as the r increases. Here, the radius r, the radius of curvature R, and the sag value Z take length units. In this example, these numerals are expressed in m unit. The conic constant k is a dimensionless number.

By including the terms of higher orders of aspherical constants, various lens surfaces can be set. However, no aspherical constants are used here (all of $\alpha_1$ to $\alpha_4$ being 0), and an aspherical lens shape approximated with radius of curvature R and conic constant k is used as a prerequisite to show the parameters (radius of curvature and conic constant) for the convex lens 121a and the parameters for the convex lens 121b respectively as ($R_1$, $k_1$) and ($R_2$, $k_2$). The radius of curvature and conic constant of the convex lens 121a are $R_1$ and $k_1$ respectively, and the radius of curvature and conic constant of the convex lens 121b are $R_2$ and $k_2$ respectively.

The formula (2) indicates a convex-lens shape having rotational symmetry involving r=0 as asymmetry axis. However, the convex lenses 121a and 121b each may be a cylindrical lens in which only either the XZ cross-section or the YZ cross-section has a convex-lens shape and the other cross-section does not have a curved lens surface shape. In this case, the sag value Z is expressed by using X-axis coordinate x or Y-axis coordinate y where a convex lens shape is formed, in place of using the radial-direction radius r in the formula (2).

In the case where widely diffused divergent light such as one having a maximum diffusion angle α of 10° or larger strikes as incident light, for condensing the incident light by the convex lenses 121a of the entrance-side first convex-lens array 12a so as to strike on the apertures of the convex lenses 121b paired with the convex lenses 121a, it is necessary that the convex lenses 121a should have a large numerical aperture. The numerical aperture $NA_1$ of convex lenses 121a is defined by the formula (3).

$$NA_1 = W/(2f_1) \quad (3)$$

In order that the light which has struck on the apertures of the convex lenses 121b may be converted to widely diffused divergent light such as one having a maximum diffusion angle β of 100 or larger and be enlarged and projected on an irradiation plane, it is necessary the convex lenses 121b should have a large numerical aperture. The numerical aperture $NA_2$ of each convex lens 121b is defined by the formula (4).

$$NA_2 = W/(2f_2) \quad (4)$$

In the formulae (3) and (4), W is the maximum width (maximum diameter) of the effective convex-lens surface, $f_1$ is the focal distance of the convex lens 121a, and $f_2$ is the focal distance of the convex lens 121b. When the entrance-side medium is air and the light enters, in parallel with the symmetry axis, the convex lens 121a having a refractive index n and is then condensed so as to enter the paired convex lens 121b having the refractive index n, the focal distances $f_1$ and $f_2$ in a paraxial region having a small value of W are approximated by the following formulae.

$$f_1 \approx n \cdot R_1 / (n-1) \quad (5\text{-}1)$$

$$f_2 \approx n \cdot R_2 / (n-1) \quad (5\text{-}2)$$

As seen from the formulae (5-1) and (5-2), the focal distances $f_1$ and $f_2$ in paraxial regions having small values of W are not affected by the conic constants.

Consequently, in the case where aspherical convex lenses which have a large numerical aperture NA but have a conic constant k being a negative value are used, an improvement in condensing property can be attained as compared with spherical lenses, in which the lens-surface inclination angle abruptly increases in the peripheral portion of the lens to reduce the condensing properties. Specifically, the conic constant k preferably satisfies 0≥k≥−3, more preferably −0.5≥k≥−2.5. The case where k=−1 corresponds to paraboloid and k=−2 corresponds to hyperboloid. Those conditions of k are applicable to both $k_1$ and $k_2$ as conditions for aspherical lenses effective in improving the condensing properties of convex lenses having a large numerical aperture NA. Although those conditions of k are applicable also in the case where α<10° or β<10°, it is advantageous, especially in the case where α≥10°, to regulate the conic constant $k_2$ of the emission-side convex lenses 121b so as to satisfy those conditions. With respect to the conic constant $k_1$ of the convex lenses 121a, the condition which will be described later is preferential.

The convex lenses 121a constituting the first convex-lens array 12a used in the homogenizer 12 according to this embodiment are convex lenses which, assuming the entrance of divergent light having a narrow light-intensity distribution such as one approximated to a Gaussian distribution, are for changing the light distribution angle of the divergent incident light to condense the incident light so as to enter the convex lenses 121b and finally strike evenly on an irradiation plane. Consequently, the convex lenses 121a differ in preferred shape from convex lenses for a mere improvement in the property of condensing light and causing the light to strike on the convex lenses 121b.

Figure 3:
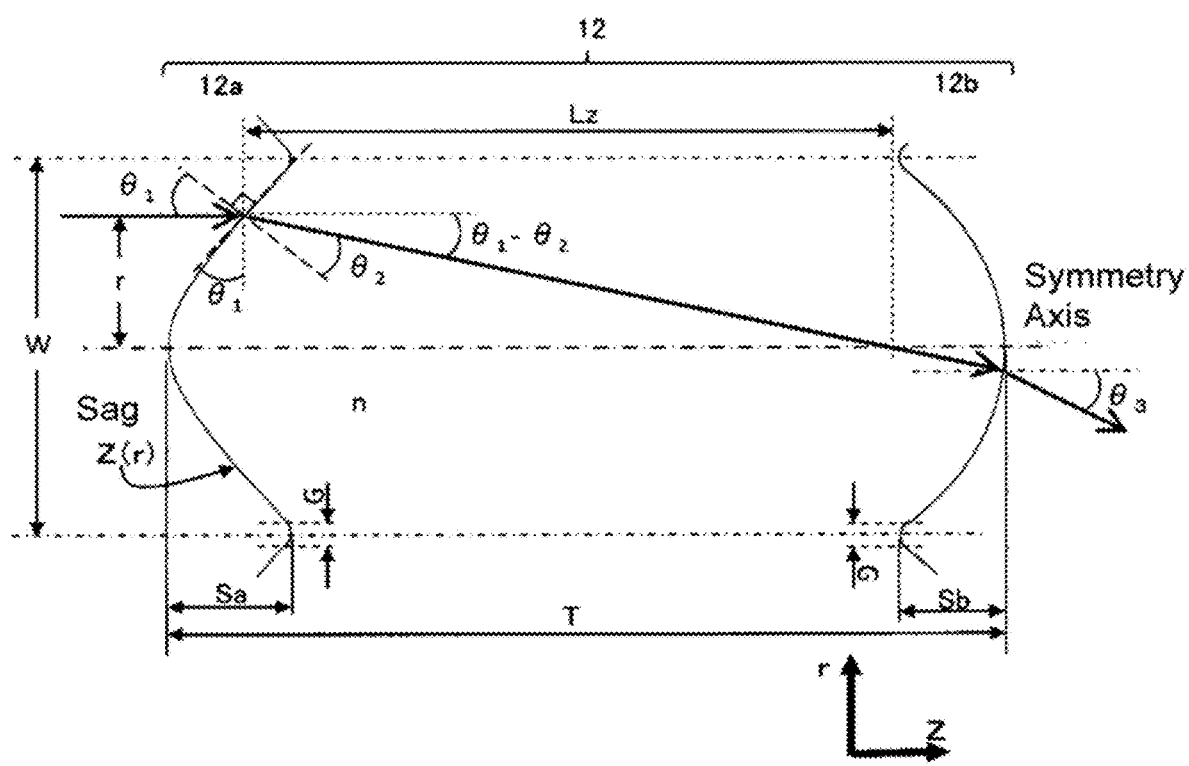
FIG. 3 is a view schematically illustrating the function of a pair of convex lenses (a convex lens 121a and a convex lens 121b paired therewith) whereby incident light parallel with the symmetry axis is transmitted.

FIG. 3 schematically shows the function of a pair of convex lenses (a convex lens 121a and a convex lens 121b paired therewith) in the homogenizer 12 according to this embodiment. The function is to transmit incident light parallel with the symmetry axis. FIG. 3 schematically shows a cross-section of the pair of convex lenses 121a and 121b constituting a convex-lens pair in the homogenizer 12. As FIG. 3 shows, the inclination angle of the convex lens 121a at a radial distance r corresponds to the incidence angle $\theta_1$ for the convex lens having a sag value Z(r). Consequently, incident light parallel with the symmetry axis and entering the convex lens 121a is light which enters at an incidence angle $\theta_1$ in the position corresponding to the sag value Z(r), and is refracted at a refractive angle $\theta_2$ satisfying Snell's refraction law $\sin(\theta_1)=n\cdot\sin(\theta_2)$ in accordance with the refractive index n of the convex lens for the incident light and transmitted through the convex lens. The light is thereafter refracted at the surface of the subsequent convex lens 121b and emitted at an angle $\theta_3$ with the symmetry axis. Since the light which is being transmitted through the inside of the homogenizer 12 having a refractive index n proceeds at an angle with Z axis of $|\theta_1-\theta_2|$, the distance Lz along Z-axis-direction (symmetry-axis-direction) between the entrance surface of the convex lens 121a and the intersection of the transmitted light and the symmetry axis is represented by $Lz=r/\tan|\theta_1-\theta_2|$. In the case where the radial distance r is 0≤r≤(W−G/2)/2, the Lz is preferably within the range of 0.5 times or more and 2.0 times or less the thickness T of the homogenizer 12 (the maximum symmetry-axis-direction distance between the paired convex lenses), more preferably within the range of 0.7 times or more and 1.2 times or less. The above description about Lz holds even in the case where the intersection lies after the emission surface of the convex lens 121b (Lz≥T).

Furthermore, the convex lenses 121a each have an aspherical lens shape in which a lens-surface center region has an average inclination angle larger than the average inclination angle of a lens-surface region of a spherical lens and a lens-surface peripheral region has approximately the same average inclination angle as in the spherical lens. The term "lens-surface center region" means a region in a cross-section including the symmetry axis and having a maximum width in the XY plane of $W_{max}$ (see FIG. 2B), in which the radial distance r from the symmetry axis is equal to or less than 50% of the maximum radial distance from the symmetry axis $W_{max}/2$ (0≤r≤$W_{max}/4$). The term "lens-surface peripheral region" means a region where the radial distance r is equal to or more than 50% of the maximum radial distance $W_{max}/2$ ($W_{max}/4$≤r≤$W_{max}/2$).

A center region of the lens surface may be expressed by 0≤r/($W_{max}/2$)≤χ and a peripheral region of the lens surface may be expressed by (1−χ)≤r/($W_{max}/2$)≤1, using a value of χ satisfying 0<χ≤0.5 to define each region. For example, χ may be 0.1, 0.2, 0.3, 0.4, or 0.5. Whichever set value of χ is used, the proportion $Ar_1$ of the average inclination angle of the lens-surface center region of the convex lens 121a to the average inclination angle of the lens-surface center region of the spherical lens is set at a value larger than 1, and the proportion $Ar_2$ of the average inclination angle of the lens-surface peripheral region of the convex lens 121a to the average inclination angle of the lens-surface peripheral region of the spherical lens is set at about 1. For example, in the case of a convex lens 121a having a refractive index n of 1.5 for the wavelength range of the incident light, it is preferable that $Ar_1$ is within the range of 1.3 to 3.2 and $Ar_2$ is within the range of 0.6 to 1.1.

As described above, in this embodiment, the proportion of the flat region near the symmetry axis is reduced by regulating the radius of curvature $R_1$ of the convex lens 121a to a value smaller than the radius of curvature $R_2$ of the convex lens 121b paired therewith. The ratio between the radii of curvature $R_1$ and $R_2$ ($R_1/R_2$) is preferably within the range of 0.3 to 0.7, more preferably within the range of 0.4 to 0.6.

In this case, the radius of curvature $R_2$ of the convex lens 121b having a refractive index n≈1.5 is such that the ratio of $R_2$ to the XY-plane maximum width $W_{max}$ of the convex lens 121b preferably satisfies $R_2/W_{max}$≥0.5, more preferably $R_2/W_{max}$≥0.9. From such ranges of $R_2/W_{max}$, using formulae (4) and (5-2) shown above, $NA_2$ preferably satisfies $NA_2$≤0.33, more preferably $NA_2$≤0.19. In this case, $\theta_3=\arcsin(NA_2)$ is 10° or larger. Incidentally, $\theta_3$≈19° when $NA_2$=0.33, and $\theta_3$≈11° when $NA_2$=0.19. In this case, the $W_{max}$ may be within the range of 0.05 to 0.5 mm. In the case where a convex lens 121b having a refractive index n higher than 1.5 is used, $NA_2$ becomes large even in the case where $R_2/W_{max}$ is the same.

It is preferable that the conic constant $k_1$ of the convex lens 121a, which relates to the inclination angle of the lens-surface peripheral region, is a negative value smaller than the conic constant $k_2$ of the convex lens 121b paired therewith. Specifically, it is preferable that the conic constant $k_1$ is set in accordance with the radius of curvature $R_1$ so as to result in an inclination angle smaller than the lens-surface inclination angle of the aperture (peripheral portion) of a spherical convex lens having k=0. In this case, the conic constant $k_2$ of the convex lens 121b may be within the range of −3 to 0 (−3≤$k_2$≤0). Furthermore, for example, in the case where the refractive index n of the convex lens 121a is 1.5, the conic constant $k_1$ may be within the range of −3 to −7, and is more preferably within the range of −3 to −4.

The refractive angle $\theta_2$ of incident light parallel with the symmetry axis, in a portion of the convex lens 121a which has an inclination angle $\theta_1$, depends on the refractive index n, and the angle $|\theta_1-\theta_2|$ of the transmitted light passing through the homogenizer also changes. Consequently, in order to realize the same optical function as a conventional homogenizer using a light-transmitting material having different refractive index from that having a refractive index n≈1.5 in the case where the thickness of the homogenizer 12 and the widths (Wx and Wy) of the convex lens 121*a* and convex lens 121*b* are the same as in the conventional homogenizer, the sag values Z(r) of the convex lens 121*a* and convex lens 121*b* may be regulated such that the angle $|\theta_1-\theta_2|$ is the same as in the control homogenizer for comparison having a refractive index n≈1.5.

More specifically, the regulation of the sag values Z(r) of the convex lens 121*a* and convex lens 121*b* is attained by regulating the radii of curvature $R_1$ and $R_2$ and the conic constants $k_1$ and $k_2$ in the formula (2) in which all of $\alpha_1$ to $\alpha_4$ are 0.

The higher the refractive index n, the smaller the inclination angle of a portion of the convex-lens surface which has the same angle $|\theta_1-\theta_2|$ and the more the maximum sag value Sa of the convex lens 121*a* and the maximum sag value Sb of the convex lens 121*b* (see FIG. 3) can be reduced. Consequently, processability for producing the homogenizer 12 is improved. The refractive index n of the first convex-lens array 12*a* and second convex-lens array 12*b* may be, for example, 1.6 to 2.1. In this case, the light-transmitting substrate 10 on which the first convex-lens array 12*a* and the second convex-lens array 12*b* are to be formed may be a light-transmitting inorganic material differing in refractive index from the convex-lens arrays. For example, a light-transmitting dielectric having a refractive index n=2.1 may be disposed on both surfaces of a light-transmitting glass substrate having a refractive index n≈1.5 so as to form a first convex-lens array 12*a* having a maximum sag value Sa and a second convex-lens array 12*b* having a maximum sag value Sb.

Figure 4A:
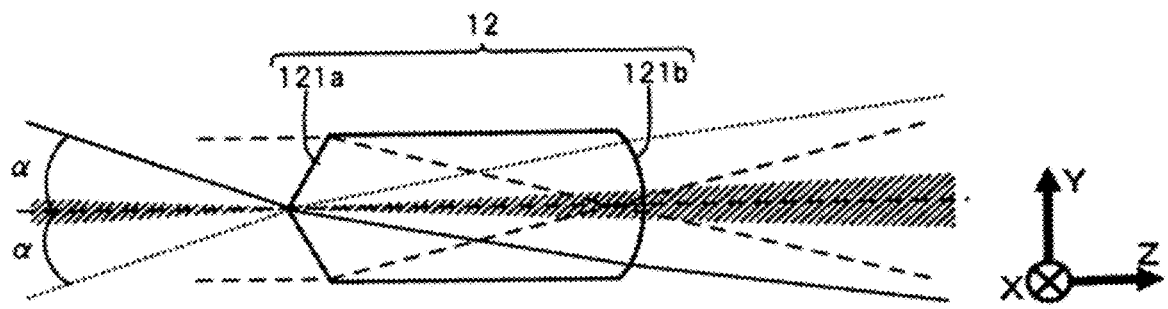
FIG. 4A, FIG. 4B and FIG. 4C are cross-sectional views showing a lens function of a pair of convex lenses.
Figure 4B:
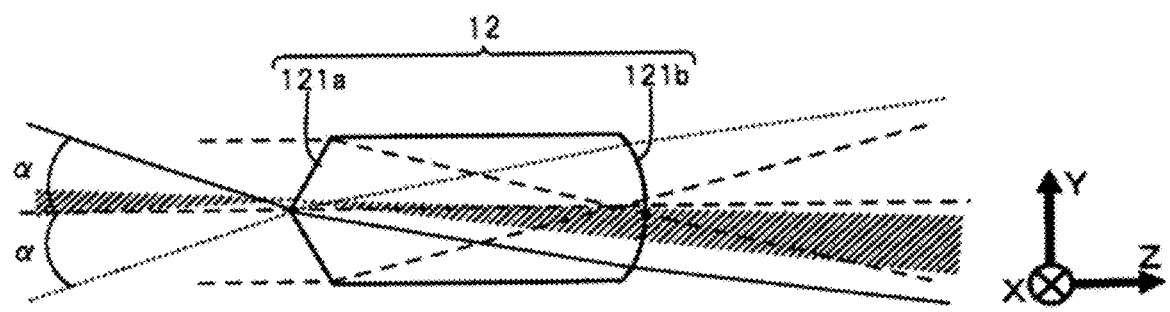
Figure 4C:
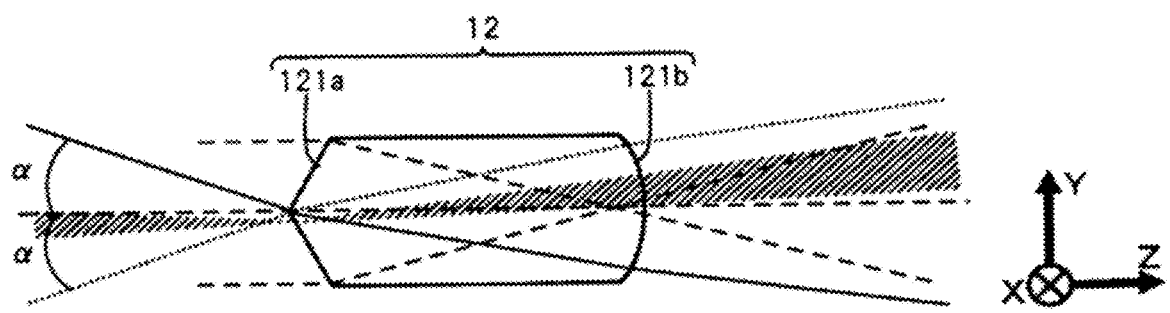

Next, the function of one pair of convex lenses in a homogenizer 12 is explained by reference to FIG. 4A, FIG. 4B and FIG. 4C. FIG. 4A to FIG. 4C are cross-sectional views showing the lens function of a pair of convex lenses (a convex lens 121*a* and a convex lens 121*b* paired therewith) of a homogenizer 12 according to this embodiment. FIG. 4A to FIG. 4C each show a noticeable optical path by hatching. FIG. 4A shows an example in which the convex-lens pair acts on an incident light flux which is approximately parallel with the symmetry axis and which strikes on the convex lens 121*a* at the position of the symmetry axis (lens-surface center). FIG. 4B and FIG. 4C each show an example in which the convex-lens pair acts on an incident light flux which is approximately parallel with the symmetry axis and which strikes on the convex lens 121*a* outside the symmetry axis.

As FIG. 4A shows, the light flux striking on the convex lens 121*a* at the position of the symmetry axis approximately in parallel with the symmetry axis is emitted from the paired convex lens 121*b* as divergent light having a narrow diffusion angle equal to those in conventional homogenizers, since the light flux enters the flat portion of the convex lens 121*a*. Meanwhile, the light flux striking on an inclined surface of the convex lens 121*a* which lies slightly outside the position of the symmetry axis, approximately in parallel with the symmetry axis, proceeds in a more outward direction (i.e., a direction resulting in a larger angle) because of the intense refractive function of the convex lens 121*a*, although the diffusion angle (degree of diffusion of the light flux) is the same, and enters a region in the paired convex lens 121*b* which lies more outside the symmetry axis, as shown in FIG. 4B and FIG. 4C. As a result, the light is emitted as divergent light having a larger diffusion angle, by the action of the paired convex lens 121*b*. In a conventional homogenizer in which a flat surface occupies a larger area around the symmetry axis in the lens surface, an incident light flux striking on a region of the convex lens 121*a* which lies outside the symmetry axis but near the symmetry axis approximately in parallel with the symmetry axis is emitted as light having a narrow diffusion angle similar to that shown in FIG. 4A.

As described above, in this embodiment, the convex lenses 121*a* each have a lens surface in which especially a region near the symmetry axis (lens-surface center region) has a larger inclination such that a light flux of incident diffused light which is approximately parallel with the symmetry axis of each convex lens 121*a* and which strikes on a lens surface near the symmetry axis is converted to (wider) divergent light having a larger diffusion angle than in conventional homogenizers and emitted from the paired convex lens 121*b*.

Figure 29A:
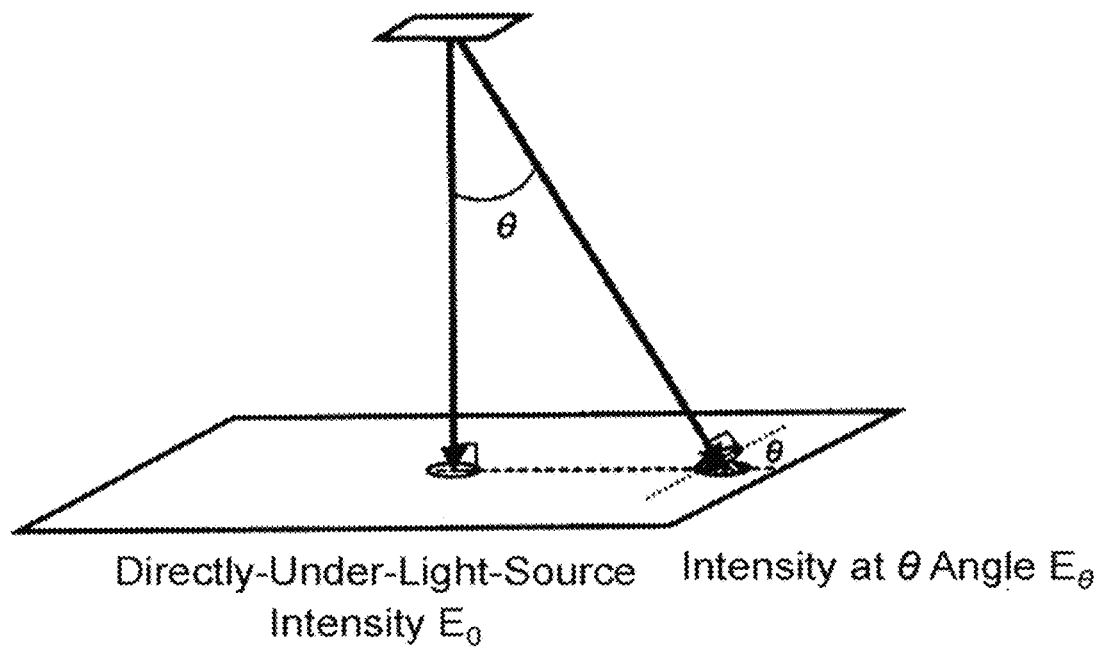
FIG. 29A and FIG. 29B are respectively a schematic view and a graph which show that a light flux emitted by diffusing micro surface light sources has light intensities according to the cosine fourth power law on an irradiation plane facing the emission surface of the light sources.
Figure 29B:
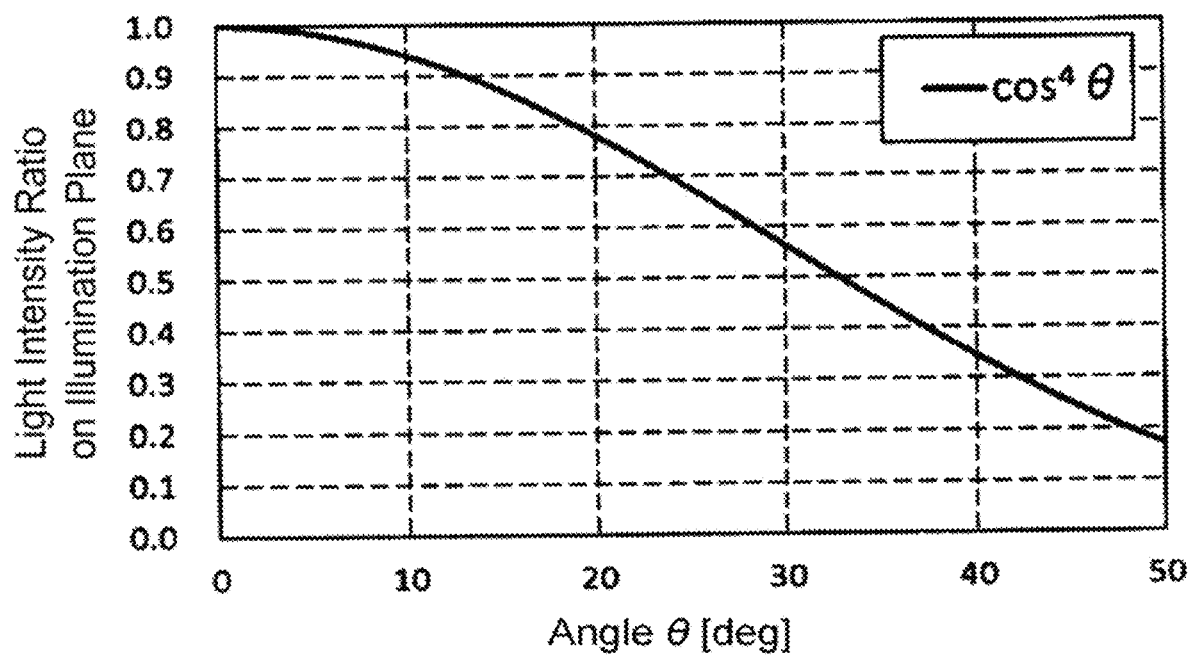

As shown by hatching in FIG. 4B and FIG. 4C, light-flux components which are linearly passing through regions near the symmetry axis in each convex lens 121*a* are converted to divergent light having a larger diffusion angle than conventional ones. This embodiment hence is effective in regulating a light-intensity distribution on an irradiation plane in the case of using an LD light source which emits light having a light-intensity distribution with a narrow light distribution angle, such as ones approximated to a Gaussian distribution in which the light intensity distribution is maximum at the center axis of a divergent light flux. Especially in the case where divergent light having a light-intensity distribution with a narrow light distribution angle is converted to wide-angle divergent light, by superimposing light emitted from a plurality of convex-lens pairs, to evenly illuminate a given irradiation plane, the light intensity of the light emitted from each convex lens 121*b* decreases in accordance with the cosine fourth power law as the radial-direction angle θ with the symmetry axis increases, as shown in FIG. 29B. Hence, the light-intensity distribution of the light emitted from each convex lens 121*b* tends to be one in which the light intensity decreases toward the periphery. Meanwhile, in the case where a homogenizer 12 according to this embodiment is used, the light-intensity distribution of the incident light to enter each convex lens 121*b* in regard to the light distribution angle of the incident light to enter the homogenizer 12 can be regulated by changing the lens-surface shape (in particular, the inclination angle of the center region) of the convex lens 121*a* paired with the convex lens 121*b* or by regulating the refractive index n for the wavelength range of the incident light entering the homogenizer 12 (in particular, a light flux entering near the symmetry axis can be more widely diffused in radial directions). Consequently, evenness can be improved.

For example, the center-region inclination angle (e.g., the radius of curvature $R_1$ or the conic constant $k_1$) or the refractive index n of the convex lenses 121*a* in the homogenizer 12 may be regulated such that an average of the in-lens transmission angle $|\theta_1-\theta_2|$ of incident light which enters the lens-surface center region of each convex lens 121*a* including the symmetry axis and which is parallel with the symmetry axis (hereinafter the average is referred to as "average in-lens transmission angle") is equal to or more than 1.3 times the average in-lens transmission angle in spherical lenses.

As demonstrated by Examples mentioned later, the homogenizer 12 according to this embodiment can convert incident light which, for example, is light emitted by a laser light source and having a Gaussian distribution with a maximum diffusion angle α of about 12° into emitted divergent light which has a maximum diffusion angle β of 12° or larger and has a light-intensity distribution of 85% or higher or 90% or higher on a given irradiation plane. The term "light-intensity distribution" herein means the light intensity at a position in a given irradiation plane which is the lowest in light intensity, the light intensity at the center being taken as 100%.

For example, considering converting incident light entering a homogenizer 12 and having a large diffusion angle (e.g., α≥10°) and emitting as divergent light which has the same or a larger diffusion angle (e.g., β≥10°) and which strikes evenly on an irradiation plane, a conventional lens-array pairs including spherical lenses are ineffective in obtaining an even intensity distribution on the irradiation plane. Meanwhile, with the lens shapes according to this embodiment, even emission over a wide angle can be attained for incident light having such a large diffusion angle.

Divergent light components of light which enters the first convex-lens array 12a are condensed so as to strike on regions outside the axes in the focal plane of the convex lenses 121a. However, the convex lenses 121a have a regulated lens surface shape such that the light is condensed so as to strike on the surfaces of the convex lenses 121b paired with the convex lenses 121a. This regulation is the same as in conventional homogenizers.

Embodiment 2

Figure 5A:
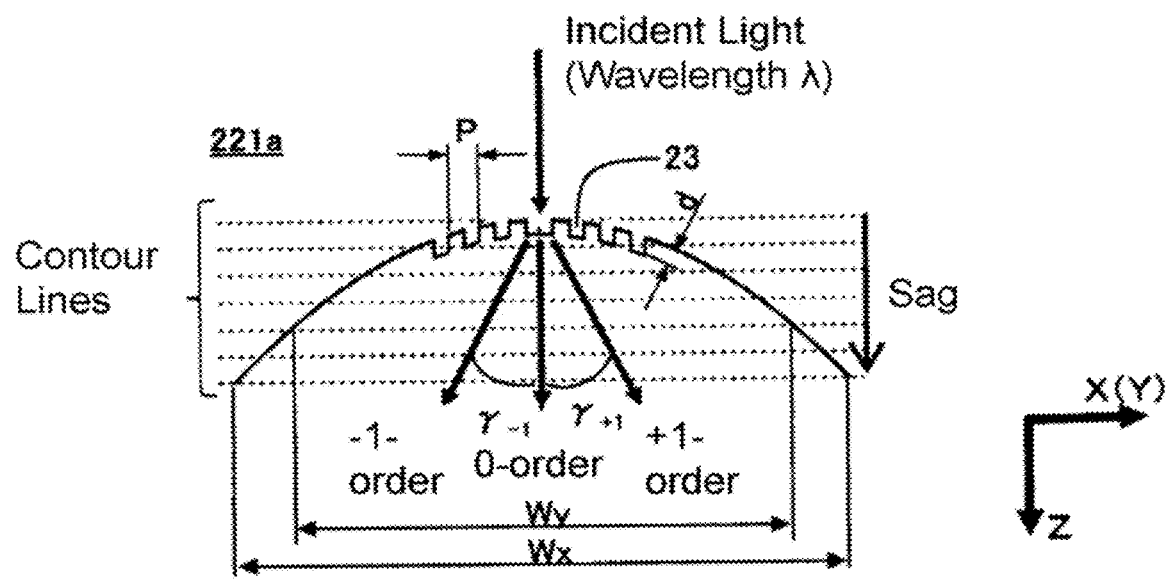
FIG. 5A and FIG. 5B are respectively a schematic cross-sectional view and a schematic plan view which show an example of convex lenses 221a of a homogenizer 22 according to a second embodiment.
Figure 5B:
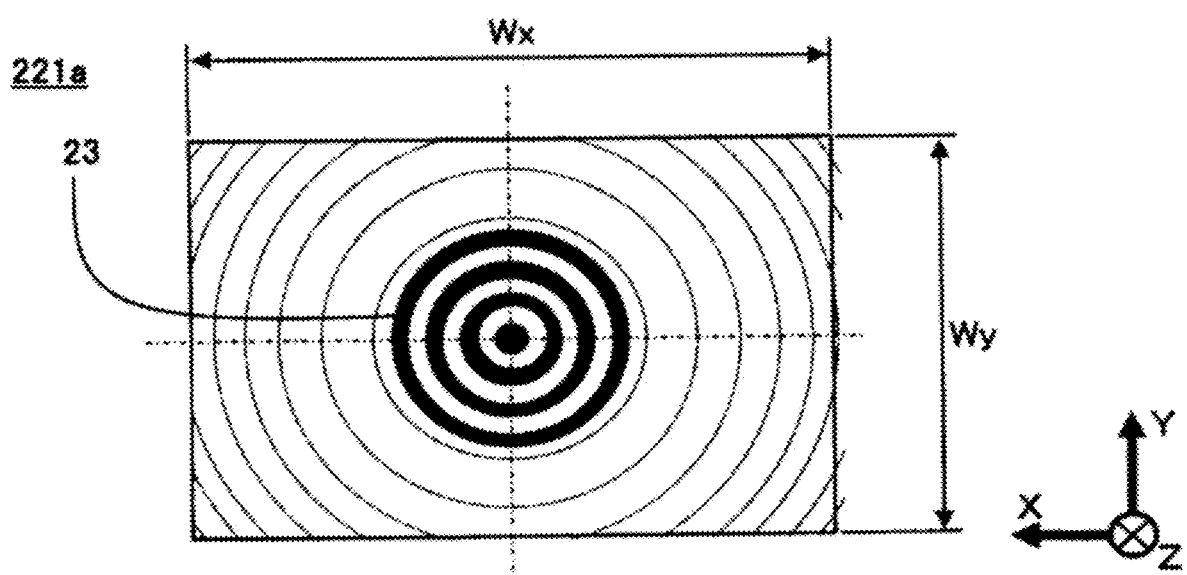

Next, a second embodiment of the present invention is explained. FIG. 5A and FIG. 5B are respectively a schematic cross-sectional view and a schematic plan view which show an example of convex lenses 221a constituting a first convex-lens array 22a of a homogenizer 22 according to the second embodiment. As FIG. 5A and FIG. 5B show, the homogenizer 22 according to this embodiment differs from the homogenizer 12 according to the first embodiment in the configuration and function of the convex lenses 221a constituting the light-entrance-side first convex-lens array 22a. The configurations and functions of a light-transmitting substrate 20 and convex lenses 221b constituting a light-emission-side second convex-lens array 22b are the same as those of the light-transmitting substrate 10 and the convex lenses 121b constituting the light-emission-side second convex-lens array 12b in the first embodiment.

The convex lens 221a according to this embodiment has a phase diffraction grating 23 formed in an approximately flat lens-surface region near the symmetry axis (e.g., a lens-surface center region). In FIG. 5A, a lens-surface depth (sag value) distribution of the convex lens 221a, based on the symmetry axis, is shown by contour lines (dotted lines). In FIG. 5B, recesses of the phase diffraction grating 23 which are concentric grooves formed in the surface of the convex lens 221a are indicated by thick black lines.

As FIG. 5A shows, light striking on the lens-surface center region of the convex lens 221a in the Z-axis direction is diffracted in the directions of diffraction angles $\gamma_m$ defined by the formula (6) in accordance with the period P of the recesses and protrusions of the phase diffraction grating 23 and with the wavelength λ of the incident light, and the diffracted light is transmitted through the light-transmitting substrate 20.

$$\sin(\gamma_m) = m \cdot \lambda / (n \cdot P) \quad (6)$$

In the formula (6), n is the refractive index of the convex lens 221a and m is the order of diffraction (integer). The formula (6) indicates that the diffraction angle $\gamma_m$ of m-order diffracted light can be regulated with the period P of the phase diffraction grating 23 and the refractive index n. Furthermore, by changing the depth d of the recesses of the phase diffraction grating 23, the phase difference $2\pi(n-n_0) \cdot d/\lambda$ between the light transmitted through the recesses and the light transmitted through the protrusions is changed, making it possible to regulate the diffraction efficiency of m-order diffracted light. Symbol $n_0$ is the refractive index of the recesses ($n_0$ is 1 in the case of air).

For example, in the case where the phase diffraction grating 23 is one in which the recesses and the protrusions have the same width and have a rectangular cross-sectional shape, this phase diffraction grating 23 gives diffracted light composed only of 0-order and odd-number-order diffracted light. In the case where the recess depth d is $\lambda/\{2(n-n_0)\}$, which results in a phase difference of π, the 0-order transmitted light is minimal and the ±1-order diffraction efficiency is about 40% at the most. The efficiency for diffracted light produced by odd-number-order diffraction where |m|≥3 is a value obtained by multiplying the ±1-order diffraction efficiency by $m^{-2}$. By regulating the recess depth d so as to result in a phase difference of 0-π, the quantity of 0-order transmitted light and that of ±1-order diffracted light can be regulated.

Figure 6:
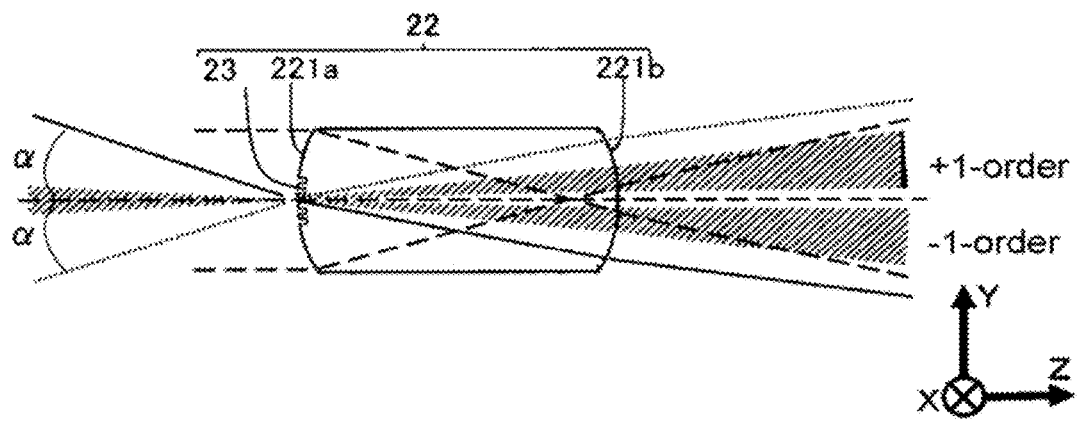
FIG. 6 is a view schematically illustrating the function of a pair of convex lenses (a convex lens 221a and a convex lens 221b paired therewith) whereby incident light parallel with the symmetry axis is transmitted.

As shown in FIG. 6 by hatching, a light flux striking on a lens-surface region near the symmetry axis of the convex lens 221a in parallel with the symmetry axis is diffracted by the diffractive function of the phase diffraction grating 23 to proceed more outward directions (i.e., directions in a larger angle), and then strikes on the paired convex lens 221b in a region lying more outwardly apart from the symmetry axis. As a result, the light is emitted as divergent light having a larger diffusion angle, by the convex lens 221b. FIG. 6 shows a flux of ±1-order diffracted light emitted in the case where the phase diffraction grating 23 has a phase difference of π. By setting the phase difference of the phase diffraction grating 23 at a value within the range of 0 to π, a flux of 0-order transmitted light is also produced and the ratio between the quantities of the 0-order transmitted light and ±1-order diffracted light can be changed. Thus, it is possible to regulate the light-intensity distribution of light to strike on the lens surface of the convex lens 221b (that is, light-intensity distribution at the entrance position corresponding to a diffusion angle) and to regulate a light-intensity distribution on an irradiation plane.

That is, in the homogenizer 22 according to this embodiment, the light-intensity distribution of light which is to enter each convex lens 221b of the homogenizer 22 on which light having a light distribution angle strikes can be regulated with the phase diffraction grating 23. Evenness can hence be improved.

In the example shown in FIG. 5A and FIG. 5B, the recesses and protrusions of the phase diffraction grating 23 are concentric ones disposed at a certain period P, with the symmetry axis of the convex lens 221a as the center. However, it is possible to change the period P along the radial directions to regulate the diffraction angle. Furthermore, it is possible to heighten the diffraction efficiency for specific diffraction orders by employing a blaze diffraction grating including recesses having a serrate cross-sectional shape or a pseudo-blaze diffraction grating in which the serration are divided into steps.

For example, the phase diffraction grating 23 may be designed such that the optical function obtained by the homogenizer 12 according to the first embodiment, which employs the convex lenses 121a, can be attained with the homogenizer 22 according to the second embodiment which employs the convex lenses 221a.

As shown in FIG. 3, in the homogenizer 12 according to the first embodiment, light which has struck on the convex lens 121a at a position having radial distance r in parallel with the symmetry axis is transmitted through the homogenizer in a direction having an angle $|\theta_1-\theta_2|$ with the symmetry axis, by the refractive function of the convex lens 121a. Consequently, in order to obtain the same effect with the homogenizer 22 according to the second embodiment, when a center region of a convex lens 221a where the phase diffraction grating 23 is to be formed is expressed by $0 \leq r/(W_{max}/2) \leq \chi$ (where $0<\chi \leq 0.5$), the shape of the phase diffraction grating 23 and the average inclination angle of the lens-surface peripheral region are regulated such that the angle $|\theta_1-\theta_2|$ at which light rays are transmitted through the homogenizer by the refractive and diffractive functions of the convex lens 221a is equal to the angle $|\theta_1-\theta_2|$ in the homogenizer employing the convex lens 121a.

A phase diffraction grating 23 produces diffracted light attributed to a plurality of diffraction orders m (m=0, ±1, ±2, . . . ) in accordance with the cross-sectional shape of the phase diffraction grating 23 and the depth of the grating. Hence, in the case where the phase diffraction grating 23 generates a plurality of angles $|\theta_1-\theta_2|$ at which light rays are transmitted through the homogenizer, this phase diffraction grating 23 may be configured such that an average angle $|\theta_1-\theta_2|$ determined by taking account of the diffraction efficiencies of the diffraction orders is equal to the angle $|\theta_1-\theta_2|$ in the homogenizer employing the convex lens 121a. The blaze phase diffraction grating or pseudo-blaze phase diffraction grating in which the diffraction efficiency for a specific diffraction order m (m≠0) is 80% or higher functions as the case where both a refracting lens and a diffracting lens are used. Since the phase diffraction grating 23 is employed for the purpose of reducing the proportion of rectilinear transmitted-light components in the center region of the convex lens 221a, $\chi$ is more preferably $0.05 \leq \chi \leq 0.3$.

Besides the homogenizers according to the first and second embodiments, any homogenizer may have a similar evenly diffusing/illuminating function so long as the convex lenses constituting the light-entrance-side first convex-lens array each has a surface shape which converts some of rectilinear transmitted light striking on a surface region near the symmetry axis of the convex lens (in particular, an approximately flat region) to diffused light (that is, to light which strikes on the lens surface of each of the light-emission-side convex lenses paired with the light-entrance-side convex lenses, at a position outside the symmetry axis).

Third Embodiment

The homogenizers (12 and 22) according to the first and second embodiments are each configured of a first convex-lens array (12a or 22a) and a second convex-lens array (12b or 22b) each obtained by arraying convex lenses which each have a lens surface symmetric with respect to the axis and have an XY-plane outer shape that is quadrilateral (Wx× Wy). Because of this, the convex-lens surface has a maximum diameter and a maximum depth (maximum sag value) along diagonal directions of the quadrilateral shape. In the case where the outer shape is square (W=Wx=Wy), the maximum width ($W_{max}$) of each convex lens is expressed by the formula (7). Spherical lenses have a lens depth being twice as compared with the directions of the sides (X axis and Y axis) of the square.

[Math. 2]

$$W_{max}=\sqrt{(Wx^2+Wy^2)}=2 \cdot W \qquad (7)$$

Furthermore, in each convex-lens array, quadrilateral convex lenses each having a maximum inclination angle at the corners are arranged such that four convex-lens surfaces discontinuously meet each other to form a structure having a maximum sag value. It is hence difficult to precisely perform processing for forming a lens shape, and the processing is prone to result in recessed surface regions where the inclination angle changes continuously. As a result, especially in the case where it is desired to evenly illuminate an irradiation plane with light having such a wide diffusion angle that maximum diffusion angle $\beta \geq 15°$, a homogenizer having the desired properties may not be obtained. In order to overcome such problem, a homogenizer 32 according to a third embodiment employs cylindrical-lens arrays having convex-lens cross-section shapes which are symmetric with respect to a plane (that is, arrays of convex cylindrical lenses).

Figure 7:
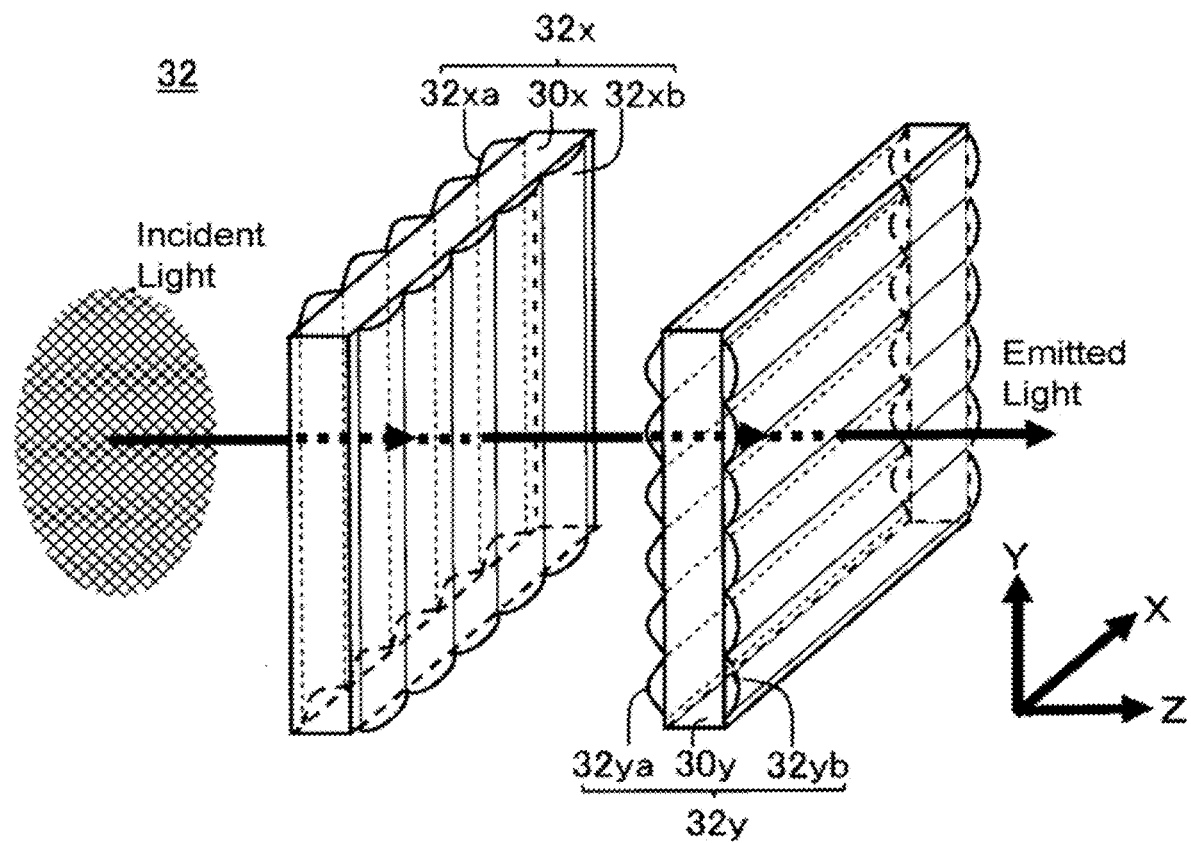
FIG. 7 is a slant view of a homogenizer 32 according to a third embodiment.

FIG. 7 is a slant view of the homogenizer 32 according to the third embodiment. As FIG. 7 shows, the homogenizer 32 according to this embodiment includes a pair of homogenizers including a homogenizer (convex-lens array pair) 32x for X axis, which has a lens power only in the X-axis direction, and a homogenizer (convex-lens array pair) 32y for Y axis, which has a lens power only in the Y-axis direction. The homogenizer 32x and the homogenizer 32y are disposed serially in the optical-axis direction, which is the light transmission direction, such that the lens-function axis directions of these differ from each other by 90°. The lens power is also called lens function.

Figure 8A:
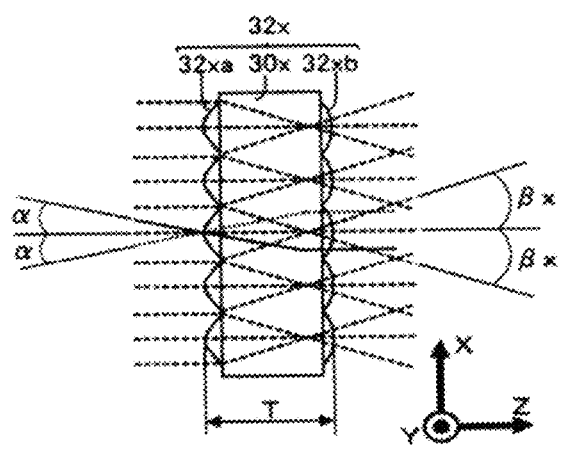
FIG. 8A and FIG. 8B are respectively a cross-sectional view and a plan view which show an example of a homogenizer 32x.
Figure 8B:
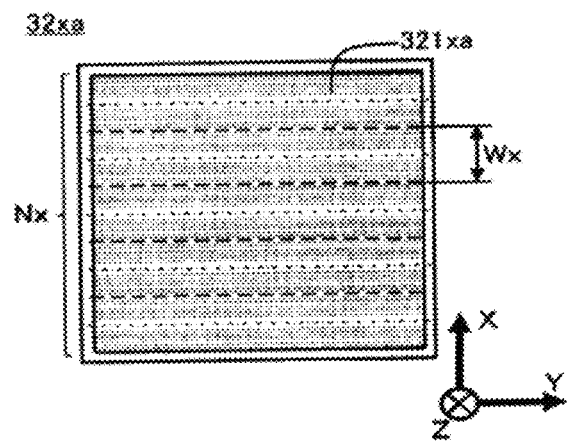
Figure 9A:
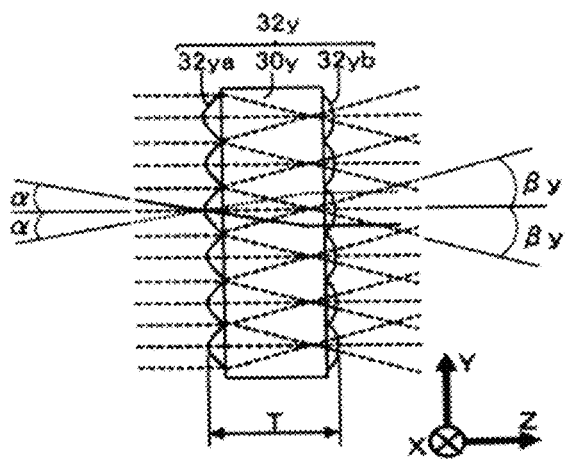
FIG. 9A and FIG. 9B are respectively a cross-sectional view and a plan view which show an example of a homogenizer 32y.
Figure 9B:
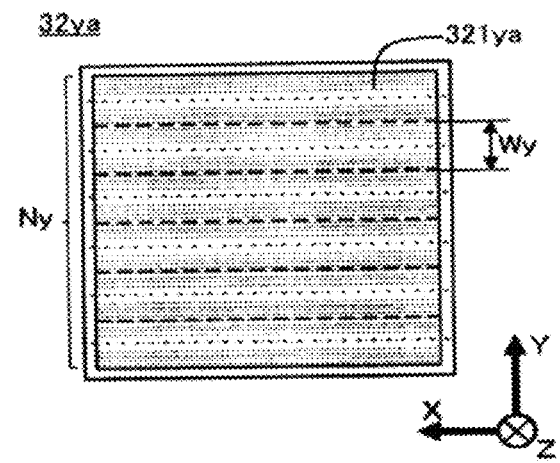

FIG. 8A and FIG. 8B are respectively a cross-sectional view and a plan view which show an example of the homogenizer 32x. FIG. 9A and FIG. 9B are a cross-sectional view and a plan view which show an example of the homogenizer 32y.

As FIG. 8A and FIG. 8B show, the homogenizer 32x includes a light-transmitting substrate 30x having a flat-plate shape, and a first cylindrical-lens array 32xa and a second cylindrical-lens array 32xb, which each have convex-lens cross-sectional shapes that are symmetric with respect to a plane and which are disposed respectively on two surfaces (first surface and second surface) of the light-transmitting substrate 30x. The first cylindrical-lens array 32xa and the second cylindrical-lens array 32xb have XZ cross-sections that are convex-lens array cross-sections similar to those of the first convex-lens array 12a and second convex-lens array 12b of the homogenizer 12 according to the first embodiment. However, the first and second cylindrical-lens arrays 32xa and 32xb have no lens power in the YZ cross-sections.

Meanwhile, as FIG. 9A and FIG. 9B show, the homogenizer 32y includes a light-transmitting substrate 30y having a flat-plate shape, and a first cylindrical-lens array 32ya and a second cylindrical-lens array 32yb, which each have convex-lens cross-sectional shapes that are symmetric with respect to a plane and which are disposed respectively on two surfaces (first surface and second surface) of the light-transmitting substrate 30y. The first cylindrical-lens array 32ya and the second cylindrical-lens array 32yb have YZ cross-sections that are convex-lens array cross-sections similar to those of the first convex-lens array 12a and second convex-lens array 12b of the homogenizer 12 according to the first embodiment. However, the first and second cylindrical-lens arrays 32ya and 32yb have no lens power in the XZ cross-sections.

Examples of a convex lens include a convex cylindrical lens in a broad sense. Hereinafter, an array of convex cylindrical lenses is often called a convex-lens array. In each of the homogenizers 32x and 32y: the cylindrical lenses, which correspond to convex lenses of the first cylindrical-lens array disposed on the light entrance side, are often called first convex lenses; the cylindrical lenses, which correspond to convex lenses of the second cylindrical-lens array disposed on the light emission side, are often called second convex lenses; and a cross-section of each of these convex lenses which is perpendicular to the base-line direction is often called a lens cross-section and the position of a symmetry plane in the lens cross-section is often called a symmetry axis (in the lens cross-section).

In this embodiment, divergent light from a light source first enters the homogenizer 32x, and this light is made, by the homogenizer 32x, to have an even X-axis-direction light-intensity distribution on an irradiation plane, and then the light enters the homogenizer 32y. The light which has entered the homogenizer 32y is made, by the homogenizer 32y, to have an even Y-axis-direction light-intensity distribution on the irradiation plan, and then the light is emitted. As a result, an evenly diffusing/illuminating function similar to that of the homogenizer 12 of the first embodiment is obtained.

The sequence of Z-axis-direction arrangement of the homogenizers 32x and 32y is not particularly limited. Namely, either the homogenizer 32x or the homogenizer 32y may be on the light entrance side. The smaller the gap between the homogenizer 32x and the homogenizer 32y, the more preferable, from the viewpoint of reducing the size of the homogenizer 32. In the cylindrical lenses 321 (specifically, 321xa, 321xb, 321ya, and 321yb) constituting the cylindrical-lens arrays of the homogenizers 32x and 32y, the lens widths (Wx and Wy in the figures) are preferably set such that four or more cylindrical lenses, more preferably five or more cylindrical lenses, still more preferably seven or more cylindrical lenses, are included along the X direction or the Y direction in the plane where each cylindrical lens array is formed, in accordance with the beam diameter of the light to enter the homogenizers 32x and 32y.

In this embodiment, the cylindrical lenses (321xa, 321xb, 321ya, and 321yb) of the cylindrical-lens arrays (32xa, 32xb, 32ya, and 32yb) can be made to have a reduced maximum depth (sag value) and a reduced lens-surface maximum inclination angle. In addition, since the lens boundaries, where convex-lens surfaces meet each other discontinuously, can be linear, a lens shape of optimal design can be precisely formed. Consequently, a homogenizer to attain the desired wide-angle diffusion and even illumination is easily obtained.

Another example of the configuration of the cylindrical-lens arrays 32xa and 32ya, which are disposed on the light entrance side of the substrates, may be one in which an approximately flat surface region near the symmetry plane of each cylindrical lens (321xa or 321ya), for example a region corresponding to a lens-surface center region in a cross-section perpendicular to the base-line direction of the lens (hereinafter referred to simply as "lens-surface center region"), has a phase diffraction grating formed therein which includes recess grooves linearly extending in parallel with the symmetry plane. The lens-surface center region in the cylindrical lens may be a region where the radial distance r from the position of the symmetry plane in a cross-section perpendicular to the base-line direction of the lens is equal to or less than 50% of the maximum radial distance W/2 from the position ($0 \leq r \leq W/4$), or may be a region which satisfies $0 \leq r/(W/2) \leq \chi$ where $\chi$ is within the range of $0 < \chi \leq 0.5$.

In other words, another example of the homogenizer 32x according to this embodiment may be one in which the first cylindrical-lens array 32xa and the second cylindrical-lens array 32xb are cylindrical-lens arrays which have XZ cross-sections that are lens cross-sections similar to those of the first convex-lens array 22a and second convex-lens array 22b of the homogenizer 22 according to the second embodiment but which have no lens power in the YZ cross-sections. Furthermore, another example of the homogenizer 32y may be one in which the first cylindrical-lens array 32ya and the second cylindrical-lens array 32yb are cylindrical-lens arrays which have YZ cross-sections that are lens cross-sections similar to those of the first convex-lens array 22a and second convex-lens array 22b of the homogenizer 22 according to the second embodiment but which have no lens power in the XZ cross-sections.

In the case where the homogenizers 32x and 32y are configured thus, an evenly diffusing/illuminating function similar to that of the second embodiment is obtained.

[Other Configurations of the Homogenizers]

It is preferable, in each of the homogenizers according to the embodiments described above, that in order to reduce Fresnel reflection, which occurs due to a difference in refractive index, an antireflection film (not shown) based on a common dielectric multilayer-film design in accordance with the wavelength of the incident light and the incidence angle range is formed on lens surfaces in contact with air (for example, the surfaces of the following lens arrays which are in contact with air: the first convex-lens array 12a, first convex-lens array 22a, first cylindrical-lens array 32xa, first cylindrical-lens array 32ya, second convex-lens array 12b, second convex-lens array 22b, second cylindrical-lens array 32xb, and second cylindrical-lens array 32yb).

Furthermore, in each of the homogenizers according to the embodiments described above, the smaller the width of the boundary portion between adjoining convex lenses, the less the occurrence of stray light, which adversely affects the intensity distribution on irradiation planes. The width of the boundary portion is the distance G between inflection points in the boundary portion at which the area the change in lens-surface inclination angle with the radial distance increases shifts to the area in which the change decreases or vice versa. Specifically, the proportion of the G to the width W (Wx or Wy) of each lens, G/W, is preferably 10% or less, more preferably 5% or less, still more preferably 3% or less, especially preferably 2% or less. The distance G is preferably 10 μm or less. In particular, in the light-entrance-side first convex-lens arrays (the first convex-lens arrays 12a and 22a and the first cylindrical-lens arrays 32xa and 32ya), the distance G, which is the width of the boundary portion between adjoining convex lenses, is more preferably 5 μm or less.

In the homogenizers according to the embodiments described above, the widths W (Wx and Wy) of each convex lens are preferably within the range of 20 μm to 500 μm from the viewpoints of illuminator size reduction and even illumination, and are more preferably within the range of 50 μm to 200 μm. Furthermore, the distance T between the first convex-lens array and the second convex-lens array, which corresponds to the thickness of the homogenizer, is set approximately in proportion to the widths W of the convex lenses and is preferably 50 μm to 3,000 μm. From the viewpoint of stably forming a convex-lens array shape on each of both surfaces of a light-transmitting substrate, the T is more preferably within the range of 100 μm to 1,000 μm.

Figure 24A:
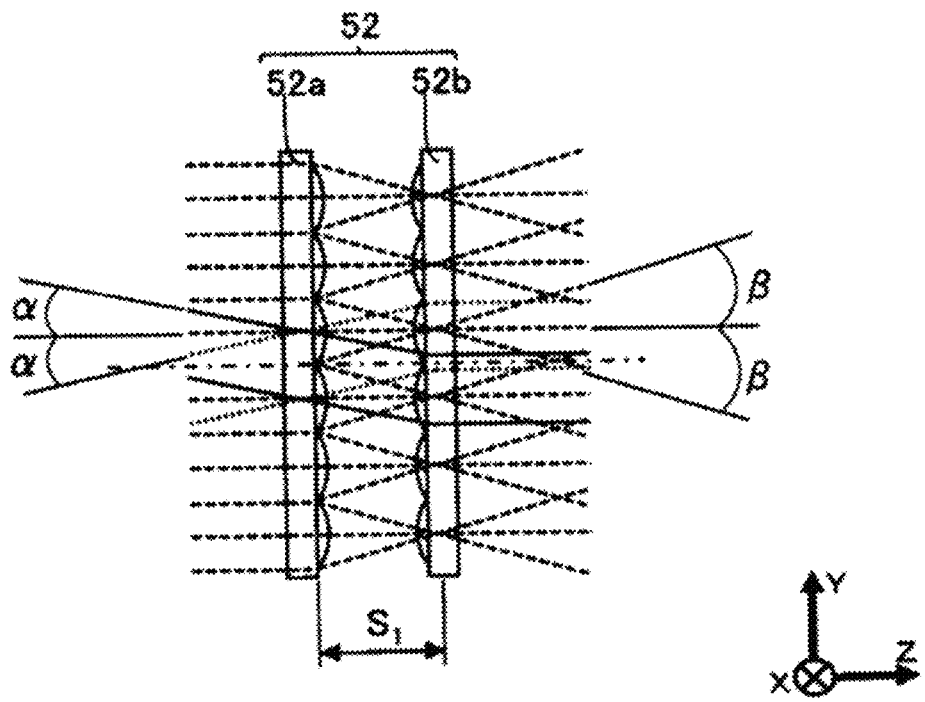
FIG. 24A and FIG. 24B are views which illustrate a more detailed example of the configuration of a homogenizer 52.
Figure 24B:
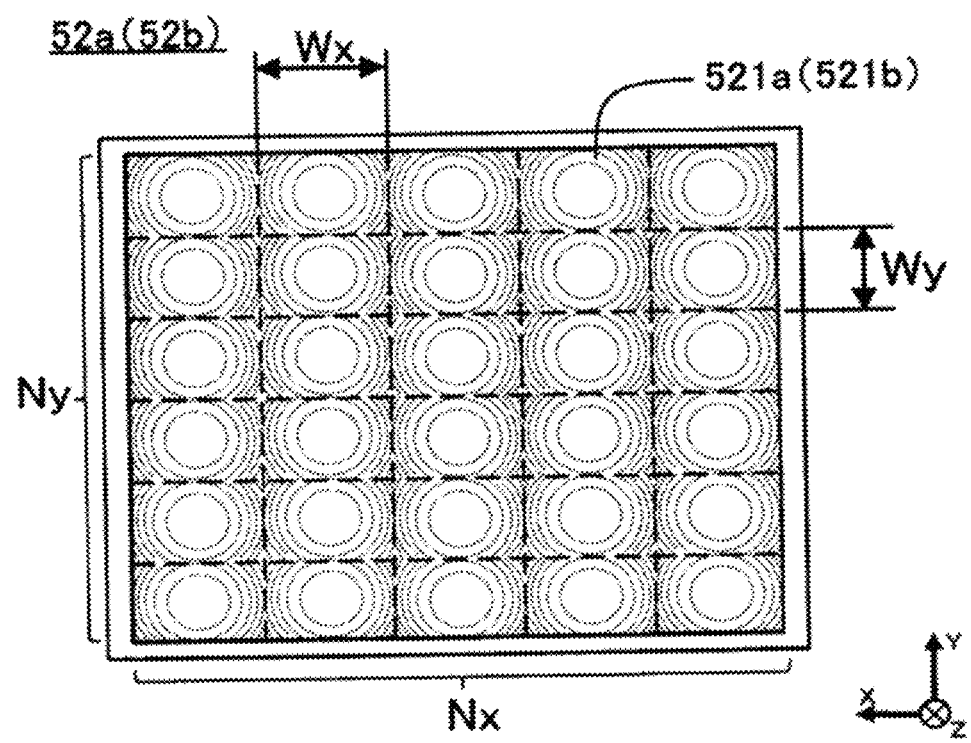
Figure 25A:
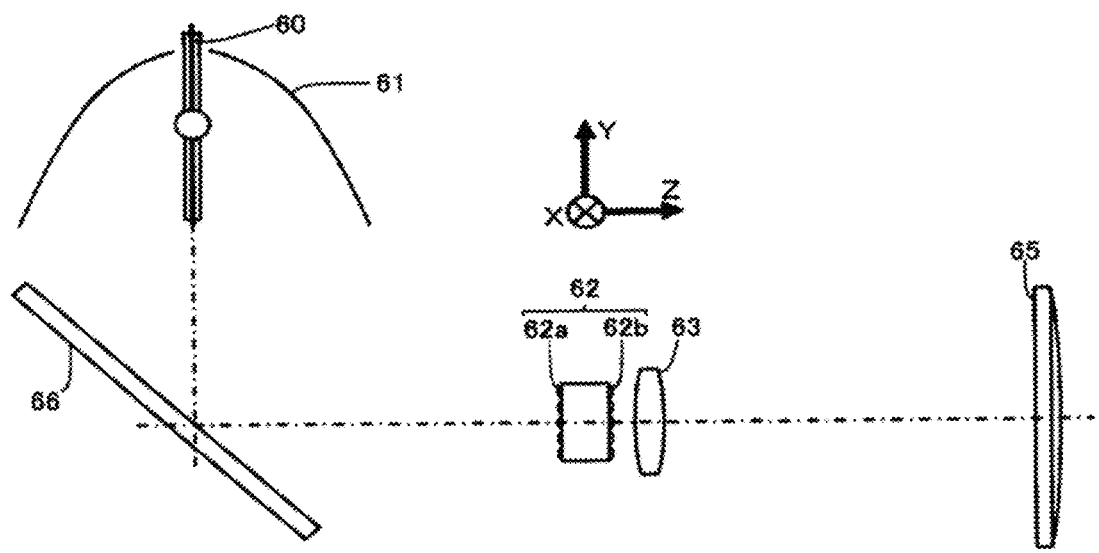
FIG. 25A and FIG. 25B are cross-sectional views showing one example of illuminating optical systems for use in ultraviolet exposure devices.
Figure 25B:
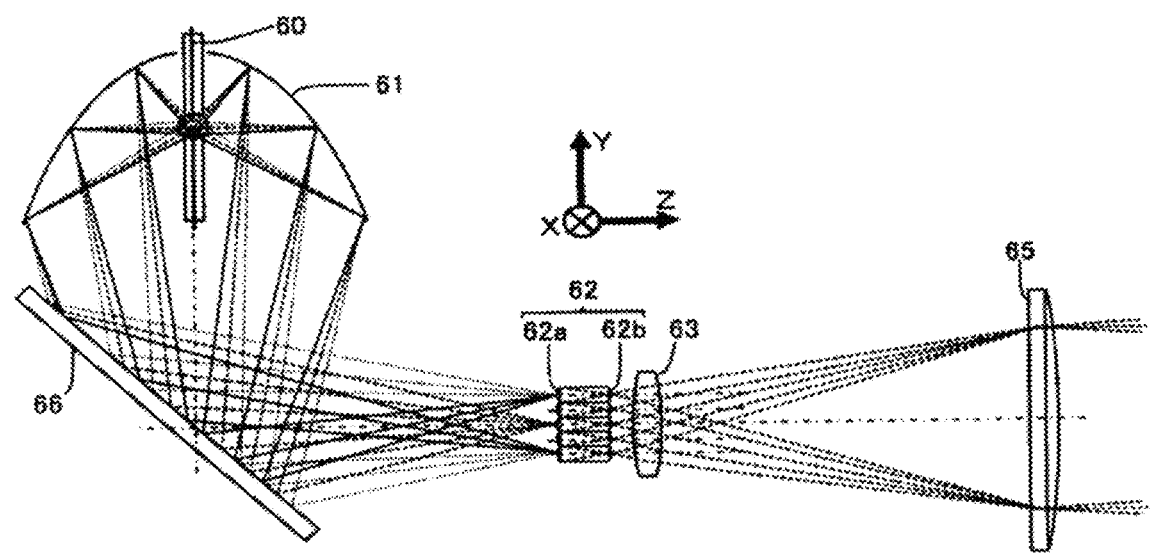
Figure 26A:
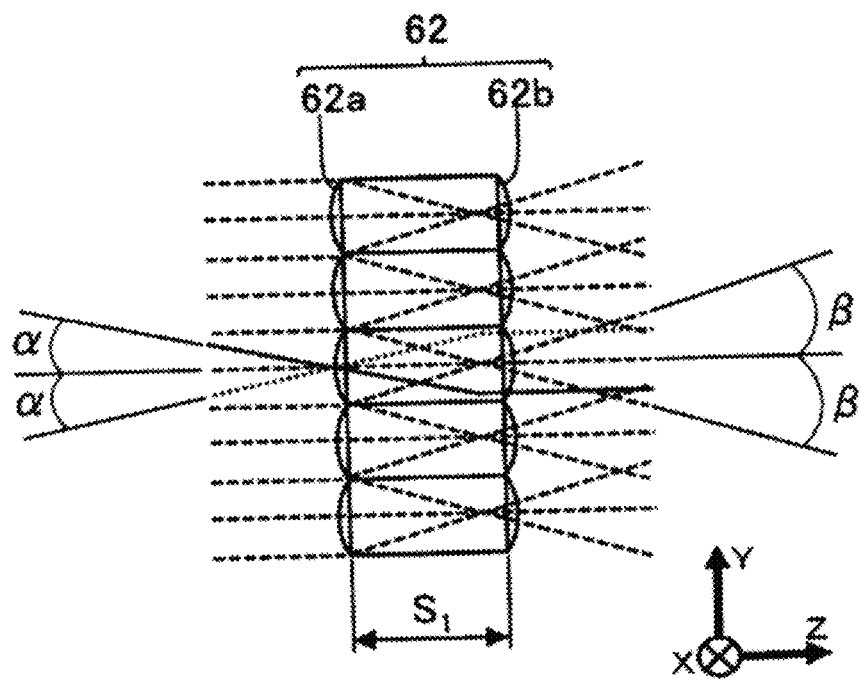
FIG. 26A and FIG. 26B are views which illustrate a more detailed example of the configuration of a homogenizer 62.
Figure 26B:
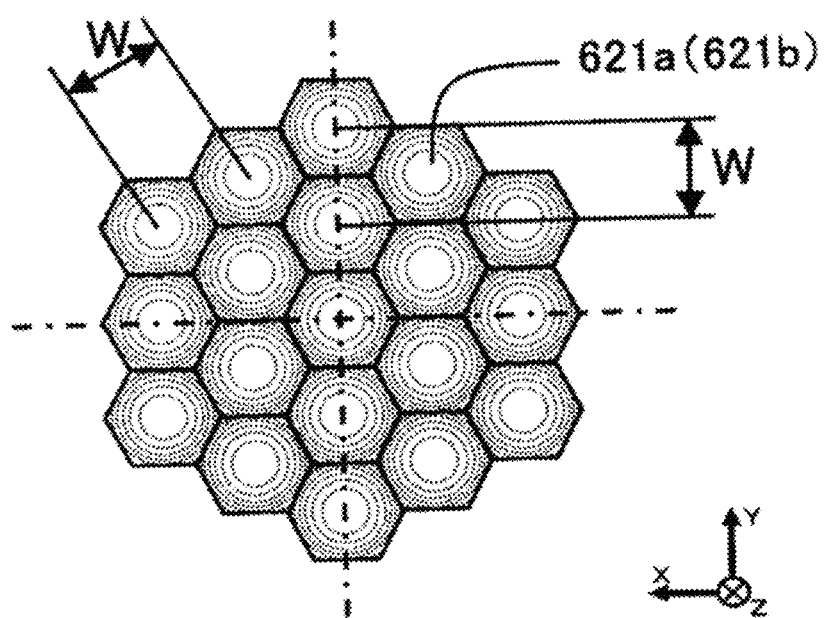
Figure 27:
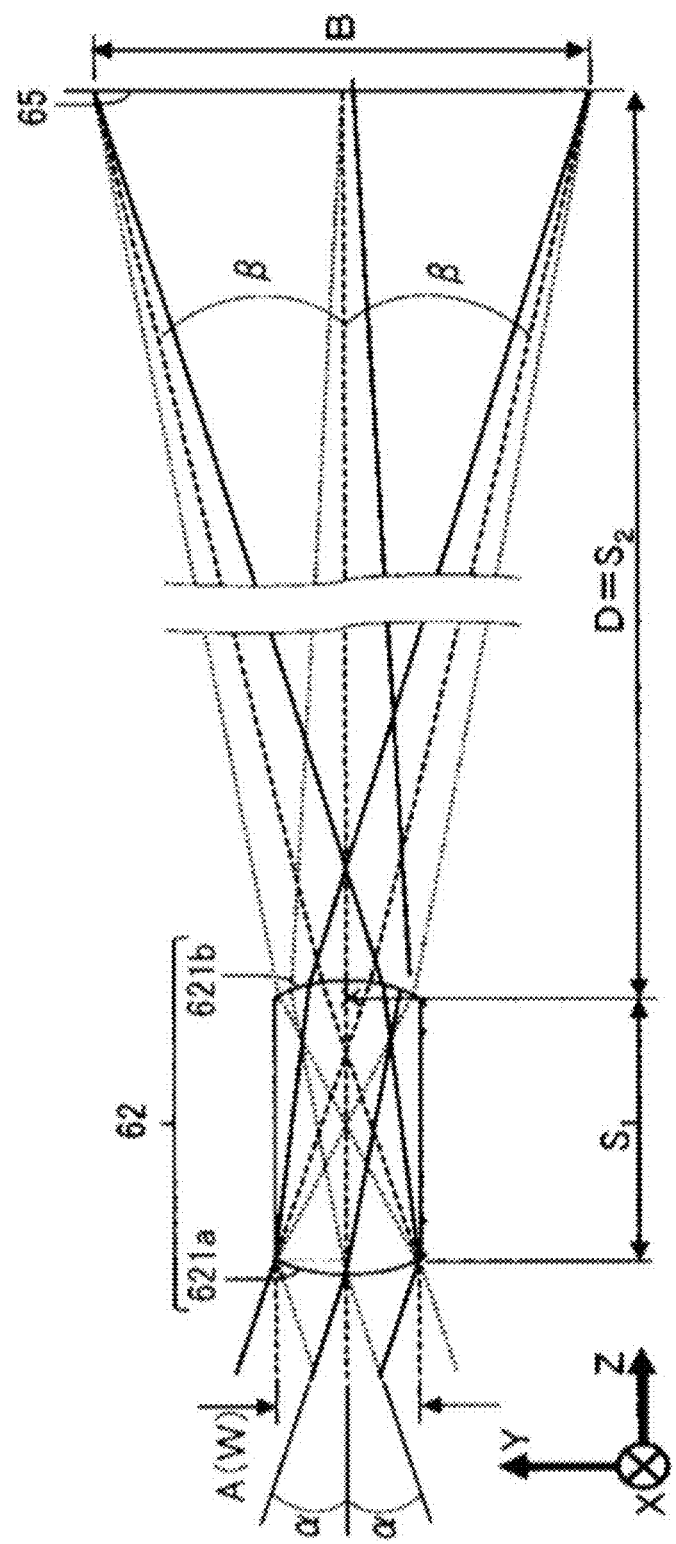
FIG. 27 is a view illustrating a relationship between the entrance and emission surfaces of a pair of convex lenses (pair of convex lenses 621a and 621b) in the homogenizer 62 and an irradiation plane.

In each of the embodiments shown above, the homogenizer includes a pair of convex-lens arrays configured by disposing a convex-lens array on each of both surfaces of a light-transmitting substrate 10 having a refractive index n, from the viewpoint of ease of optical-axis alignment. However, the homogenizer may have, for example, a configuration including two light-transmitting substrates which each have a convex-lens array formed on one surface thereof and which are disposed such that the two lens surfaces face each other inward, such as that shown in FIG. 24A. Even in such a case, the convex-lens array disposed on the light entrance side is referred to as a first convex-lens array and the convex-lens array disposed on the light emission side is referred to as a second convex-lens array. Although the two convex-lens arrays are apart from each other, this homogenizer is configured such that the first convex lenses, which are the convex lenses of the first convex-lens array, and the second convex lenses, which are the convex lenses of the second convex-lens array, face each other and share symmetry axes, and constitute convex-lens pairs.

However, in the configuration shown above, the average internal transmission angle $|\theta_1-\theta_2|$ of the first convex lenses is defined as a relationship between the incidence angle $\theta_1$ and the emission angle $\theta_2$ on the lens surface of the first convex lens with respect to light entering the first light-transmitting substrate having a refractive index n, on which the first convex-lens array is formed, in parallel with the symmetry axis. Consequently, the "internal" in the term "average internal transmission angle" in this case indicates the inside of a pair of convex-lens arrays which is regarded as one optical member.

Embodiment 4

Figure 10:
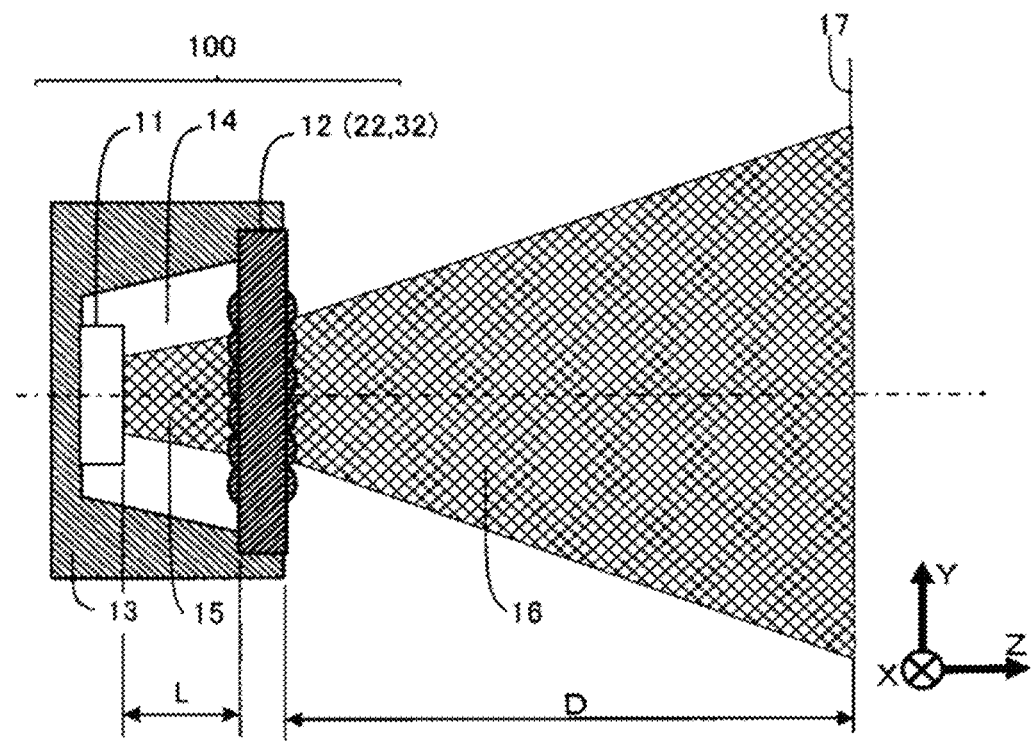
FIG. 10 is a cross-sectional view showing an example of an illuminator 100 according to a fourth embodiment.

Next, an illuminator employing the homogenizers described above is explained as a fourth embodiment of the present invention. FIG. 10 is a cross-sectional view showing an example of the illuminator 100 according to the fourth embodiment. As FIG. 10 shows, the illuminator 100 according to this embodiment includes a package 13, a laser light source 11 mounted and fixed in the package 13, and a homogenizer 12 which is disposed on the emission side of the package and on which a light flux 15 emitted by the laser light source 11 strikes. FIG. 10 shows the homogenizer 12 according to the first embodiment as an example of optical elements for converting the light flux 15 emitted by the laser light source 11 into more widely diffused divergent light 16, which performs even illuminating on an irradiation plane 17, and emitting the divergent light 16. However, the optical element may be the homogenizer 22 according to the second embodiment or the homogenizer 32 according to the third embodiment.

From the viewpoint of enabling the laser light source 11 to work stably and retain long-term reliability, it is preferable that the illuminator 100 employs a package material and a homogenizer having high heat resistance and high heat dissipation property, and that the laser light source 11 is airtightly enclosed in the package 13. It is more preferable in the illuminator 100 that the inside of the package 13 is filled with an inert gas 14, e.g., dry nitrogen, according to need. In FIG. 10, a power source and electrical wiring for supplying electrical voltage/current to the laser light source 11, a heat sink for cooling the laser light source 11 and the like are omitted.

In the illuminator 100, the laser light source 11 emits a light flux 15 having a Gaussian light-intensity distribution with a maximum diffusion angle δ. The light flux 15 is transmitted, as such, as the light flux 15 having a maximum incidence angle α (=δ) through the homogenizer 12 to become divergent light 16 having a maximum diffusion angle β, and then strikes on an irradiation plane 17 to attain an even light-intensity distribution thereon.

Although FIG. 10 shows an example of the illuminator 100 in which the homogenizer 12 is integrated with the package 13, the illuminator 100 can be configured such that a package 13 and a homogenizer 12 are separately disposed.

As the laser light source 11, an LD which emits light having a specific wavelength in the wavelength range of 300 nm to 2,000 nm is suitably used because an LD is small and has a high luminance. The laser light source 11 may have a single laser light emission point, or may be a laser-array light source including a plurality of light emission points disposed in an array arrangement. A surface-emitting laser (VCSEL), by which a plurality of laser light emission points can be highly densely integrated efficiently in producing the laser, is suitably used as the laser light source 11 of the illuminator 100 for large illumination areas because the intensity of the laser light to be emitted can be controlled to increase by increasing the number of emission points. Although typical surface-emitting lasers emit light having wavelengths in the near infrared range of 780 nm to 1,300 nm, it is possible to convert such a surface-emitting laser into a laser light source for emitting light in the visible light wavelength range of 400 nm to 700 nm, by using a nonlinear optical crystal to conduct a wavelength conversion.

As the laser light source 11, a laser light source obtained by arraying semiconductor chips of a Fabry-Pérot LD, in which laser active layers having an optical waveguide structure are used to constitute an etalon resonator structure based on reflection at the ends of the waveguides, may be used. The Fabry-Pérot LD has an advantage in that a high light output is obtained by increasing the width of the optical waveguide structure of laser active layers and that a laser light source emitting light having a wavelength in an ultraviolet to green range is obtained therefrom by using a GaN crystal system.

The light emitted by LDs typically has an uneven distribution approximated to a Gaussian light-intensity distribution. In the case of a surface-emitting laser, the emitted light has an axially symmetrical emission-angle light-intensity distribution and has an FFP (total angle of emission where the light intensity ratio is $e^{-2}$ of the maximum light intensity at the center of the symmetry axis) of about 9° to 20°. In the case of a Fabry-Pérot laser, the laser active layer has different cross-sectional shapes and the emitted light hence has a Gaussian light-intensity distribution in which the FFP along the horizontal direction (H) in the plane of the optical waveguide is different from that along the vertical direction (V); the FFP(H) is about 6° to 15° and the FFP(V) is about 20° to 40°. A relationship between the maximum emission angle δ and the FFP is FFP=2×δ.

The laser light source 11 to be used in the illuminator 100 of the present invention is preferably a surface-emitting laser having high directivity and a relatively small maximum emission angle δ. Moreover, since a laser light source including a single laser light emission point can only emit light having a low intensity, it is preferred to use a laser array light source including a plurality of surface-emitting laser light emission points.

Figure 28A:
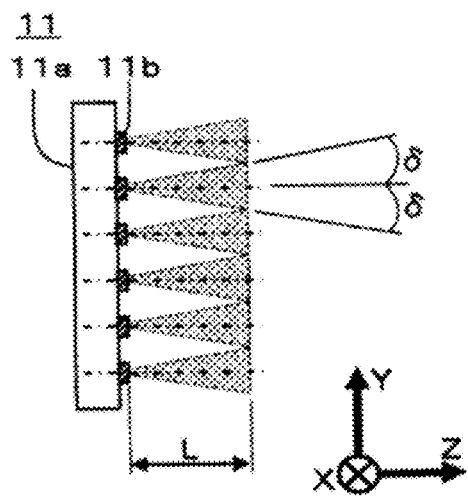
FIG. 28A and FIG. 28B are respectively a cross-sectional view and a plan view which show an example of laser array light sources.
Figure 28B:
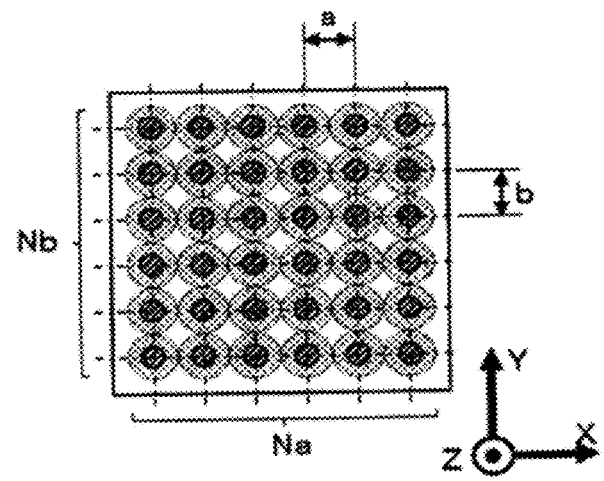

The laser light source 11 may be, for example, a laser array light source obtained by arraying laser emission points 11b on a semiconductor substrate 11a such that laser light emission points are arranged in the X-axis direction at intervals of a, the number of the light emission points being Na, and laser light emission points are arranged in the Y-axis direction at intervals of b, the number of the light emission points being Nb, such as that shown in FIG. 28A and FIG.

28B. In this case, the intervals a and b are preferably within the range of 20 μm to 100 μm, and the light flux emitted by each laser emission point 11b, which has a Gaussian light-intensity distribution, preferably has an emission angle (half angle) δ of about 4° to 9°.

For example, when each laser emission point has an emission intensity of 20 mW and the intervals are a=b=50 μm and in the case where Na=Nb=10, i.e., 100 laser emission points are arrayed, a laser light source 11 having a total quantity of light of 2 W and an emission surface size of 0.5 mm×0.5 mm is obtained. Furthermore, in the case where Na=Nb=100, i.e., 10,000 laser emission points are arrayed, a laser light source 11 having a total quantity of light of 200 W and an emission surface size of 5 mm×5 mm is obtained.

Furthermore, when the light flux emitted by each laser emission point has an emission angle δ of 8° and in the case where the distance L from the laser emission points to the entrance surface of the homogenizer is 3.6 mm or larger, lights emitted by adjoining laser emission points are superimposed each other, and a light flux which has an uneven light-intensity distribution and has diffused to a size larger by 2·L·tan(δ) than the emission area of the laser light source 11 (Na×a in the X-axis direction; Nb×b in the Y-axis direction) enters the homogenizer 12.

It is preferable in this case that in each of the first convex-lens array and second convex-lens array which constitute the homogenizer 12, the number of arrayed convex lenses in each of the two directions (Nx and Ny) which lie in the light flux entering the homogenizer 12 is 4 or larger, that is, at least 16 arrayed convex lenses in total (Nx×Ny≥16) lie in the light flux. Furthermore, by regulating the number of arrayed convex lenses lying in the light flux to 5 or more in each of the X direction and Y direction (25 or more in total), or to 7 or more in each direction (49 or more in total), the light fluxes emitted respectively from the convex lenses of the light-entrance-side first convex-lens array are more superimposed at the irradiation plane 17 to improve the evenness of the light-intensity distribution.

As described above, according to this embodiment, it is possible to provide a compact illuminator 100 which employs a small high-luminance laser light source 11 to emit divergent light having a large maximum diffusion angle β and efficiently illuminate an irradiation plane located at a relatively short distance with the divergent light having an even intensity distribution. The laser light source 11 is not limited to VCSEL array light sources such as that described above, and a Fabry-Pérot laser array light source or a laser light source including a single emission surface can also be used to provide an illuminator 100 having a similar function.

Besides laser light sources, a conventional discharge emission lamp can be used to provide an illuminator which emits divergent light having a large maximum diffusion angle R and efficiently illuminates an irradiation plane located at a relatively short distance with the divergent light having an even intensity distribution, by using the homogenizer 12, 22, or 32.

Embodiment 5

Figure 11:
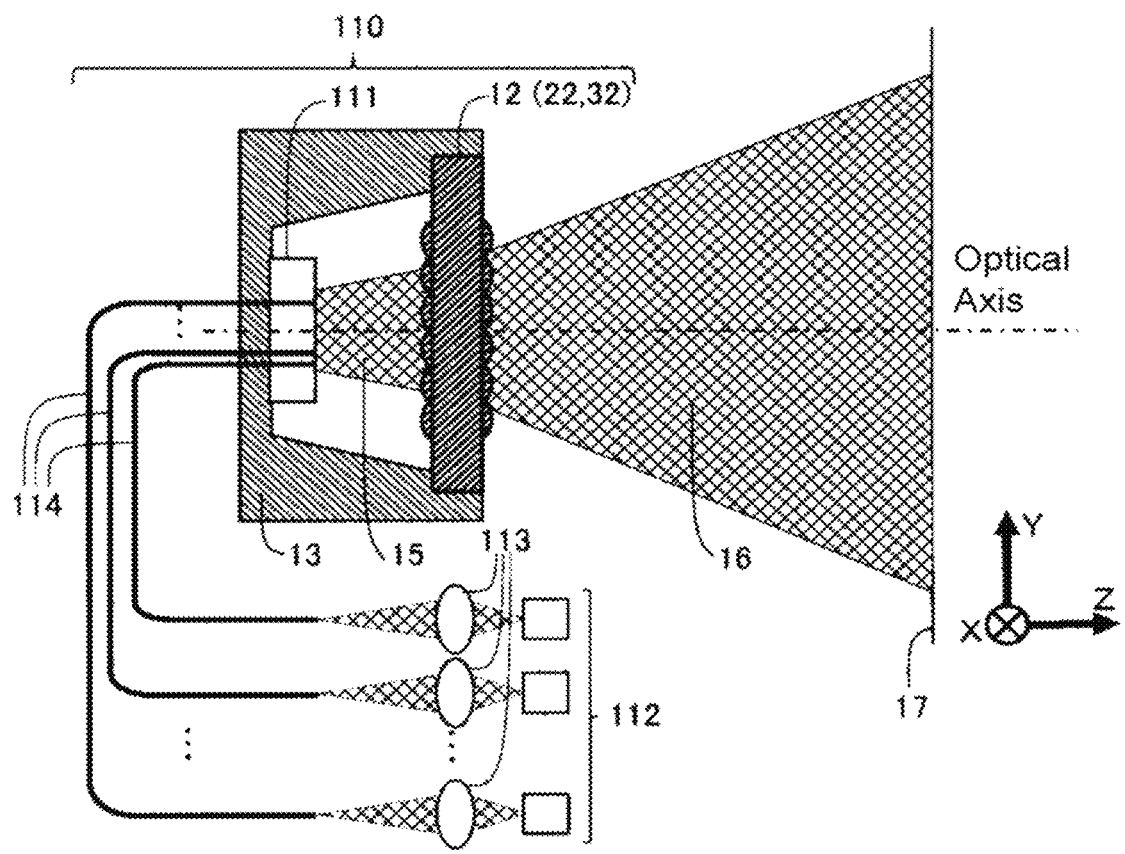
FIG. 11 is a cross-sectional view showing an example of an illuminator 110 according to a fifth embodiment.

Next, another example of illuminators employing the homogenizers described above is explained as a fifth embodiment of the present invention. FIG. 11 is a cross-sectional view showing an example of the illuminator 110 according to the fifth embodiment. The illuminator 110 shown in FIG. 11 differs from the illuminator 100 according to the fourth embodiment in that this illuminator 110 includes: a plurality of laser light sources 112; lenses 113 for condensing light emitted by the laser light sources 112, and optical fibers 114; the light-emission-side ends of which are bundled and disposed in an array arrangement, which are for receiving the condensed light from the lenses 113 and through which the light is transmitted, and these are used in place of the laser light source 11 of the illuminator 100, as a laser light source within the package 13, namely as a laser light source (more specifically, laser emission point array) 111 for the homogenizer 12.

In the laser light source 111, the light-emission-side ends of the optical fibers 114 correspond to the plurality of laser emission points 11b shown in FIG. 28A. The semiconductor substrate 11a is replaced by a fixing jig which bundles the light-emission-side ends of the optical fibers 114.

Any laser light sources may be used as the plurality of laser light sources 112 as long as the laser light sources emit light that can be efficiently condensed by the lenses 113 so as to enter the optical fibers 114 and transmitted. As the optical fibers 114, quartz-based multimode optical fibers which transmit LD light having wavelengths of 190 nm to 2,400 nm can be used. For example, the numerical aperture NA is 0.22 (emission angle δ=12.7°), the core diameter is 50 μm, and the clad diameter is 125 μm. Consequently, a plurality of such laser light sources 112 can be used as a laser light source 111 including a plurality of laser light emission points having an emission angle δ of 12.7° and emission-point intervals of about 125 μm.

The homogenizers (12, 22, and 33) according to the embodiments cause no change in light-intensity distribution on irradiation planes due to the positional shifting of laser light emission points. Because of this, the function of the illuminator 110 can be maintained even in the case where the light-emission-side ends of the plurality of optical fibers 114 are disposed at different intervals.

In the illuminator 110 according to this embodiment, the laser light sources 112 and the laser light emission points can be disposed at any desired distance therebetween using the optical fibers 114. Consequently, the design flexibility regarding laser light sources and cooling systems is increased to enable the illuminator 110 to be used in various illumination applications.

EXAMPLES

Example 1

Examples of the embodiments are shown below using specific numerical values. First, examples of the homogenizer 12 according to the first embodiment shown in FIG. 1 and FIG. 2 are shown as first Examples (more specifically, Examples 1-1 to 1-10). These homogenizers 12 are each produced by respectively forming a first convex-lens array 12a and a second convex-lens array 12b on the first and second surfaces of a light-transmitting substrate 10 which is a glass substrate having a refractive index n for use wavelength of 1.50 and a thickness T of 280 μm, by disposing convex-lens pairs (convex lenses 121a and 121b) having a rectangular shape with Wx=100 μm and Wy=80 μm and sharing symmetry axes, in an array arrangement in the XY plane such that Nx=10 and Ny=12, i.e., the total number of the convex-lens pairs is 120. The convex lenses 121a and the convex lenses 121b each have a cross-sectional shape that is symmetrical with respect to a rotation axis parallel with Z axis, and each convex lens 121a and the convex lens 121b paired therewith share a symmetry axis.

Figure 12:
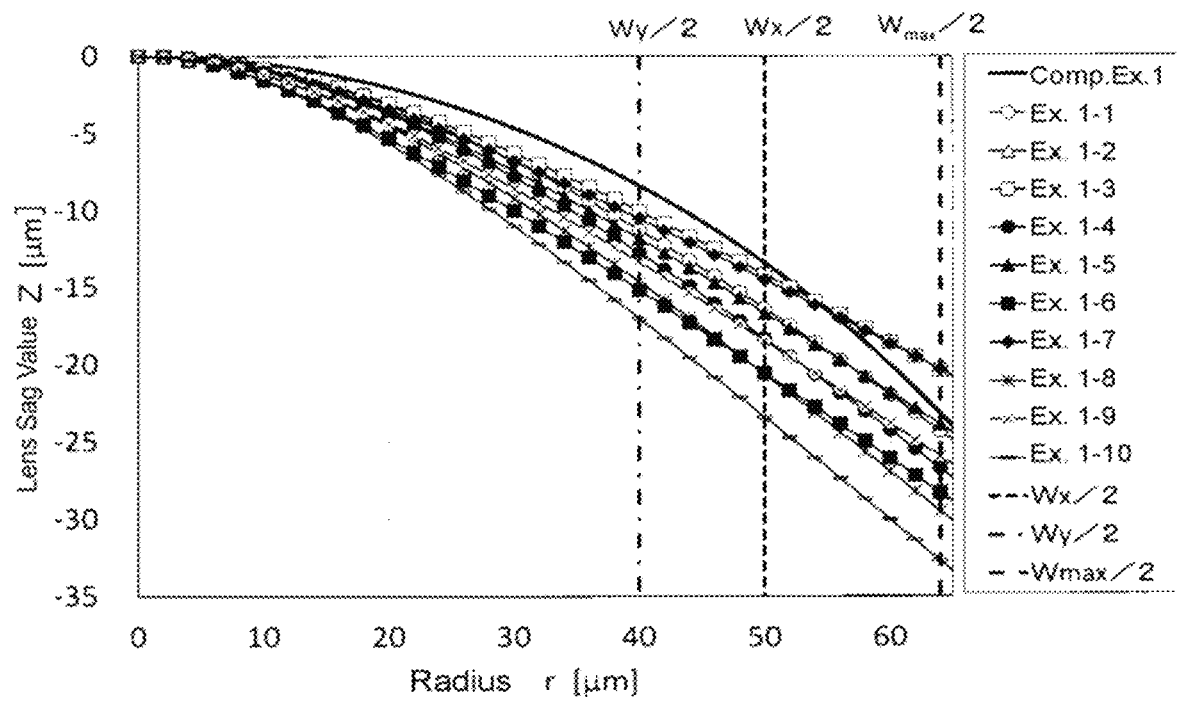
FIG. 12 is a presentation for explaining the lens shapes of convex lenses 121a of the homogenizers 12 of Examples 1-1 to 1-10.

FIG. 12 is a diagram for illustrating the lens shapes of the convex lenses 121a in the homogenizer 12 according to the first embodiment. In this example, the lens surface shapes of the convex lenses 121a in the homogenizer 12 were aspherical lens shapes approximated with the radius of curvature $R_1$ and the conic constant $k_1$ by the formula (2) shown above in which $\alpha_1$ to $\alpha_4$ were each 0.

In FIG. 12, the lens surface shape indicated by a solid line is Comparative Example 1, $(R_1, k_1)=(100, 0)$. The values of $(R_1, k_1)$ of the Examples 1-1 to 1-10 areas shown in Table 1. Besides the values of the Examples, parameters of the Comparative Example and Reference Examples are shown in Table 1. FIG. 12 shows the results of calculations for determining aspherical lens shapes from the parameters of Comparative Example 1 and Examples 1-1 to 1-10 shown in Table 1.

TABLE 1

| Example | $(R_1, k_1)$ |
| --- | --- |
| 1-1 | (60, −3) |
| 1-2 | (60, −4) |
| 1-3 | (60, −5) |
| 1-4 | (50, −3) |
| 1-5 | (50, −4) |
| 1-6 | (50, −5) |
| 1-7 | (50, −6) |
| 1-8 | (40, −3) |
| 1-9 | (40, −4) |
| 1-10 | (30, −3) |
| Comparative Example | |
| 1 | (100, 0) |
| Reference Example | |
| 1 | (150, −4) |
| 2 | (20, −4) |
| 3 | (50, −1) |
| 4 | (50, −2) |

Figure 13:
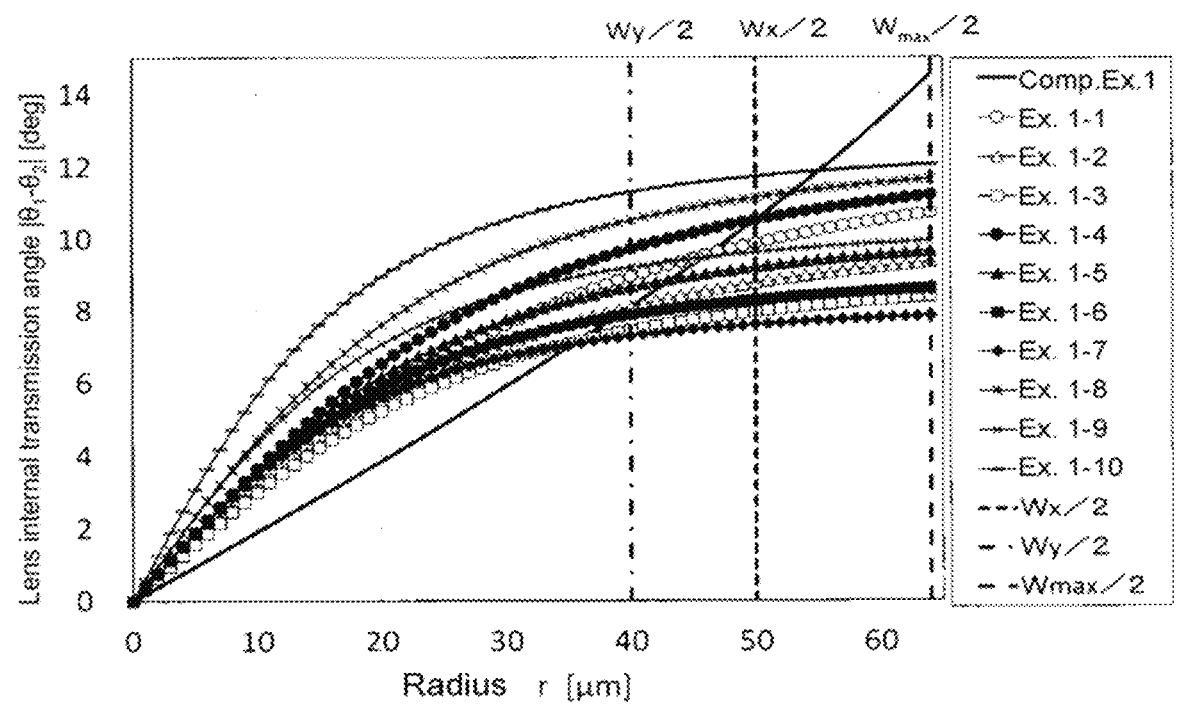
FIG. 13 is graphs showing the results of calculating the angle ($\theta_1$-$\theta_2$) of traveling direction of light transmitted in the homogenizers 12 according to the first Examples.
Figure 14A:
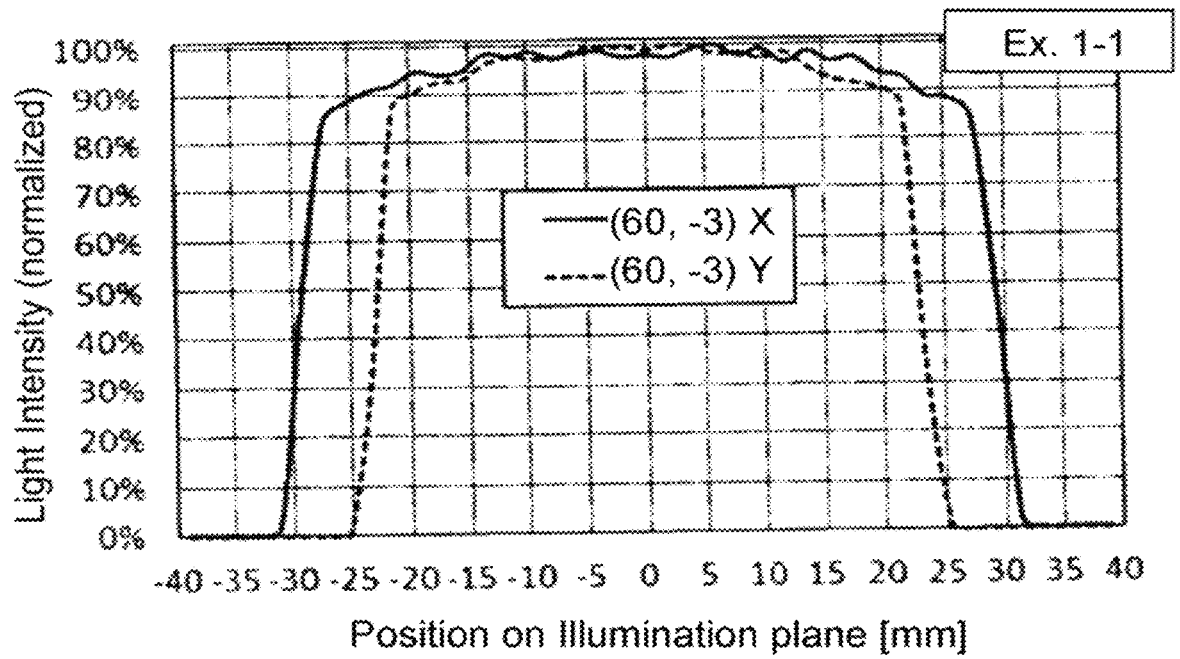
FIG. 14A, FIG. 14B, FIG. 14C and FIG. 14D are graphs (1) showing the results of calculating light-intensity distributions on an irradiation plane 17 which were obtained with illuminators 100 employing homogenizers 12 according to first Examples.
Figure 14B:
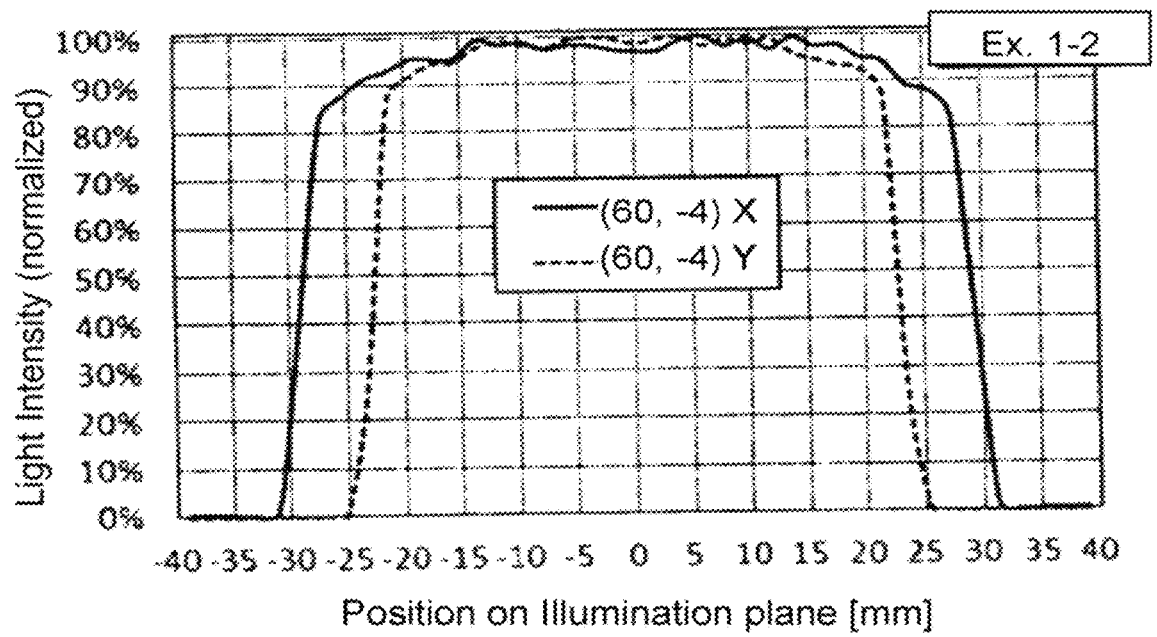
Figure 14C:
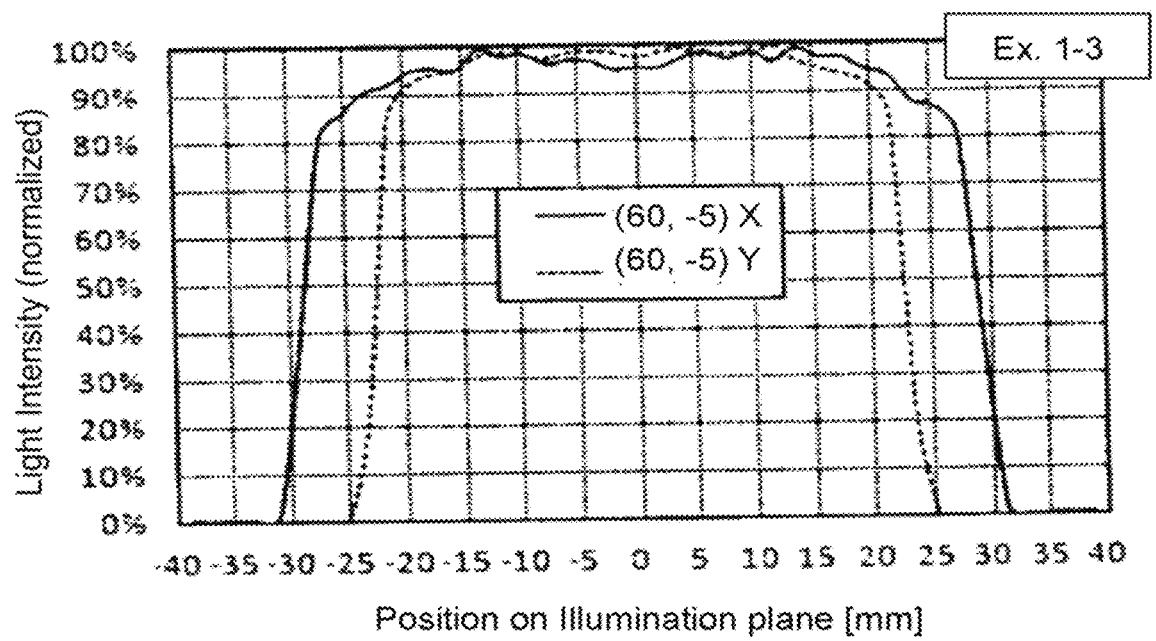
Figure 14D:
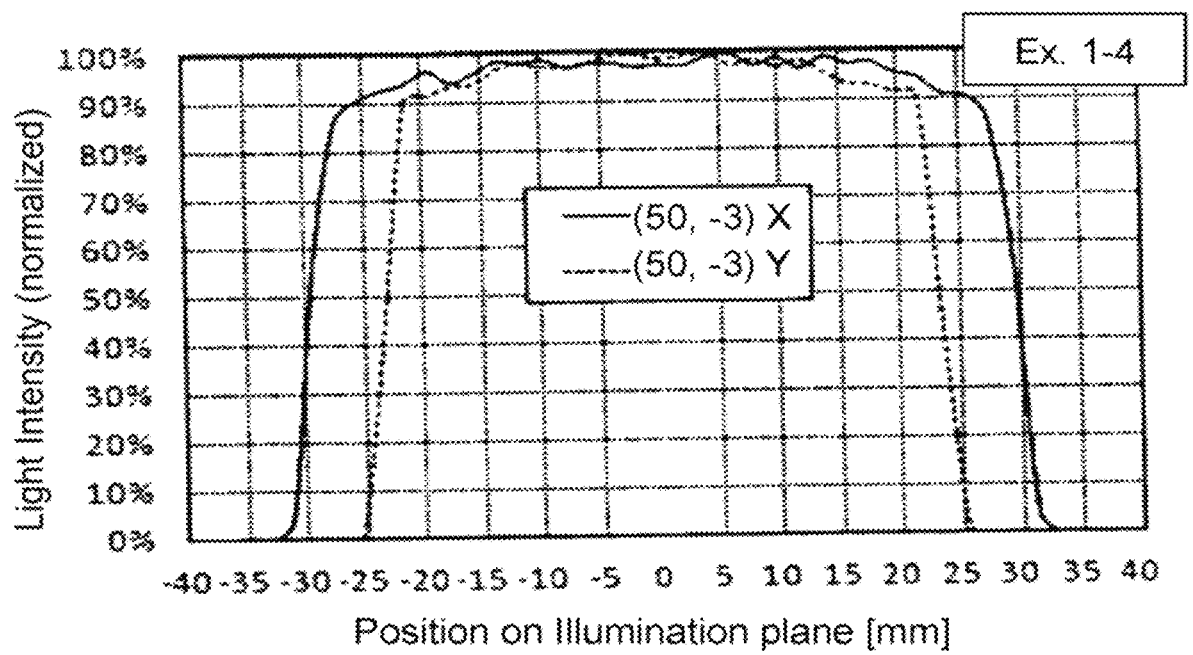
Figure 15A:
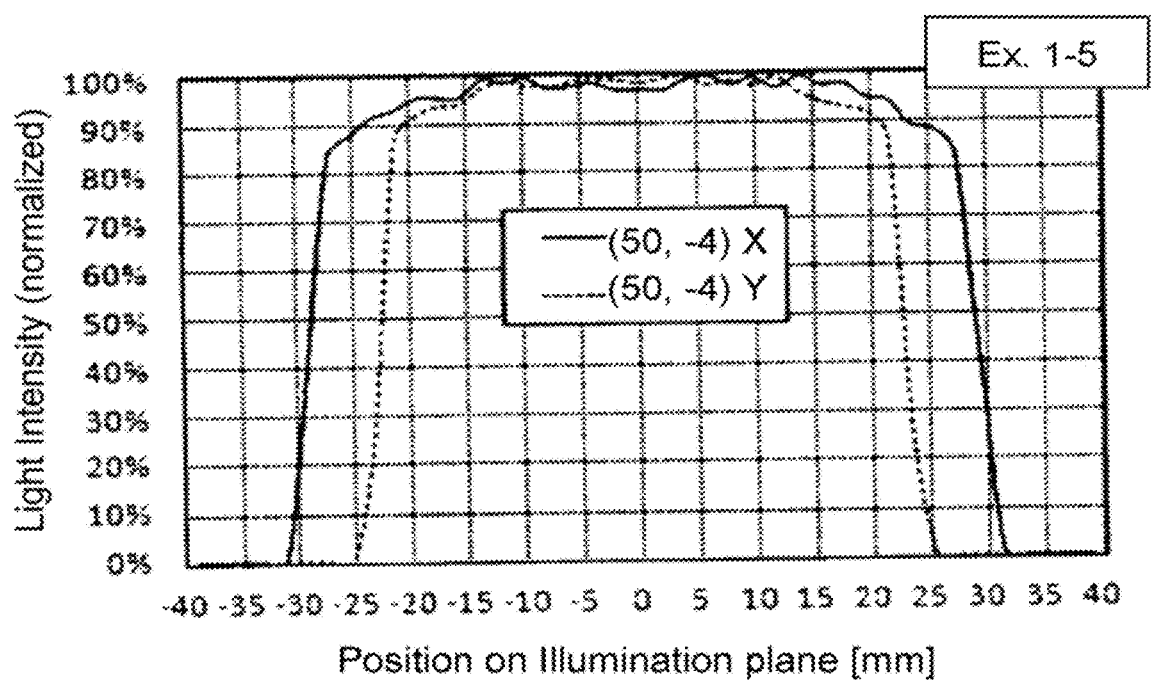
FIG. 15A, FIG. 15B, FIG. 15C and FIG. 15D are graphs (2) showing the results of calculating light-intensity distributions on an irradiation plane 17 which were obtained with illuminators 100 employing homogenizers 12 according to first Examples.
Figure 15B:
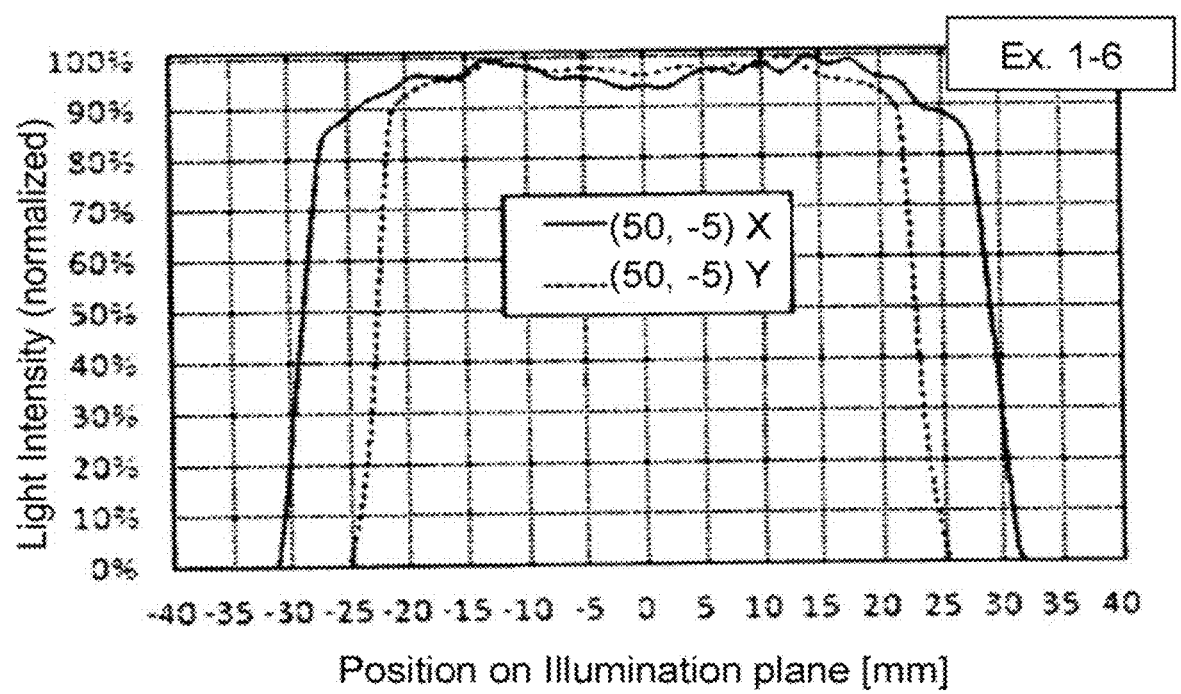
Figure 15C:
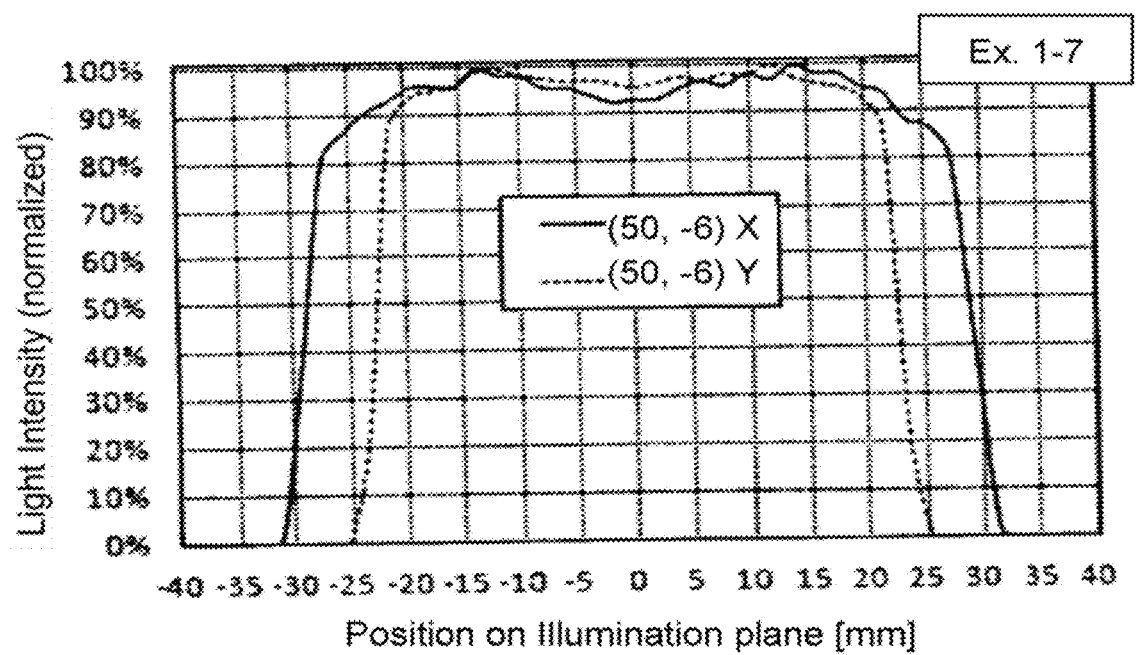
Figure 15D:
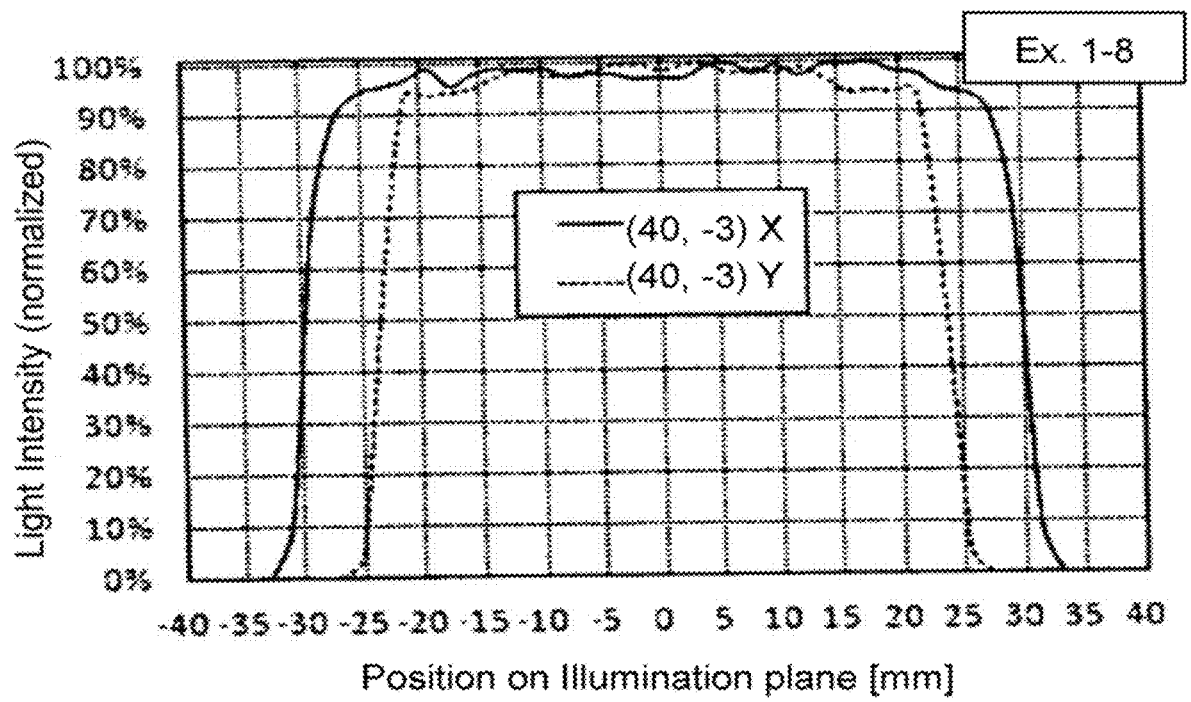

FIG. 13 shows the results of calculations for determining the angles $|\theta_1-\theta_2|$ of light rays (transmitted light) which are transmitted through the homogenizers of Comparative Example 1 and Examples 1-1 to 1-10. As FIG. 12 shows, the convex lenses 121a in each of the homogenizers 12 of Examples 1-1 to 1-10 have a cross-sectional shape in which the lens-surface center region (r<30 μm) has larger inclination angles and includes a narrower flat portion as compared with that in Comparative Example 1. Moreover, in Examples 1-1 to 1-10, the lens-surface peripheral region (r>40 μm) has an inclination angle which is approximately constant, unlike that in Comparative Example 1, which increases monotonously. As a result, as FIG. 13 shows, the angle $|\theta_1-\theta_2|$ at which transmitted light proceeds through the homogenizer 12 depends on the cross-sectional shape of the convex lens 121a as follows. In Comparative Example 1, the angle $|\theta_1-\theta_2|$ increases approximately linearly as the radial distance (radius) r increases. By contrast, in Examples 1-1 to 1-10, the angle $|\theta_1-\theta_2|$ does not increase linearly as the radial distance (radius) r increases. More specifically, in each of the homogenizers 12 of Examples 1-1 to 1-10, angle $|\theta_1-\theta_2|$ in the lens-surface center region (r<30 μm) is kept larger than in Comparative Example 1-1 while the degree of change in angle $|\theta_1-\theta_2|$ decreases, and the degree of change in angle $|\theta_1-\theta_2|$ in the lens-surface peripheral region (r>40 μm) considerably decreased. The portion where r>55 μm in each Example has a smaller value of angle $|\theta_1-\theta_2|$ than that in Comparative Example 1.

In each of Examples 1-1 to 1-10, the convex lenses 121b of the second convex-lens array 12b were spherical lenses in which $(R_2, k_2)=(100, 0)$.

FIG. 14A to FIG. 14D, FIG. 15A to FIG. 15D, FIG. 16A and FIG. 16B show the results of calculating light-intensity distributions on an irradiation plane 17 which are obtained with illuminators 100 shown in FIG. 10 into which the homogenizers 12 of Examples 1-1 to 1-10 are incorporated. The homogenizer 12 of each Example was attached to the light emission window of the package 13 of the illuminator 100 shown in FIG. 10, the package 13 containing a laser light source 11 mounted therein. Further, D=100 mm. The laser light source 11 had a configuration obtained by disposing surface-emitting lasers having an emitted-light wavelength of 850 nm and a diffusion angle δ of 8° and having a Gaussian emitted-light-intensity distribution, such that Na=Nb=5 and thus 25 such surface-emitting lasers in total were disposed in an array arrangement at intervals of a=b=50 μm. The laser array emission surface had a size of 0.25 mm×0.25 mm, and the gap L between the laser array emission surface and the homogenizer 12 was 0.5 mm.

Figure 16A:
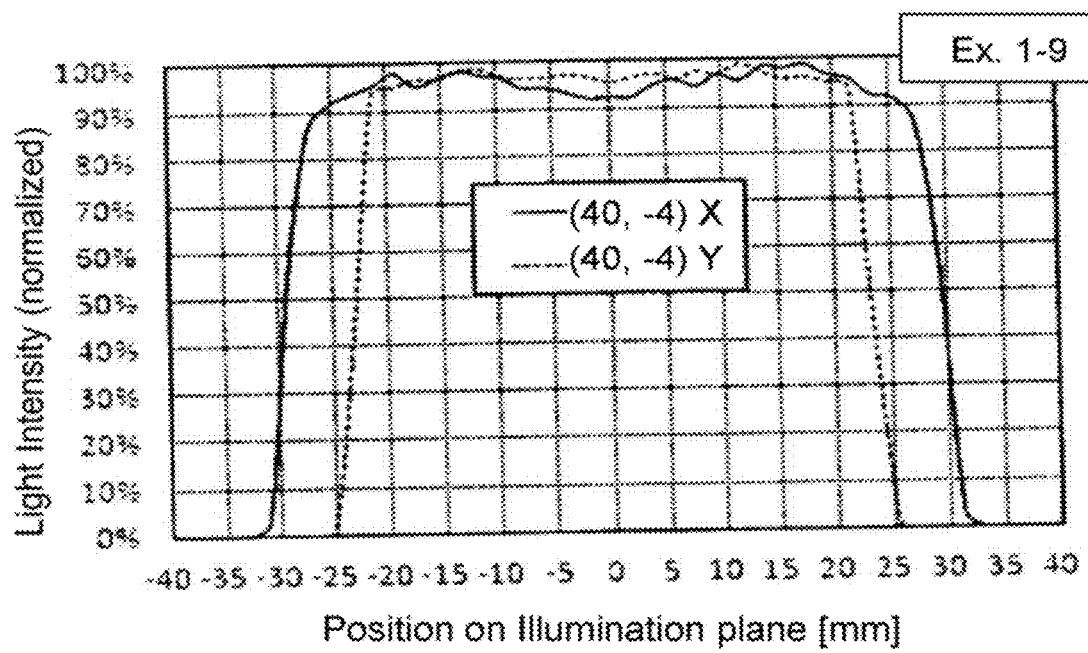
FIG. 16A, FIG. 16B, and FIG. 16C are graphs (3) showing the results of calculating light-intensity distributions on an irradiation plane 17 which were obtained with illuminators 100 employing homogenizers 12 according to first Examples.
Figure 16B:
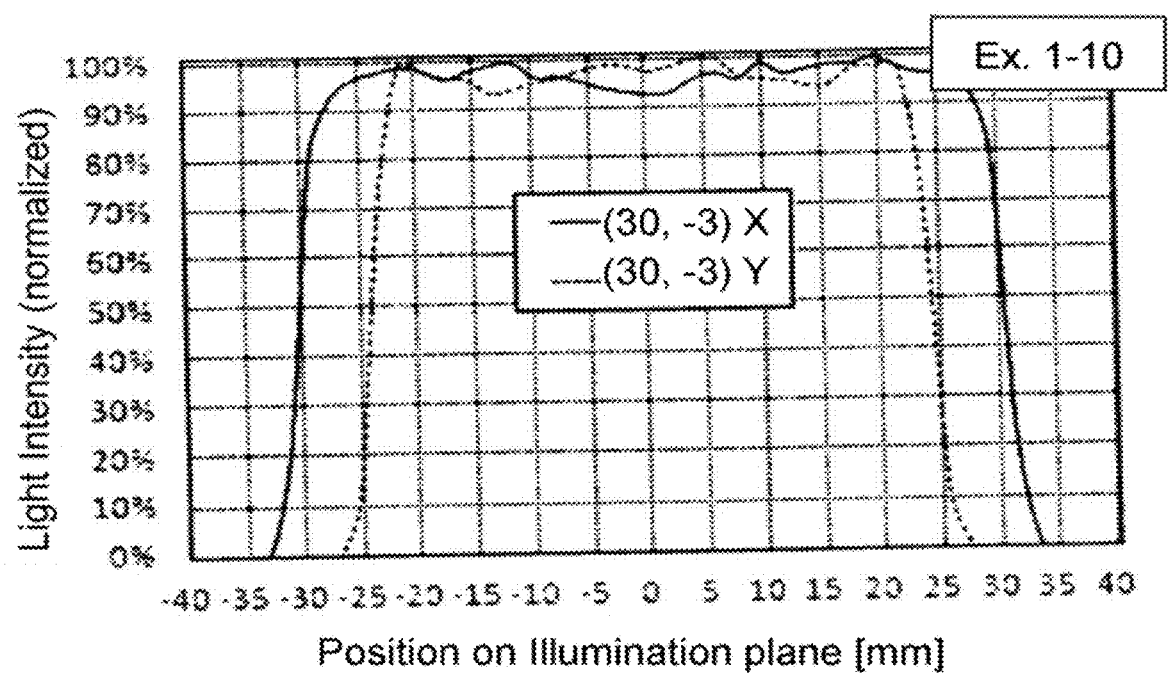
Figure 16C:
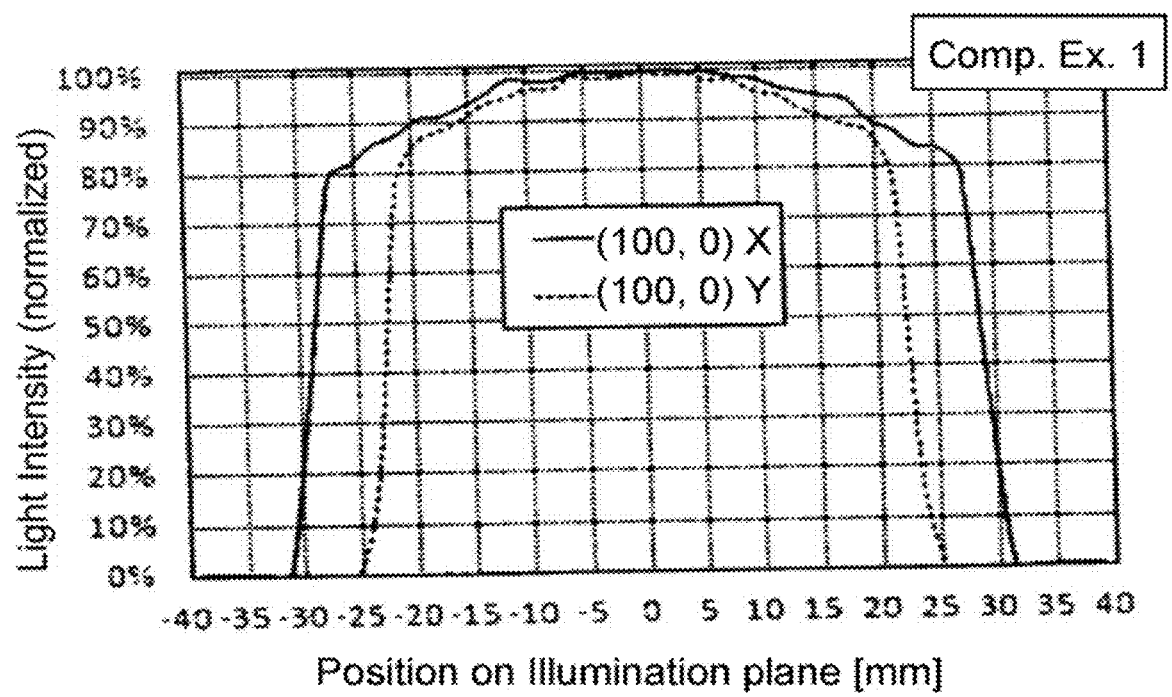
Figure 17A:
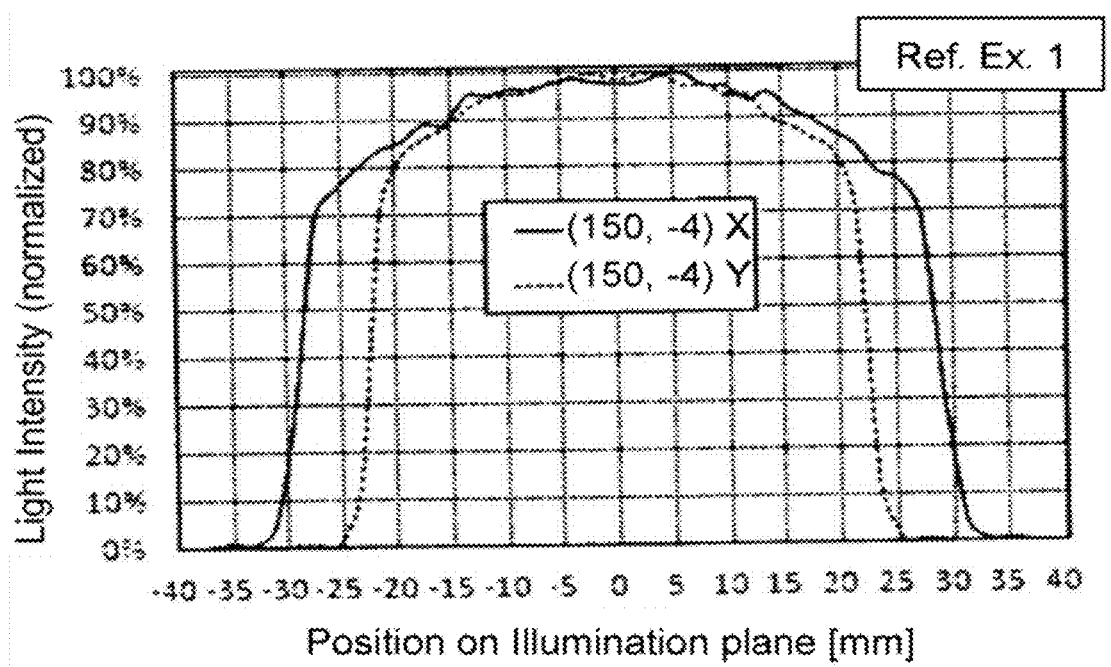
FIG. 17A, FIG. 17B, FIG. 17C and FIG. 17D are graphs showing the results of calculating light-intensity distributions on an irradiation plane 17 which were obtained with illuminators 100 employing the homogenizers of Reference Examples 1 to 4.
Figure 17B:
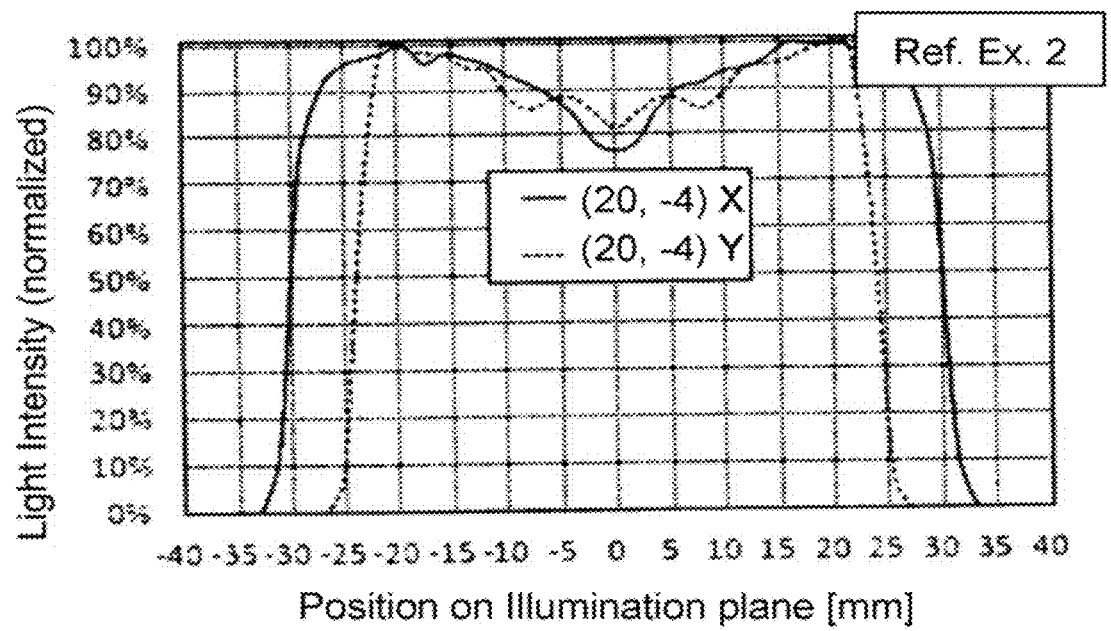
Figure 17C:
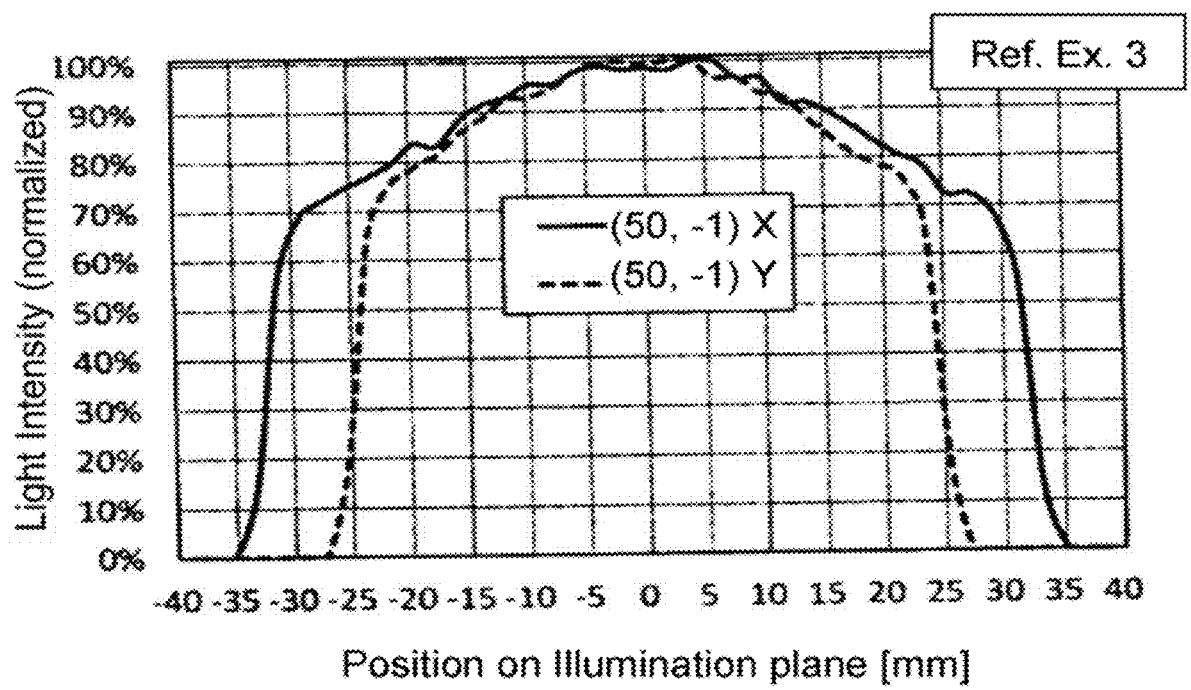
Figure 17D:
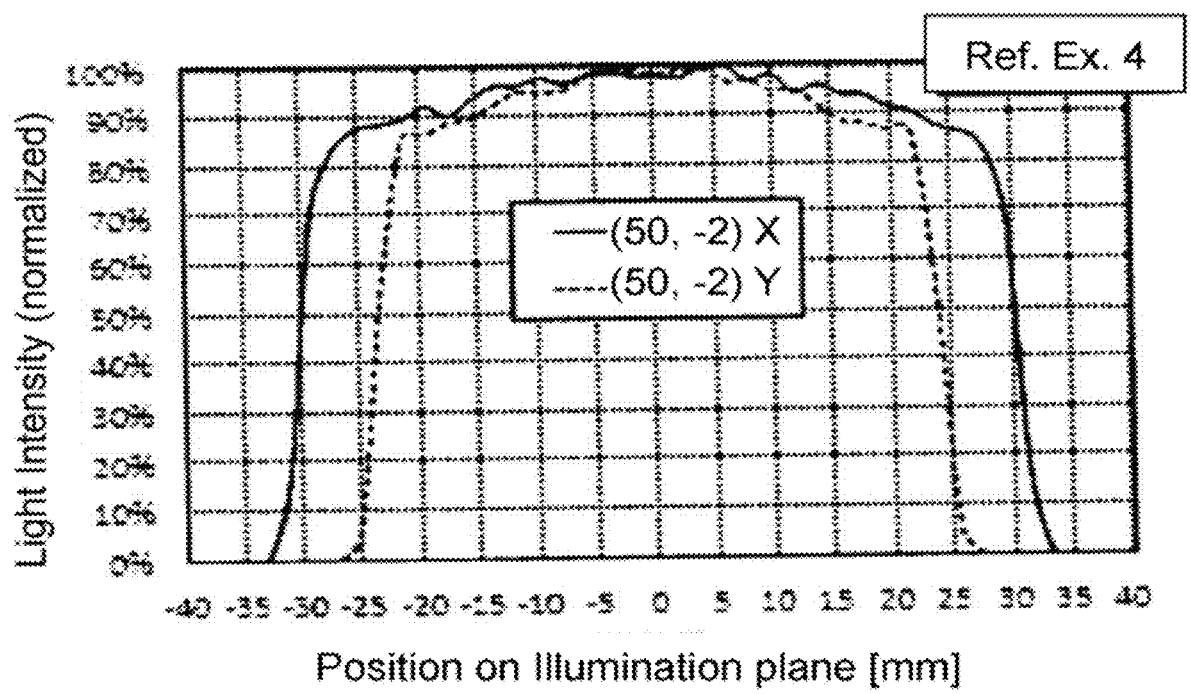

FIG. 16C shows the results of calculating a light-intensity distribution on the irradiation plane 17 which is obtained with an illuminator 100 shown in FIG. 10 into which the homogenizer of Comparative Example 1 is incorporated.

FIG. 17A to FIG. 17D show the results of calculating light-intensity distributions on the irradiation plane 17 which are obtained with illuminators 100 shown in FIG. 10 into which the homogenizers of Reference Examples 1 to 4 are incorporated. Reference Examples 1 to 4 respectively employed the following lens shapes of the convex lenses 121a: $(R_1, k_1)=(150, −4), (20, −4), (50, −1),$ and $(50, −2)$.

In the figures, each light-intensity distribution is shown in terms of relative values in % obtained by normalization with a maximum light intensity in the irradiation plane of 80 mm×80 mm.

As FIG. 14A to FIG. 17D show, use of the homogenizers of Examples 1-1 to 1-10 gave light-intensity distributions in each of which the normalized light intensity was 90% or higher over an X-axis-direction width of about 50 mm and a Y-axis-direction width of about 40 mm, indicating that the light-intensity distributions on the irradiation plane had been more even than that obtained with the homogenizer of Comparative Example 1, which employed spherical convex lenses 921. It can be seen that Reference Examples 1 to 3 gave light-intensity distributions poorer than that of Comparative Example 1. Reference Example 4, in which $(R_1, k_1)=(50, −2)$, gave a light-intensity distribution in which the normalized light intensity was 85% or higher over an X-axis-direction width of about 50 mm and a Y-axis-direction width of about 40 mm, indicating that the light-intensity distribution on the irradiation plane had been more even than that obtained with the homogenizer of Comparative Example 1, which employed spherical convex lenses 921. However, Reference Example 4 was inferior to Examples 1-1 to 1-10.

As demonstrated above, there is a range of optimal shapes for the convex lenses 121a, depending on the laser light source and use conditions for the irradiation plane. These shapes can be determined on the basis of an optical design.

According to the Examples, on the irradiation plane being 100 mm distant from the homogenizer 12, a light-intensity evenness of 90% or higher can be attained over a range having an X-axis-direction width of 50 mm on Y axis and a Y-axis-direction width of about 40 mm on X axis. The diffusion angles (half angles) β in X-axis direction and Y-axis direction obtained by converting this illumination range are βx=14.0° and βy=11.3°. The maximum diffusion angle βmax, which is an angle along a diagonal direction of the rectangular irradiation plane, is 17.8°. By changing the distance between the homogenizer and the irradiation plane, the area of the evenly illuminated range can be regulated.

Figure 18A:
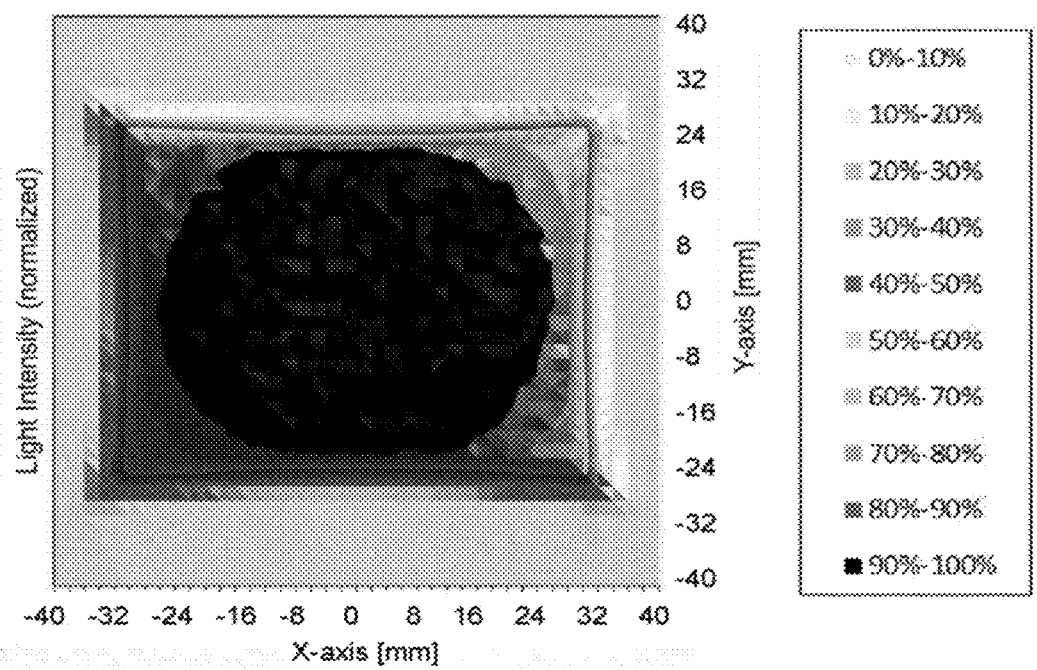
FIG. 18A and FIG. 18B are views schematically illustrating, by gradation, light-intensity distributions (normalized) on an irradiation plane which were obtained with an illuminator 100 employing the homogenizer of Example 1-5.
Figure 18B:
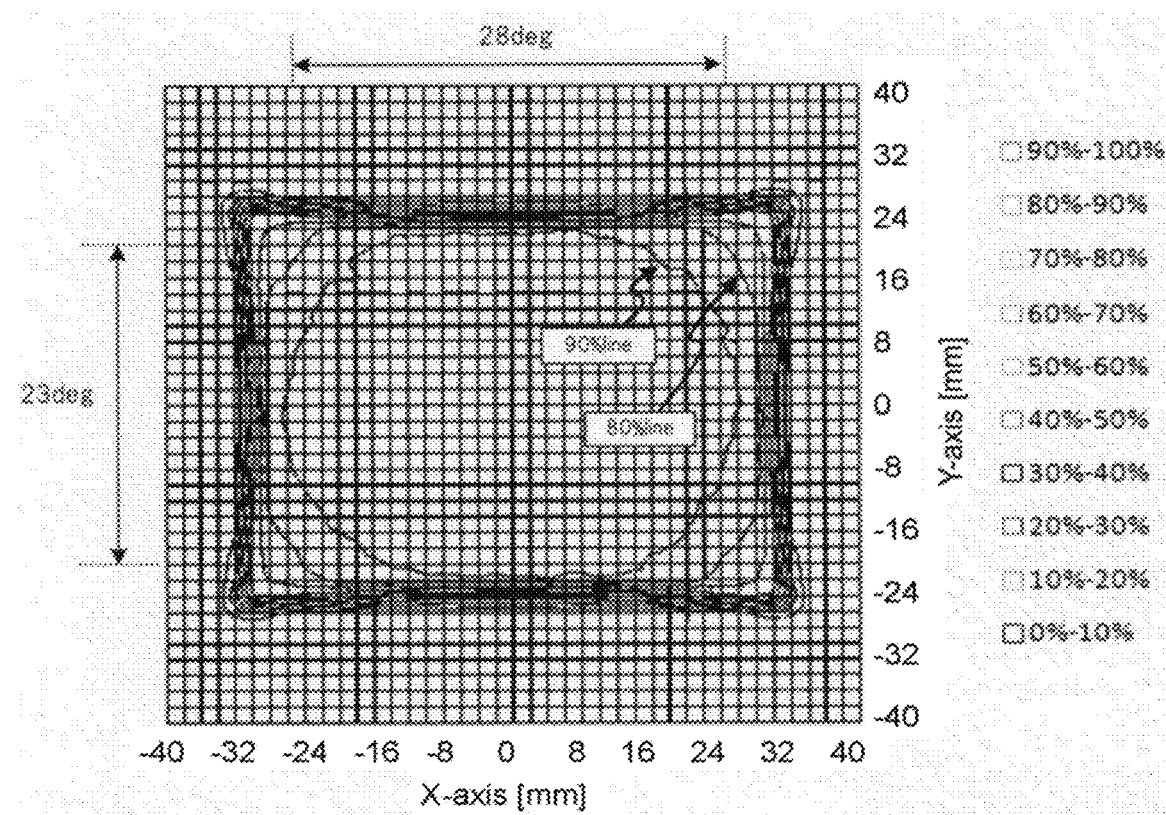
Figure 19A:
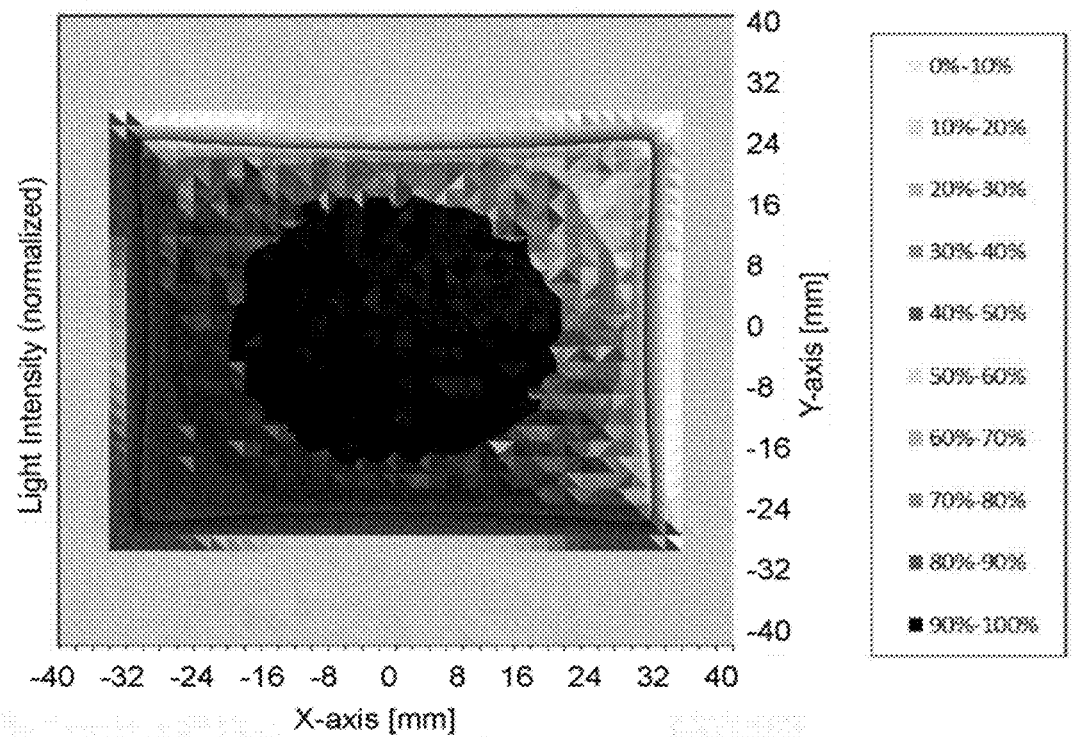
FIG. 19A and FIG. 19B are views schematically illustrating, by gradation, light-intensity distributions (normalized) on an irradiation plane which were obtained with an illuminator 100 employing the homogenizer of Comparative Example 1.
Figure 19B:
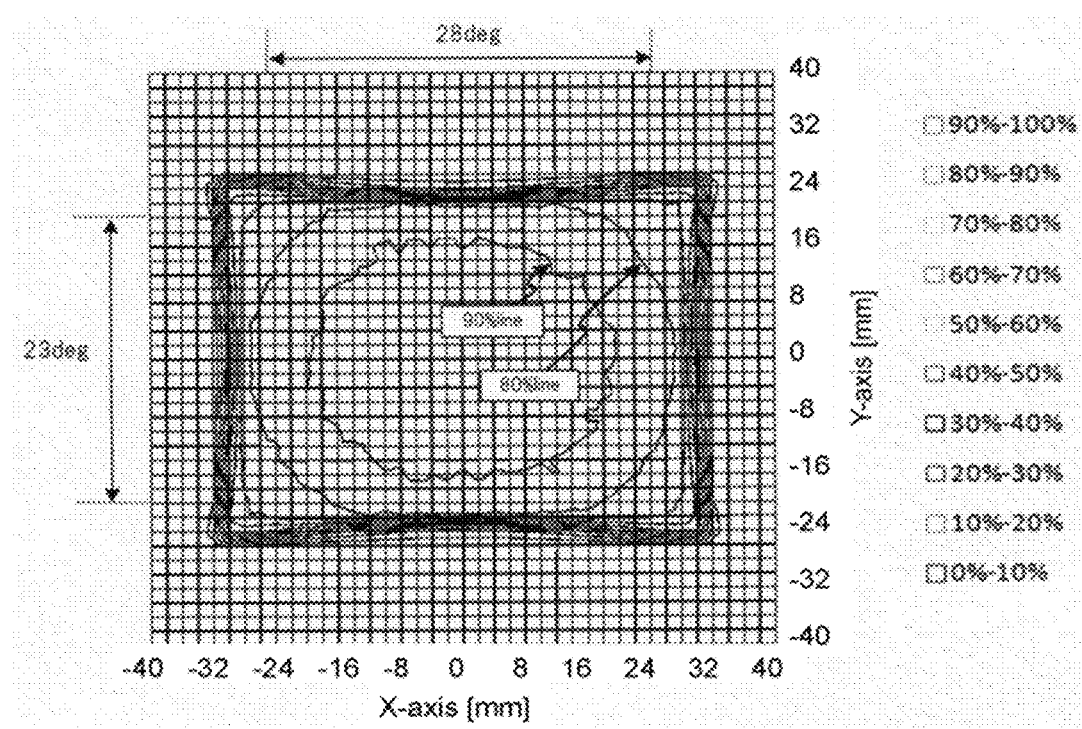

FIG. 18A and FIG. 19A show the results of calculations for illustrating, by gradation on XY plane, the light-intensity distributions (normalized) on the irradiation plane which were obtained with the illuminators 100 respectively employing Example 1-5 and Comparative Example 1. The gradational illustration shown in FIG. 18A is the calculation results for Example 1-5, while the gradational illustration shown in FIG. 19A is the calculation results for Comparative Example 1. FIG. 18B and FIG. 19B each show a black-and-white binarized image obtained by gradating the light-intensity distributions shown in FIG. 18A and FIG. 19A at intervals of 10% to obtain a gradational illustration and binarizing the gradational illustration, for an easier understanding.

As FIG. 18A, FIG. 18B, FIG. 19A and FIG. 19B show, use of the homogenizer of Comparative Example 1 gave a light-intensity distribution in which the light intensity in corner portions (maximum diffusion half angle βmax=17.8°) of the irradiation plane, which were the lowest in light intensity, had decreased to about 70%, while use of the homogenizer 12 of Example 1-5 gave a light-intensity distribution in which even the same corner portions retained a light intensity of about 80% or higher.

Table 2 shows calculated values of the average lens-surface inclination angle of each of lens-surface regions defined based on maximum width $W_{max}$, with respect to the convex lenses (corresponding to 121a) of the light-entrance-side convex-lens array used in each of the homogenizers of Examples 1-1 to 1-10, Comparative Example 1, and Reference Examples 1 to 4. The convex lenses (121a) each had a rectangular shape with widths of Wx=100 μm and Wy=80 μm and, hence, $W_{max}$=128 μm. The division into lens-surface regions was such that a lens-surface center region was expressed by $0 \leq r/(W_{max}/2) \leq \chi$ and a lens-surface peripheral region was expressed by $(1-\chi) \leq r/(W_{max}/2) \leq 1$ and that the center and peripheral regions were each divided into regions respectively corresponding to $\chi$=0.125, 0.20, 0.30, 0.40, and 0.50. The refractive index n of each homogenizer was taken as 1.5. Table 2 also shows the results of normalization with the average lens-surface inclination angles of the lens-surface regions of the convex lens of Comparative Example 1, which was a spherical lens with $R_1$=100 μm and $k_1$=0.

TABLE 2

| | Comparative Example 1 | Example 1-1 | Example 1-2 | Example 1-3 | Example 1-4 | Example 1-5 | Example 1-6 |
|---|---|---|---|---|---|---|---|
| ($R_1$, $k_1$) | (100, 0) | (60, −3) | (60, −4) | (60, −5) | (50, −3) | (50, −4) | (50, −5) |
| Lens-surface region | Average lens-surface inclination angle [°] | | | | | | |
| 12.5% or less of outer shape | 2.3 | 3.8 | 3.8 | 3.7 | 4.5 | 4.5 | 4.4 |
| 20% or less of outer shape | 3.7 | 6.0 | 5.9 | 5.9 | 7.1 | 7.0 | 6.9 |
| 30% or less of outer shape | 5.5 | 8.5 | 8.3 | 8.2 | 10.0 | 9.7 | 9.4 |
| 40% or less of outer shape | 7.5 | 11.1 | 10.8 | 10.4 | 12.8 | 12.3 | 11.8 |
| 50% or less of outer shape | 9.3 | 13.1 | 12.5 | 12.0 | 14.9 | 14.1 | 13.5 |
| 50% or more of outer shape | 28.9 | 27.5 | 24.8 | 22.7 | 29.3 | 26.0 | 23.7 |
| 60% or more of outer shape | 30.8 | 28.3 | 25.3 | 23.2 | 29.9 | 26.5 | 24.1 |
| 70% or more of outer shape | 33.1 | 29.1 | 25.9 | 23.6 | 30.6 | 27.0 | 24.4 |
| 80% or more of outer shape | 35.1 | 29.6 | 26.3 | 23.9 | 31.0 | 27.3 | 24.6 |
| 87.5% or more of outer shape | 36.9 | 30.0 | 26.6 | 24.1 | 31.3 | 27.5 | 24.8 |
| Lens-surface region | Normalized average lens-surface inclination angle | | | | | | |
| | (normalized with average lens-surface inclination angle of Comparative Example 1) | | | | | | |
| 12.5% or less of outer shape | 1.0 | 1.6 | 1.6 | 1.6 | 2.0 | 1.9 | 1.9 |
| 20% or less of outer shape | 1.0 | 1.6 | 1.6 | 1.6 | 1.9 | 1.9 | 1.9 |
| 30% or less of outer shape | 1.0 | 1.6 | 1.5 | 1.5 | 1.8 | 1.8 | 1.7 |
| 40% or less of outer shape | 1.0 | 1.5 | 1.4 | 1.4 | 1.7 | 1.6 | 1.6 |
| 50% or less of outer shape | 1.0 | 1.4 | 1.4 | 1.3 | 1.6 | 1.5 | 1.5 |
| 50% or more of outer shape | 1.0 | 1.0 | 0.9 | 0.8 | 1.0 | 0.9 | 0.8 |
| 60% or more of outer shape | 1.0 | 0.9 | 0.8 | 0.8 | 1.0 | 0.9 | 0.8 |
| 70% or more of outer shape | 1.0 | 0.9 | 0.8 | 0.7 | 0.9 | 0.8 | 0.7 |
| 80% or more of outer shape | 1.0 | 0.8 | 0.7 | 0.7 | 0.9 | 0.8 | 0.7 |
| 87.5% or more of outer shape | 1.0 | 0.8 | 0.7 | 0.7 | 0.8 | 0.7 | 0.7 |

| | Example 1-7 | Example 1-8 | Example 1-9 | Example 1-10 | Reference Example 1 | Reference Example 2 | Reference Example 3 | Reference Example 4 |
|---|---|---|---|---|---|---|---|---|
| ($R_1$, $k_1$) | (50, −6) | (40, −3) | (40, −4) | (30, −3) | (150, −4) | (20, −4) | (50, −1) | (50, −2) |
| Lens-surface region | Average lens-surface inclination angle [°] | | | | | | | |
| 12.5% or less of outer shape | 4.4 | 5.6 | 5.5 | 7.3 | 1.5 | 10.0 | 4.6 | 4.5 |
| 20% or less of outer shape | 6.8 | 8.7 | 8.5 | 11.1 | 2.5 | 14.1 | 7.4 | 7.2 |
| 30% or less of outer shape | 9.2 | 12.0 | 11.5 | 14.8 | 3.6 | 17.5 | 10.6 | 10.3 |
| 40% or less of outer shape | 11.4 | 15.1 | 14.2 | 18.0 | 4.8 | 20.0 | 14.3 | 13.5 |
| 50% or less of outer shape | 12.9 | 17.2 | 16.1 | 20.2 | 5.9 | 21.5 | 17.2 | 15.9 |
| 50% or more of outer shape | 21.9 | 31.0 | 27.3 | 32.7 | 15.5 | 29.2 | 43.3 | 34.2 |
| 60% or more of outer shape | 22.2 | 31.6 | 27.6 | 33.0 | 16.2 | 29.3 | 45.2 | 35.2 |
| 70% or more of outer shape | 22.4 | 32.0 | 27.9 | 33.3 | 17.0 | 29.4 | 47.3 | 36.2 |
| 80% or more of outer shape | 22.6 | 32.4 | 28.2 | 33.5 | 17.7 | 29.5 | 48.9 | 37.0 |
| 87.5% or more of outer shape | 22.7 | 32.6 | 28.3 | 33.7 | 18.2 | 29.5 | 50.2 | 37.5 |
| Lens-surface region | Normalized average lens-surface inclination angle | | | | | | | |
| | (normalized with average lens-surface inclination angle of Comparative Example 1) | | | | | | | |
| 12.5% or less of outer shape | 1.9 | 2.4 | 2.4 | 3.2 | 0.7 | 4.4 | 2.0 | 2.0 |
| 20% or less of outer shape | 1.8 | 2.3 | 2.3 | 3.0 | 0.7 | 3.8 | 2.0 | 1.9 |
| 30% or less of outer shape | 1.7 | 2.2 | 2.1 | 2.7 | 0.7 | 3.2 | 1.9 | 1.9 |
| 40% or less of outer shape | 1.5 | 2.0 | 1.9 | 2.4 | 0.6 | 2.7 | 1.9 | 1.8 |
| 50% or less of outer shape | 1.4 | 1.9 | 1.7 | 2.2 | 0.6 | 2.3 | 1.9 | 1.7 |
| 50% or more of outer shape | 0.8 | 1.1 | 0.9 | 1.1 | 0.5 | 1.0 | 1.5 | 1.2 |

TABLE 2-continued

| | | | | | | | | |
|---|---|---|---|---|---|---|---|---|
| 60% or more of outer shape | 0.7 | 1.0 | 0.9 | 1.1 | 0.5 | 1.0 | 1.5 | 1.1 |
| 70% or more of outer shape | 0.7 | 1.0 | 0.8 | 1.0 | 0.5 | 0.9 | 1.4 | 1.1 |
| 80% or more of outer shape | 0.6 | 0.9 | 0.8 | 1.0 | 0.5 | 0.8 | 1.4 | 1.1 |
| 87.5% or more of outer shape | 0.6 | 0.9 | 0.8 | 0.9 | 0.5 | 0.8 | 1.4 | 1.0 |

Table 2 shows the following. In each of the homogenizers 12 of Examples 1-1 to 1-10, in the lens-surface center region of each convex lens 121a, the regions corresponding to the respective values of $\chi$ each had a normalized average inclination angle (angle obtained by normalizing the average inclination angle of the lens-surface region with the average inclination angle of the corresponding lens-surface region of the spherical lens of Comparative Example 1) of larger than 1 (1.3 to 3.2). The nearer to the center and the smaller the $\chi$ ($\chi$=0.125 to 0.30), the larger the average lens-surface inclination angle as compared with that of Comparative Example 1. Meanwhile, in the lens-surface peripheral region, the normalized average inclination angles were within the range of 0.6 to 1.1, and the nearer to the periphery and the smaller the $\chi$ ($\chi$=0.125 to 0.30), the smaller the average lens-surface inclination angle as compared with that of Comparative Example 1.

It was thus demonstrated that an illuminator 100 capable of causing light to strike on an irradiation plane 17 so as to have an even light-intensity distribution (more specifically, any of the light-intensity distributions shown in FIG. 14A to FIG. 16B) is obtained by using any of the homogenizers 12 of the Examples which each employ a first convex-lens array 12a including convex lenses 121a in which the lens-surface center region has normalized average inclination angles within the range of, for example, 1.3 to 3.2 and the lens-surface peripheral region has normalized average inclination angles within the range of, for example, 0.6 to 1.1.

In the homogenizers of Reference Examples 1 to 4, the convex lenses (corresponding to 121a) of the light-entrance-side convex-lens arrays had the following inclination angles. The normalized average inclination angles of the lens-surface center region and lens-surface peripheral region in Reference Example 1 were 0.5 to 0.7, which were smaller than 1, and those in Reference Example 3 were 1.4 to 2.0, which were larger than 1. In Reference Example 2, the normalized average inclination angles of the lens-surface peripheral region were 0.8 to 1.0, which were comparable to those in the Examples, but the normalized average inclination angles of the lens-surface center region were 2.3 to 4.4, which were larger than in the Examples. The results show that Reference Examples 1 to 3 were inferior to Examples 1-1 to 1-10 in the evenness of light-intensity distribution on the irradiation plane 17. Reference Example 4 was somewhat inferior in the evenness of light-intensity distribution, because in Reference Example 4, the normalized average inclination angles of the lens-surface center region were 1.7 to 2.0, which were comparable to those in the Examples, but the normalized average inclination angles of the lens-surface peripheral region were 1.0 to 1.2, which were larger than in Examples 1-1 to 1-10.

Table 3 shows calculated values of the average internal transmission angle $|\theta_1-\theta_2|$ of each of lens-surface regions defined with maximum width $W_{max}$, with respect to the convex lenses (corresponding to 121a) of the light-entrance-side convex-lens array used in each of the homogenizers of Examples 1-1 to 1-10, Comparative Example 1, and Reference Examples 1 to 4, and the normalized average internal transmission angle (angle obtained by normalization with the average internal transmission angle of the corresponding lens-surface region of the convex lens of Comparative Example 1).

TABLE 3

| | Comparative Example 1 | Example 1-1 | Example 1-2 | Example 1-3 | Example 1-4 | Example 1-5 | Example 1-6 |
|---|---|---|---|---|---|---|---|
| $(R_1, k_1)$ | (100, 0) | (60, −3) | (60, −4) | (60, −5) | (50, −3) | (50, −4) | (50, −5) |
| Lens-surface region | Average in-lens transmission angle $|\theta_1-\theta_2|$ [°] | | | | | | |
| 12.5% or less of outer shape | 0.8 | 1.3 | 1.3 | 1.2 | 1.5 | 1.5 | 1.5 |
| 20% or less of outer shape | 1.2 | 2.0 | 2.0 | 2.0 | 2.4 | 2.3 | 2.3 |
| 30% or less of outer shape | 1.8 | 2.9 | 2.8 | 2.7 | 3.4 | 3.3 | 3.2 |
| 40% or less of outer shape | 2.5 | 3.8 | 3.6 | 3.5 | 4.4 | 4.2 | 4.0 |
| 50% or less of outer shape | 3.1 | 4.4 | 4.2 | 4.1 | 5.1 | 4.8 | 4.6 |
| 50% or more of outer shape | 10.2 | 9.6 | 8.6 | 7.8 | 10.3 | 9.0 | 8.2 |
| 60% or more of outer shape | 10.9 | 9.9 | 8.8 | 8.0 | 10.5 | 9.2 | 8.3 |
| 70% or more of outer shape | 11.8 | 10.2 | 9.0 | 8.1 | 10.8 | 9.4 | 8.4 |
| 80% or more of outer shape | 12.6 | 10.4 | 9.1 | 8.2 | 10.9 | 9.5 | 8.5 |
| 87.5% or more of outer shape | 13.3 | 10.5 | 9.2 | 8.3 | 11.1 | 9.6 | 8.5 |
| Lens-surface region | Normalized average in-lens transmission angle $|\theta_1-\theta_2|$ [°] | | | | | | |
| | (normalized with average in-lens transmission angle of Comparative Example 1) | | | | | | |
| 12.5% or less of outer shape | 1.0 | 1.6 | 1.6 | 1.6 | 2.0 | 2.0 | 1.9 |
| 20% or less of outer shape | 1.0 | 1.6 | 1.6 | 1.6 | 1.9 | 1.9 | 1.9 |
| 30% or less of outer shape | 1.0 | 1.6 | 1.5 | 1.5 | 1.8 | 1.8 | 1.7 |
| 40% or less of outer shape | 1.0 | 1.5 | 1.4 | 1.4 | 1.7 | 1.7 | 1.6 |
| 50% or less of outer shape | 1.0 | 1.4 | 1.4 | 1.3 | 1.6 | 1.5 | 1.5 |
| 50% or more of outer shape | 1.0 | 0.9 | 0.8 | 0.8 | 1.0 | 0.9 | 0.8 |
| 60% or more of outer shape | 1.0 | 0.9 | 0.8 | 0.7 | 1.0 | 0.8 | 0.8 |
| 70% or more of outer shape | 1.0 | 0.9 | 0.8 | 0.7 | 0.9 | 0.8 | 0.7 |
| 80% or more of outer shape | 1.0 | 0.8 | 0.7 | 0.7 | 0.9 | 0.8 | 0.7 |
| 87.5% or more of outer shape | 1.0 | 0.8 | 0.7 | 0.6 | 0.8 | 0.7 | 0.6 |

TABLE 3-continued

|  | Example 1-7 | Example 1-8 | Example 1-9 | Example 1-10 | Reference Example 1 | Reference Example 2 | Reference Example 3 | Reference Example 4 |
|---|---|---|---|---|---|---|---|---|
| ($R_1$, $k_1$) | (50, −6) | (40, −3) | (40, −4) | (30, −3) | (150, −4) | (20, −4) | (50, −1) | (50, −2) |
| Lens-surface region | Average in-lens transmission angle $|\theta_1-\theta_2|$ [°] | | | | | | | |
| 12.5% or less of outer shape | 1.5 | 1.9 | 1.8 | 2.4 | 0.5 | 3.4 | 1.5 | 1.5 |
| 20% or less of outer shape | 2.3 | 2.9 | 2.9 | 3.7 | 0.8 | 4.8 | 2.5 | 2.4 |
| 30% or less of outer shape | 3.1 | 4.0 | 3.9 | 5.0 | 1.2 | 60 | 3.6 | 3.5 |
| 40% or less of outer shape | 3.9 | 5.1 | 4.8 | 6.2 | 1.6 | 6.9 | 4.9 | 4.6 |
| 50% or less of outer shape | 4.4 | 5.9 | 5.5 | 7.0 | 2.0 | 7.4 | 5.9 | 5.4 |
| 50% or more of outer shape | 7.5 | 10.9 | 9.5 | 11.6 | 5.2 | 10.2 | 16.2 | 12.2 |
| 60% or more of outer shape | 7.6 | 11.1 | 9.6 | 11.7 | 5.5 | 10.3 | 17.0 | 12.6 |
| 70% or more of outer shape | 7.7 | 11.3 | 9.7 | 11.8 | 5.8 | 10.3 | 18.0 | 13.0 |
| 80% or more of outer shape | 7.8 | 11.5 | 9.8 | 11.9 | 6.0 | 10.3 | 18.8 | 13.3 |
| 87.5% or more of outer shape | 7.8 | 11.5 | 9.9 | 12.0 | 6.2 | 10.4 | 19.4 | 13.6 |
| Lens-surface region | Normalized average in-lens transmission angle $|\theta_1-\theta_2|$ [°] | | | | | | | |
|  | (normalized with average in-lens transmission angle of Comparative Example 1) | | | | | | | |
| 12.5% or less of outer shape | 1.9 | 2.4 | 2.4 | 3.2 | 0.7 | 4.4 | 2.0 | 2.0 |
| 20% or less of outer shape | 1.8 | 2.3 | 2.3 | 3.0 | 0.7 | 3.9 | 2.0 | 1.9 |
| 30% or less of outer shape | 1.7 | 2.2 | 2.1 | 2.8 | 0.7 | 3.3 | 2.0 | 1.9 |
| 40% or less of outer shape | 1.5 | 2.0 | 1.9 | 2.5 | 0.6 | 2.7 | 1.9 | 1.8 |
| 50% or less of outer shape | 1.4 | 1.9 | 1.8 | 2.2 | 0.6 | 2.4 | 1.9 | 1.7 |
| 50% or more of outer shape | 0.7 | 1.1 | 0.9 | 1.1 | 0.5 | 1.0 | 1.6 | 1.2 |
| 60% or more of outer shape | 0.7 | 1.0 | 0.9 | 1.1 | 0.5 | 0.9 | 1.6 | 1.2 |
| 70% or more of outer shape | 0.7 | 1.0 | 0.8 | 1.0 | 0.5 | 0.9 | 1.5 | 1.1 |
| 80% or more of outer shape | 0.6 | 0.9 | 0.8 | 0.9 | 0.5 | 0.8 | 1.5 | 1.1 |
| 87.5% or more of outer shape | 0.6 | 0.9 | 0.7 | 0.9 | 0.5 | 0.8 | 1.5 | 1.0 |

The average internal transmission angles shown in Table 3 are calculated values for the homogenizers 12 having the values of $R_1$ and $k_1$ shown for the Examples and having a refractive index n of 1.5. However, in the case of a homogenizer 12 having a different refractive index n, this homogenizer 12 is made to have improved evenness in light-intensity distribution like the Examples, by regulating the cross-sectional shape (sag value Z(r)) of the convex lenses (121a) so as to result in a value of average internal transmission angle $|\theta_1-\theta_2|$ which is approximately the same as those of the homogenizers of the Examples, in which n=1.5. Here, the average internal transmission angle $|\theta_1-\theta_2|$ is an average of in-lens transmission angles $|\theta_1-\theta_2|$ for the individual lens-surface regions, the in-lens transmission angle $|\theta_1-\theta_2|$ being an angle at which incident light which strikes, in parallel with the symmetry axis, on the convex lens 121a in a position lying at a radial distance r is refracted at the lens surface, as shown in FIG. 3.

A comparison between Table 2 and Table 3 shows that the average lens-surface inclination angles and average internal transmission angles which were normalized with the values of Comparative Example 1 (spherical lens) were nearly equal in numerical value and tendency in all the lens-surface regions. Consequently, the cross-sectional shape of convex lenses (121a) can be set such that the average inclination angle and the average internal transmission angle are within the numerical ranges corresponding to Examples 1-1 to 1-10 on the basis of the normalized average inclination angle and normalized average internal transmission angle which are values obtained by normalization with values for a spherical lens.

Next, a method for producing the homogenizer 12 of the Example is explained. For producing the homogenizer 12 of the Example, any processing method may be used so long as the convex-lens shapes of the first convex-lens array 12a and second convex-lens array 12b can be formed as designed. For example, in the case where dies for precision press forming are used for forming the convex-lens arrays, a diamond tool is used to cut die surfaces to impart thereto concave-lens array shapes which are the inversions of the convex-lens arrays, thereby producing dies for the first and second convex-lens arrays. A light-transmitting glass material is sandwiched between the produced two dies, and the dies and the glass material as a whole are heated to a temperature equal to or more than the softening temperature of the glass to transfer the die shapes to the glass surfaces and are then gradually cooled to room temperature. In this operation, the two dies are precisely positioned such that in the resultant first and second convex-lens arrays, each of the convex-lens pairs has no offset in symmetry axis. This die positioning is conducted so as to result in a symmetry-axis offset amount equal to or less than 1/10 of the convex-lens width Wx or Wy, preferably equal to or more than 1/20 thereof, more preferably equal to or less than 1/30 thereof. The die surfaces may be coated with an alloy film in order to improve the separability of the dies from the glass and the smoothness of the surfaces of the formed glass.

The glass material to be used for the die forming preferably has a lower softening point, because such glass materials can be formed at lower temperatures. Furthermore, the higher the refractive index, the higher the formability. This is because a glass material having a higher refractive index gives convex lenses having smaller surface inclination angles for obtaining the same lens power and hence having reduced sag values of Sa and Sb shown in FIG. 1A. Specifically, on the assumption that light strikes on convex lenses having different refractive indexes of $n_A$ and $n_B$ in parallel with the symmetry axis at convex-lens-surface incidence angles of $\theta_A$ and $\theta_B$, respectively, and that the incident light is refracted at refractive angles of $\theta_A'$ and $\theta B'$ such that the refracted light proceeds in the convex lenses at the same angle (internal transmission angle) with the lens-plane symmetry axis (that is, the two convex lenses have the same lens power), then the convex lenses having refractive indexes of $n_A$ and $n_B$ have inclination angles of $\theta_A$ and $\theta_B$, which are related with each other by: internal transmission angle $\theta_A-\theta_A'=\theta_B-\theta_B'$. For example, one convex lens has $\theta_A=30°$ and $n_A=1.50$, while use of a glass material having $n_B=2.0$ results in $\theta_B=21.4°$ and in an average lens-surface inclination angle reduced to about 2/3.

The convex lenses constituting the first convex-lens array 12a and second convex-lens array 12b have a gap-less configuration in which each convex lens has a rectangular shape having widths of Wx×Wy and the whole rectangular shape has a lens shape. Because of this, in the boundary portions of the convex lenses, in particular in corner portions of the rectangular shapes, the sag value and the inclination angle are maximum and the designed inclination angle changes discontinuously. This makes it difficult to produce dies and to form the lenses.

The convex lenses 121a constituting each of the homogenizers 12 of the Examples have an aspherical shape which has approximately the same sag values Z as in Comparative Example 1 (spherical convex lenses 921) but has a smaller maximum inclination angle, as shown in FIG. 12 and FIG. 13. Hence, die production and lens forming are less difficult. In the case where a light-transmitting material having a high refractive index is used for the convex lenses, this results in a reduction in average lens-surface inclination angle, making the die production and lens forming still less difficult.

In the case where a light-transmitting resin which is a photosetting or thermosetting resin is used as a lens material and molded by die forming, limitations on the die material, such as heat resistance, are relieved because the light-transmitting resin is cured at low temperatures. In the case of using an ultraviolet-curing resin, it is preferred to use dies made of a glass material which transmits ultraviolet light, e.g., quartz.

Another method for producing a homogenizer 12 is to perform dry-etching processing for light-transmitting glass substrate directly, using a reactive gas. Continuous-tone photomasks (gray-scale masks) each having an ultraviolet-transmittance distribution corresponding to a lens-shape spatial distribution are used in order to form convex-lens arrays 12a and 12b each having a gap-less convex-lens shape. An ultraviolet-sensitive resist applied to a surface of the light-transmitting glass is exposed to ultraviolet light through the photomask. Thereafter, the photosensitive resist is developed to obtain a photosensitive-resist pattern having a gap-less convex-lens shape. Furthermore, a reactive-ion etching device used in semiconductor microfabrication is used to strike ions on the patterned resist surface, thereby transferring the convex-lens-shape resist pattern to the surface of the light-transmitting glass in accordance with the dry etching rates of the resist material and glass material. Thus, gap-less convex-lens arrays 12a and 12b are obtained.

From the viewpoint of shortening the processing time, it is preferred to select a glass material and a reactive gas which attain a high reactive-ion etching rate. For example, quartz, which is not used as a glass material for die forming because of the high glass softening point thereof, is applicable to dry etching because quartz has a high reactive-ion etching rate. The following method may also be used: an $SiO_2$ film is deposited on a substrate having a relatively low reactive-ion etching rate, such as a borosilicate glass substrate or a sapphire substrate, and the $SiO_2$ film only is etched to impart a convex-lens shape thereto. In place of the $SiO_2$ (n=1.45), a substance having a high refractive index may be used, such as $TiO_2$ (n=2.3), $Ta_2O$ (n=2.1), or $Nb_2O_5$ (n=2.1). Convex lenses having a regulated refractive index may be produced by using $SiN_xO_y$, by controlling a ratio between x and y. In the reactive-ion etching of $SiO_2$, $CF_4$ is typically used as the reactive gas.

In the case of processing a light-transmitting inorganic material by reactive-ion etching to produce convex lenses, it is preferred to employ a configuration of the homogenizer 12 in which each convex lens has a reduced maximum sag value Z, from the viewpoint of shortening the processing time. Specifically, in order to attain the same diffusing/homogenizing function with a smaller maximum sag value Z, the light-transmitting inorganic material may be processed so as to have a configuration in which the outer-shape size (Wx×Wy×T) of each convex lens is reduced at the same reduction ratio as the maximum sag value Z.

Example 2

Next, an example of the homogenizer 22 according to the second embodiment shown in FIG. 5A and FIG. 5B is shown as a second Example. This homogenizer 22 employs a first convex-lens array 22a including convex lenses 221a in which a phase diffraction grating 23 is formed, the phase diffraction grating 23 including circular recess grooves each having a rectangular cross-section, in a lens-surface region near the symmetry axis (lens-surface center region) of a spherical lens 921 having the shape of $(R_1, k_1)=(100, 0)$. More specifically, each convex lens 221a, which has a maximum width $W_{max}=128$ μm, includes the phase diffraction grating 23 formed in a lens-surface center region defined by $0 \leq r/(W_{max}/2) \leq 0.20$.

In this Example, the phase diffraction grating 23 has a ratio between recess width and protrusion width of 1:1. Furthermore, the period P of the recesses and protrusions is set such that when incident light having a wavelength λ of 850 nm enters the convex lens in the Z-axis direction, the resultant ±1-order diffracted light is transmitted through the convex lens at a diffraction angle $\gamma_{\pm 1}$ within the range of 0.2° to 8°, preferably in the range of 1° to 4°. For example, in the case where P=10 μm, then $\gamma_{\pm 1}=3.3°$. Furthermore, in the case where the recesses of the phase diffraction grating 23 have a depth $d=0.5\lambda/(n-n_0)$ (in the case where n=1.5, d=850 nm), there is approximately no 0-order light, which proceeds rectilinear, and ±1-order diffracted light is produced in an amount of about 40% (81% in total). In the case where $d=0.32\lambda/(n-n_0)$ (in the case where n=1.5, d=543 nm), the diffraction efficiency for 0-order light and that for 1-order diffracted light are equally about 29%, the total thereof being about 86%.

In the homogenizer of Comparative Example 1 (spherical lenses) having a refractive index n=1.5, light rays entering the region equal to or less than 20% of the outer shape have an average internal transmission angle $|\theta_1-\theta_2|$ as small as 1.2° as shown in Table 3 in the first Examples. However, in the convex lens 221a of this Example, in which the phase diffraction grating 23 is formed, light rays entering the region having width equal to or less than 20% of the lens width W have an average internal transmission angle $|\theta_1-\theta_2|$ of about 3.2° in the case where d=850 nm, the average internal transmission angel being more than two times. In the convex lens 221a of this Example, two average internal transmission angles are defined for the ±1-order diffracted light produced by the phase diffraction grating 23. However, since average internal transmission angle is intended to indicate the function of diminishing rectilinear transmitted-light components proceeding in the Z-axis direction, the average internal transmission angle of the ±1-order diffracted light in this Example was calculated as an average of absolute values of $|\theta_1-\theta_2|$.

Thus, the homogenizer 22 of this Example can attain approximately the same average internal transmission angles as the convex lenses 121a of the homogenizers 12 of the first Examples. Consequently, by using the homogenizer 22 of this Example in the illuminator 100, approximately the same evenness in light-intensity distribution as that obtained with the homogenizers 12 of the first Examples can be attained on an irradiation plane 17.

The homogenizer 22 of this Example can be produced by die forming or reactive-ion etching like the homogenizers 12 of the first Examples.

Example 3

Next, an example of the homogenizer 32 according to the third embodiment shown in FIG. 7 is shown as a third Example. This homogenizer 32 includes a pair of homogenizers 32$x$ and 32$y$, which are configured to respectively include cylindrical-lens array pairs (32$xa$ and 32$xb$; and 32$ya$ and 32$yb$) such that the cylindrical lenses (321$xa$ and 321$xb$; and 321$ya$ and 321$yb$) constituting the array pairs have cross-sectional shapes which are symmetric with respect to not an axis but a plane and have a lens power only either in the X-axis direction or Y-axis direction.

More specifically, the cylindrical lenses 321$xa$ constituting the first cylindrical-lens array 32$xa$ of the homogenizer 32$x$ and the cylindrical lenses 321$xb$ constituting the second cylindrical-lens array 32$xb$ are each symmetric with respect to a YZ plane, and have XZ cross-sectional shapes which are the same as those of the convex lenses 121$a$ and convex lenses 121$b$ (in which $W_{max}=W_x$) of any of the homogenizers 12 of the first Examples. Furthermore, the cylindrical lenses 321$ya$ constituting the first cylindrical-lens array 32$ya$ of the homogenizer 32$y$ and the cylindrical lenses 321$yb$ constituting the second cylindrical-lens array 32$yb$ are each symmetric with respect to an XZ plane, and have YZ cross-sectional shapes which are the same as those of the convex lenses 121$a$ and convex lenses 121$b$ (in which $W_{max}=W_y$) of any of the homogenizers 12 of the first Examples.

In this Example, synthetic quartz having a refractive index n of 1.45 and a thickness T of 280 μm is used as light-transmitting substrates 30$x$ and 30$y$ as a material for the homogenizer 32$x$ and homogenizer 32$y$. The homogenizer 32$x$ of this Example is configured such that Wx=100 μm and Nx=12, while the homogenizer 32$y$ of this Example is configured such that Wy=80 μm and Ny=15. These homogenizers 32$x$ and 32$y$ are serially disposed in the Z-axis direction so as to leave a 0.1-mm space therebetween.

This homogenizer 32 thus configured has the same optical function as any of the homogenizers 12 of the first Examples. Hence, the same effect as in the first Examples can be obtained.

Furthermore, in this homogenizer 32, since the homogenizer 32$x$ and the homogenizer 32$y$ employ cylindrical-lens arrays, the lens boundaries where lens surfaces meet each other discontinuously are linear and the maximum sag value Z is reduced. As a result, a lens shape of optimal design can be precisely formed, enabling the homogenizer to stably emit light having desired properties.

This homogenizer 32 also can be produced by die forming or reactive-ion etching like the homogenizers 12 of the first Examples.

FIG. 20A to FIG. 20E are views for illustrating an example of methods for producing one cylindrical-lens array (cylindrical-lens array 32$xa$ and 32$xb$) of the homogenizer 32 of this Example. In the example shown in FIG. 20A to FIG. 20E, a surface of a light-transmitting glass substrate is dry-etched with a reactive ion gas to form a cylindrical-lens array.

(a) First, in the case of producing the first cylindrical-lens array 32$xa$ of the homogenizer 32$x$, an ultraviolet-sensitive resist 324 is evenly applied in a given film thickness H to one surface (e.g., a first surface) of a quartz substrate as the light-transmitting substrate 30$x$ and cured by heating. The film thickness H for finally obtaining a maximum sag value SR of the quartz convex lenses (cylindrical lenses) is set in accordance with the etching-rate ratio between the quartz and the resist. Also in the case of the cylindrical-lens arrays 32$ya$ and 32$yb$, a quartz substrate is used as the light-transmitting substrate 30$y$.

Figure 20A:
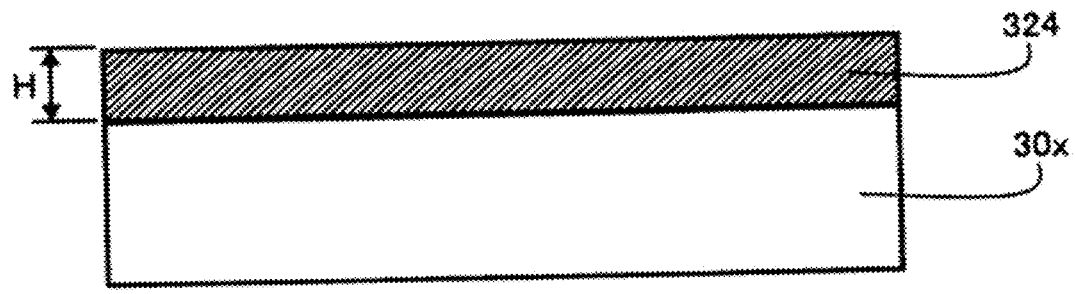
FIG. 20A, FIG. 20B, FIG. 20C, FIG. 20D and FIG. 20E are views illustrating an example of methods for producing one cylindrical-lens array of the homogenizer 32 according to the third Example.
Figure 20B:
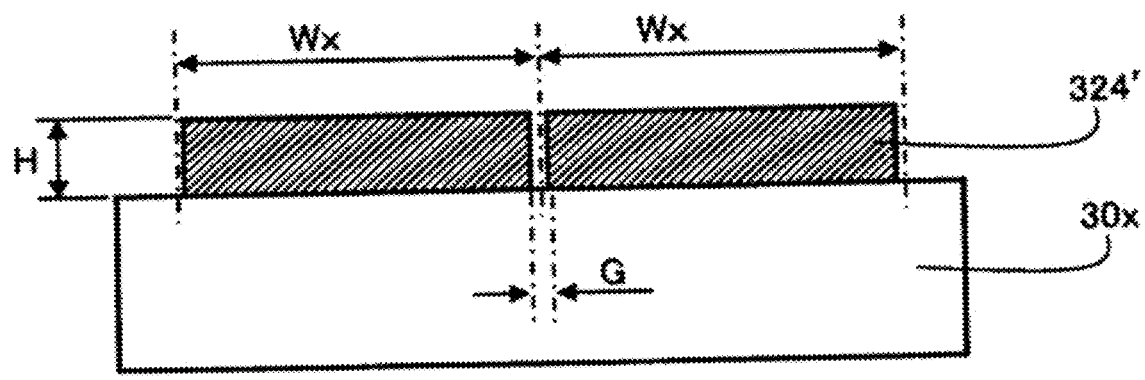
Figure 20C:
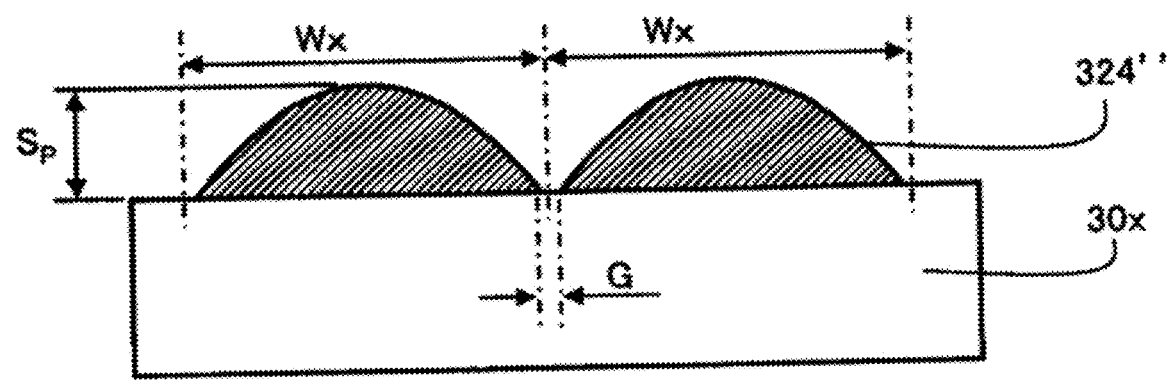

(b) Next, the resist 324 is patterned such that the cylindrical lenses 321$xa$ which are to constitute the cylindrical lens array 32$xa$ each have a lens width of Wx and that linear resist portions lying on the lens boundaries and having a gap width G are removed. In the case of the cylindrical-lens array 32$xb$, the resist 324 is patterned so as to form cylindrical lenses which share symmetry planes with the cylindrical lenses of the cylindrical-lens array 32$xa$ and such that the cylindrical lenses 321$xb$ each have a lens width of Wx and that linear resist portions lying on the lens boundaries and having a gap width G are removed. In the case of the cylindrical-lens arrays 32$ya$ and 32$yb$, the resist 324 is patterned such that these arrays 32$ya$ and 32$yb$ share symmetry planes and have a lens width of Wy and that linear resist portions lying on the lens boundaries and having a gap width G are removed. In FIG. 20B, the patterned resist 324 is shown as resist 324'.

In this step, smaller values of gap G are preferred from the viewpoint of light utilization efficiency. Specifically, the gap G is preferably 5 μm or less, more preferably 2 μm or less, still more preferably 1 μm or less.

(c) Next, the patterned resist 324' is liquefied by heating to a temperature at which the resist 324' softens (e.g., 200° C. to 250° C.) to allow the resist surface to become spherical (reflow) by surface tension. Thereafter, the resist 324' is cooled to room temperature to fix the spherical shape. As a result, a resist pattern 324" having a cylindrical spherical lens shape having a sag value SP and a convex cross-section is formed. The radius of curvature R and sag value $S_P$ of the resist pattern 324" are determined by the volume of the rectangular-parallelepiped resist 324', which is determined by the patterning width W (Wx or Wy) for the resist 324' and the thickness H thereof. In order for the rectangular-parallelepiped resist 324' to become the spherical resist pattern 324" through the reflow heating, there is a range of patterning width W according to the thickness H of the resist 324'. More specifically, the width W is 10 μm to 300 μm, preferably 20 μm to 200 μm.

Figure 20D:
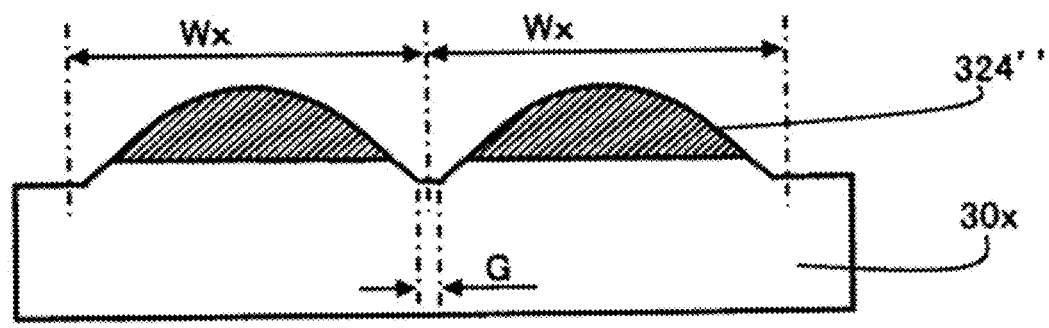
Figure 20E:
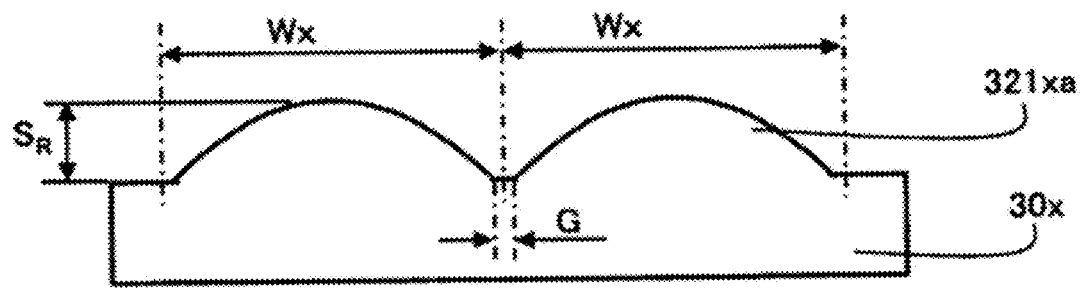

(d) The quartz substrate having the lens-shape resist pattern 324" formed on the surface thereof is dry-etched with a reactive ion gas, thereby transferring the surface shape of the resist 324" to the surface of the quartz substrate. The cross-sectional view given in FIG. 20D shows a state during the dry etching.

(e) Cylindrical lenses 321$xa$ having a final shape are obtained after the removal of the resist 324" by the dry etching. In the case where the quartz substrate and the resist 324" are equal in etching rate, the surface shape of the resist 324" is transferred as such to the surface of the quartz substrate (that is, [sag value $S_R$ of the cylindrical lens]=[sag value $S_P$ of the resist 324"]). In the case where the quartz substrate and the resist 324" have different etching rates, the ratio between the sag value $S_R$ of the cylindrical lens and the sag value $S_P$ of the resist 324" is different and the cylindrical lenses have a shape formed by compressing or extending the resist 324" in the height direction.

The etching rate varies depending on the kind, pressure, and flow rate of the reactive gas. Hence, a cylindrical-lens array 32$xa$ in which the cylindrical lenses each have a cross-sectional shape different from that of spherical lenses is obtained by changing the set conditions during the period from the start of the dry etching to the end thereof. By utilizing such a method for controlling the shape of convex lenses, a convex cylindrical-lens array having an aspherical cross-sectional shape can be produced.

Figure 21A:
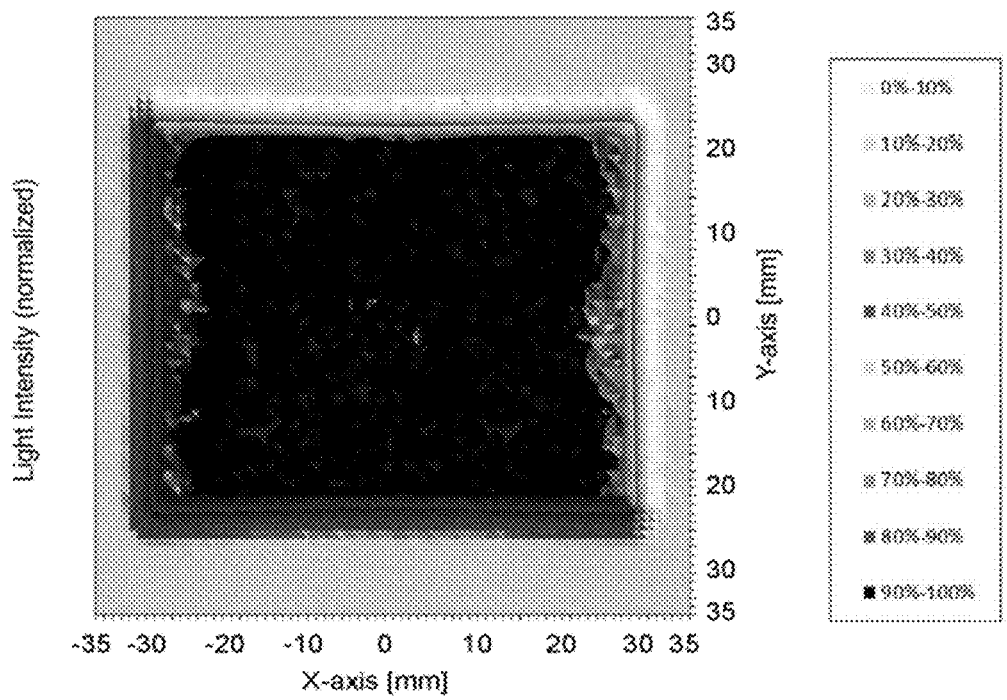
FIG. 21A and FIG. 21B are views schematically illustrating, by gradation, light-intensity distributions (normalized) on an irradiation plane which were obtained with an illuminator 100 employing the homogenizer according to the third Example.
Figure 21B:
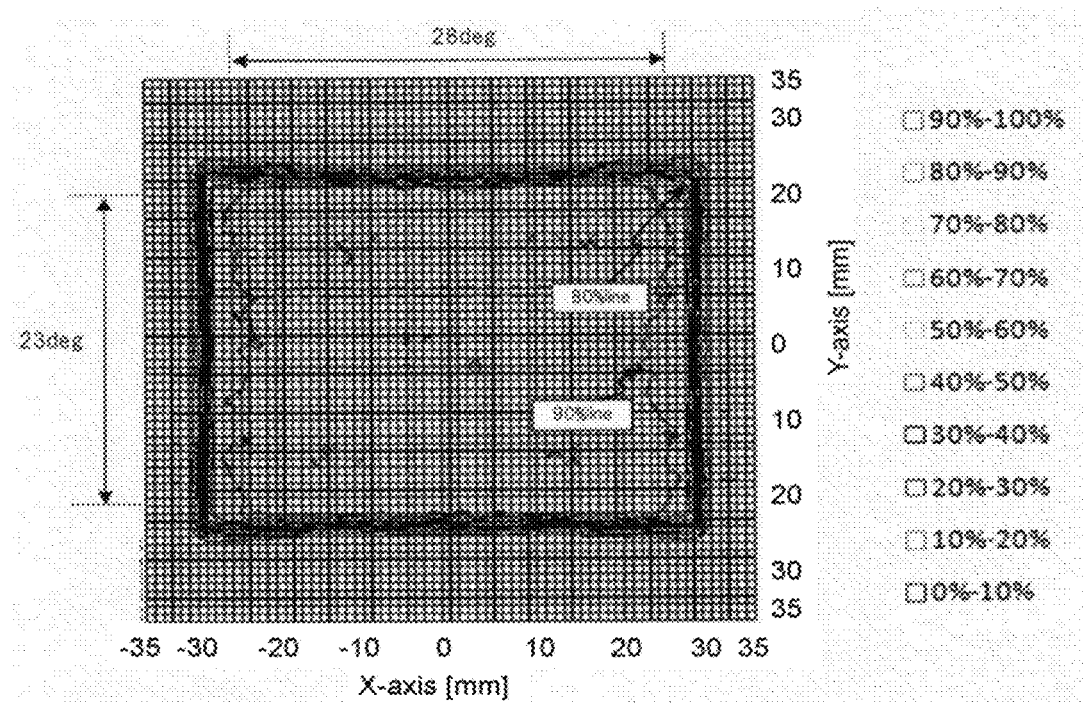
Figure 22A:
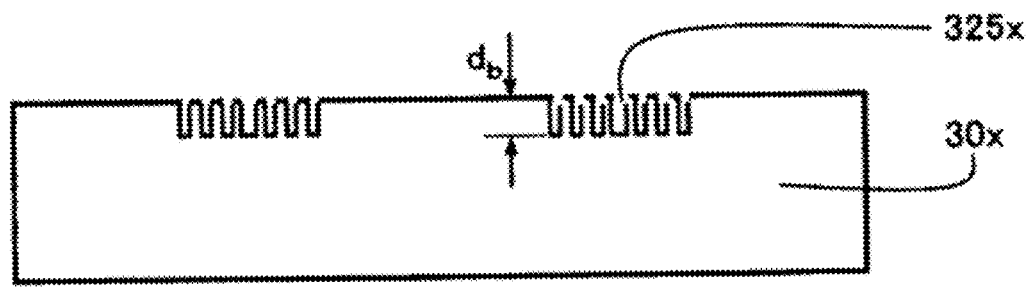
FIG. 22A, FIG. 22B, FIG. 22C, FIG. 22D and FIG. 22E are views illustrating an example of methods for producing one cylindrical-lens array of the homogenizer 32 according to the fourth Example.
Figure 22B:
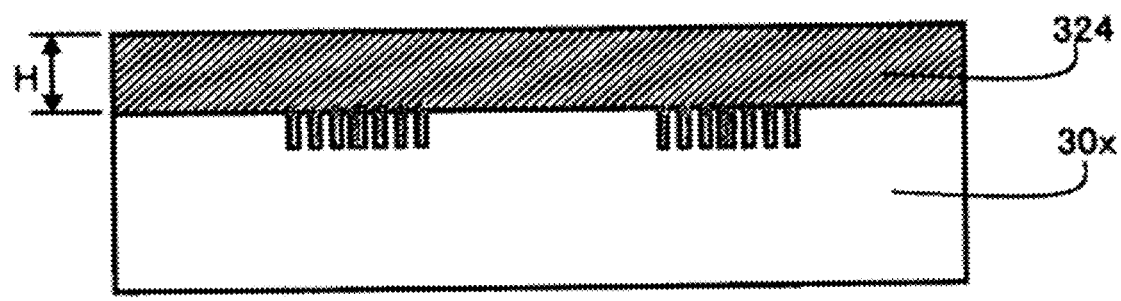
Figure 22C:
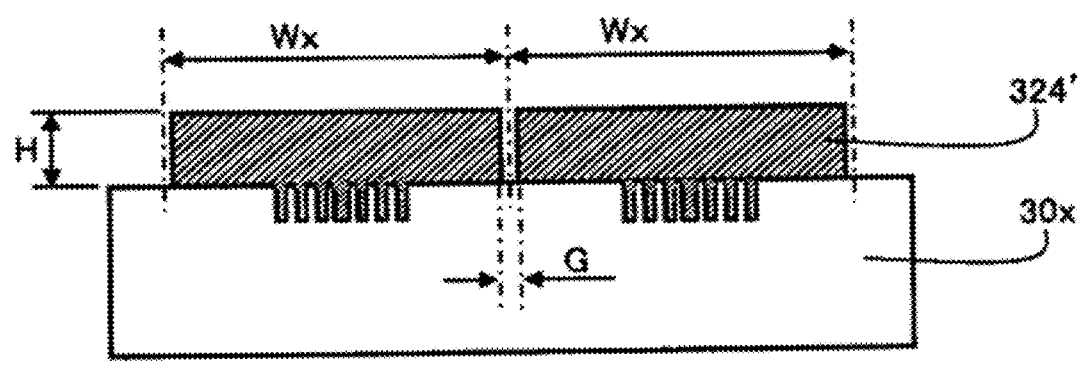
Figure 22D:
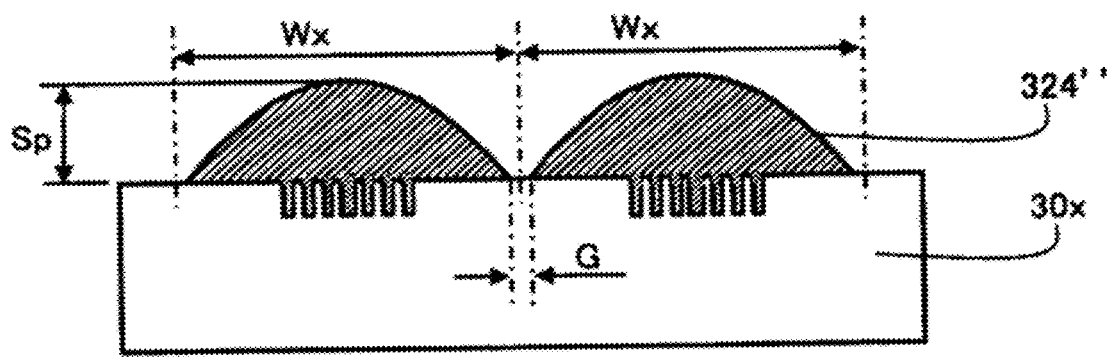
Figure 22E:
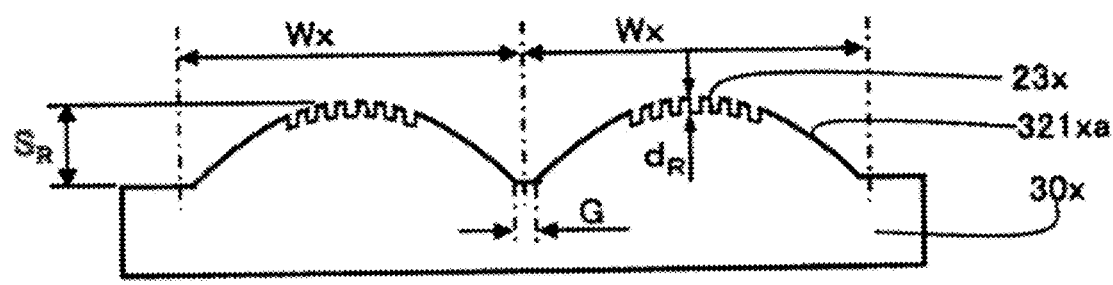
Figure 23A:
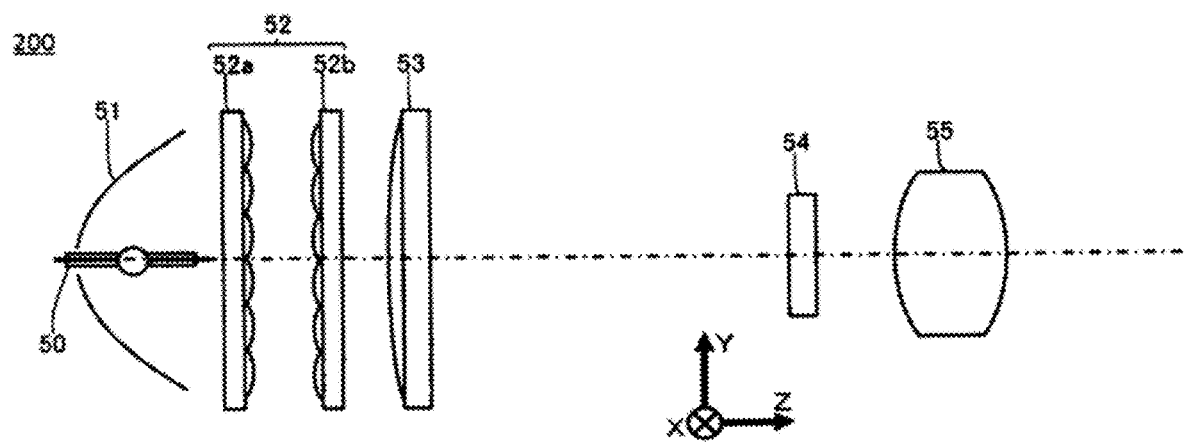
FIG. 23A and FIG. 23B are cross-sectional views showing one example of illuminating optical systems for use in liquid-crystal projectors.
Figure 23B:
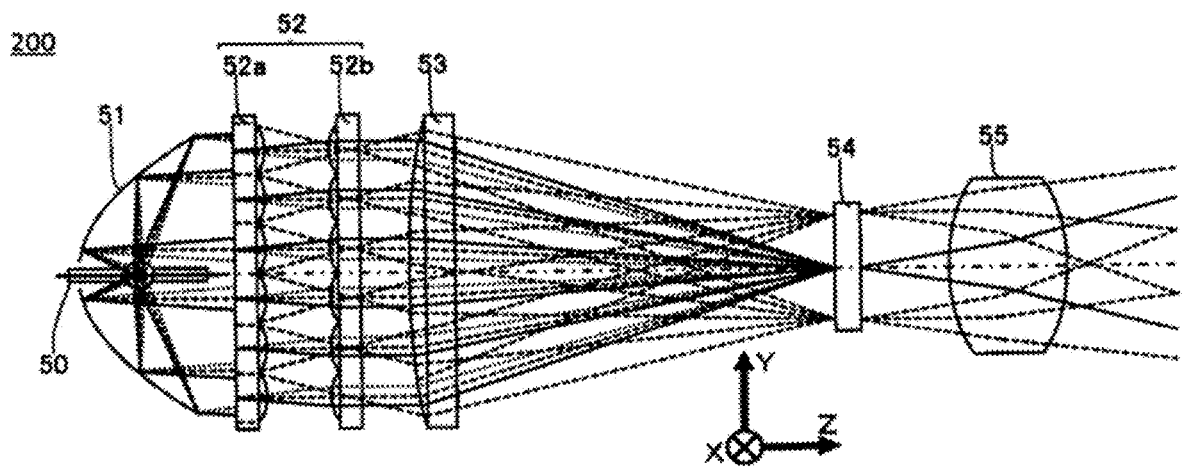

FIG. 21A and FIG. 21B schematically illustrate, by gradation, XY-plane light-intensity distributions on an irradiation plane 17 which were obtained with an illuminator 100 employing the homogenizer 32 of this Example. The light-intensity distributions shown in FIG. 21A and FIG. 21B are results obtained by using the homogenizer 32 of this Example in the illuminator 100 shown in the first Examples in place of the homogenizer 12 of the first Examples and calculating light-intensity distributions of the light striking on the irradiation plane 17 being 100 mm distant from the homogenizer 32. In this Example, the gap between the homogenizer 32x and the homogenizer 32y was set at 0.1 mm, and the gap between the laser light emission points 11b of the laser light source 11 and the light-entrance-side homogenizer 32 (homogenizer 32x) was set at 2 mm. In the homogenizer 32 which gave the results shown in FIG. 21A and FIG. 21B, the entrance-side cylindrical-lens array 32xa of the homogenizer 32x and the entrance-side cylindrical-lens array 32ya of the homogenizer 32y have the same cross-sectional lens shape as the convex lenses 121a of Example 1-5: $(R_1, k_1) = (50, -4)$.

As FIG. 21A and FIG. 21B shows, it can be seen that the illuminator 100 employing the homogenizer of this Example gave a light-intensity distribution in which the light intensity in corner portions (maximum diffusion angle $\beta = 17.8°$) of the irradiation plane, which were the lowest in light intensity, was as high as about 88%.

Example 4

In the fourth Example, convex cylindrical lenses having the same lens cross-section as the convex lenses 221a of the second Example are used in place of both the cylindrical lenses 321xa constituting the first cylindrical-lens array 32xa of the homogenizer 32x used in the homogenizer 32 of the third Example and the cylindrical lenses 321ya constituting the first cylindrical-lens array 32ya of the homogenizer 32y used in the homogenizer 32. However, like the cylindrical lenses of the third Example, those cylindrical lenses have a lens power only either in the X-axis direction or in the Y-axis direction and have convex-lens surface shapes which are symmetric with respect to not an axis but a plane. Consequently, in this Example, the phase diffraction grating 23 formed in an approximately flat lens-surface region near the symmetry plane of each cylindrical lens, which has the same lens cross-section as a convex spherical lens, is not cyclic recess grooves which are axially symmetric but linear recess grooves extending in the direction in which the cylindrical lens has no lens power (i.e., in the direction parallel with the symmetry plane of the lens).

Next, referring to FIG. 22A to FIG. 22E, a method for producing one convex spherical cylindrical-lens array of the homogenizer 32 of this Example (e.g., the first cylindrical-lens array 32xa of the homogenizer 32x, which includes a plurality of cylindrical lenses 321xa each having the phase diffraction grating 23 formed therein) is explained.

(a) First, phase diffraction gratings 325x are formed in a first surface of a quartz substrate as a light-transmitting substrate 30x, in areas corresponding to 50-μm-wide lens-surface regions including the symmetry planes of the cylindrical lenses 321xa as the centers, the phase diffraction gratings 325x each including a linear grating including rectangular recess grooves having a depth $d_b$ of 1,000 nm and arranged at a period P of 10 μm, the recess width and the protrusion width each being 5 km. Specifically, five recess grooves having a rectangular cross-section and having a width of 5 μm and a depth $d_b$ of 1,000 nm are formed, by processing, at a period of 10 μm over a length of 1 mm, in each of 50-μm-wide regions in the first surface of the quartz substrate which correspond to convex center portions of the cylindrical lenses 321xa.

(b) Next, an ultraviolet-sensitive resist 324 is evenly applied in a given film thickness H to the first surface of the quartz substrate where the phase diffraction gratings 325x are formed, and is then cured by heating. Thus, the recess grooves of the phase diffraction gratings 325x are filled with the resist 324 and the resist has a flat surface. Although the recesses and protrusions of the phase diffraction gratings affect the flatness of the resist surface depending on the shape of the recess grooves of the phase diffraction gratings and the viscosity and curing temperature of the resist, any ruggedness of the resist surface just after the resist application is not problematic, owing to the heating at a reflow temperature which will be described later.

(c) Next, the resist 324 is patterned such that the cylindrical lenses 321xa which are to constitute the cylindrical lens array 32xa each have a lens width of Wx and that linear resist portions lying on the lens boundaries and having a gap width G are removed. In the case of the cylindrical-lens array 32ya, Wy is used, in place of the Wx, as the lens width of the cylindrical lenses 321ya. Also in this example, the patterned resist 324 is shown as resist 324'.

(d) Next, the patterned resist 324' is liquefied by heating to a temperature at which the resist 324' softens, thereby allowing the resist surface to become spherical (reflow) by surface tension. Thereafter, the resist 324' is cooled to room temperature to fix the spherical shape. As a result, a resist pattern 324" having a cylindrical spherical lens shape having a sag value $S_p$ and a convex cross-section is formed. In this step, regardless of the surface shape of the quartz substrate which is finely processed, the surface shape of the resist 324' becomes spherical due to the surface tension of the liquefied resist.

(e) The quartz substrate having the lens-shape resist pattern 324" formed on the surface thereof is dry-etched with a reactive ion gas, thereby transferring the surface shape of the resist 324" to the surface of the quartz substrate. Since the phase diffraction gratings 325x are formed in the surface of the quartz substrate, complete removal of the resist 324" by the reactive-ion etching gives a cylindrical-lens array that includes a plurality of cylindrical lenses 321xa having a sag value $S_R$ which are arranged in one direction and which each have a phase diffraction grating 23x formed in the lens-surface center region.

The recess groove depth $d_b$ of the phase diffraction gratings 325x before the lens shape formation and the recess groove depth $d_R$ of the phase diffraction gratings 23x after the lens shape formation depend on the ratio between the dry-etching rate $r_R$ of the material of the protrusions of the phase diffraction gratings 23x and the dry-etching rate $r_P$ of the resist 324" filling the recesses of the phase diffraction gratings 325x. Specifically, in the case where $r_R = r_P$, $d_R = 0$ and thus no phase diffraction gratings 23x are formed in the lens surfaces of the cylindrical lenses 321xa. Meanwhile, in the case where $r_R < r_P$, then phase diffraction gratings 23x having a recess depth $d_R > 0$, which is determined by the ratio between the $r_R$ and the $r_P$, are formed. In the case where $r_R > r_P$, phase diffraction gratings 23x having $d_R < 0$ are formed, in which the recesses of the phase diffraction gratings 325x have become protrusions of the phase diffraction gratings 23x and the protrusions have a height determined by the ratio between the $r_R$ and the $r_P$.

For example, under the dry-etching conditions of $r_R=r_P/2$, phase diffraction gratings 23x are obtained in which $d_R=d_b/2=500$ nm. In the case where light having a wavelength k of 850 nm enters such a phase diffraction grating 23x in the direction perpendicular to the light-transmitting substrate 30, the efficiency for 0-order transmitted light, which proceeds straight, is about 45% and the efficiency for 1-order diffracted light having a diffraction angle of 4.9° is about 22% (44% in total), resulting in an increase in the proportion of diffused transmitted-light components emitted from the lens-surface center region. Consequently, use of the homogenizer 32 of this Example makes it possible to obtain an illuminator 100 which attains improved evenness of the light-intensity distribution on an irradiation plane like the illuminator of the third Example.

Another method for producing the cylindrical lenses each having a phase diffraction grating in the lens-surface center region, in the homogenizer 32 of Example 4, may be one in which a corrosion-resistant layer of a material having a lower dry-etching rate than both the light-transmitting substrate 30 (30x or 30y) and the resist 324 is deposited in an even film thickness on a first surface of the light-transmitting substrate 30 and the portions of the corrosion-resistant layer which correspond to the recess groove pattern of the phase diffraction gratings are removed.

For example, an ultraviolet-sensitive resist is formed beforehand into a pattern of the phase diffraction gratings 325x, thereafter an $Al_2O_3$ film, which has a low dry-etching rate, is deposited, and then the resist is removed with a developing solution (lift-off process), thereby producing a patterned $Al_2O_3$ film layer. The resultant light-transmitting substrate 30x having a grating pattern including the $Al_2O_3$ film having a low etching rate is processed by the same procedure as that shown by FIG. 20B to FIG. 20D. Thus, a cylindrical-lens array including a plurality of cylindrical lenses having phase diffraction gratings 23x formed therein is obtained. The recess groove depth $d_R$ of the phase gratins 23x can be controlled by regulating the thickness of the $Al_2O_3$ film.

While the present invention has been described in detail and with reference to specific embodiments thereof, it will be apparent to one skilled in the art that various changes and modifications can be made therein without departing from the spirit and scope thereof. This application is based on Japanese Patent Application No. 2018-052652 filed on Mar. 20, 2020, the entire subject matter of which is incorporated herein by reference.

INDUSTRIAL APPLICABILITY

The present invention is suitable for use in applications where an irradiation plane located at a relatively short distance is evenly illuminated.

REFERENCE SIGNS LIST 12, 22, 32 Homogenizer
10, 20, 30, 30x, 30y, 40 Light-transmitting substrate
12a, 12b Convex-lens array
22a, 22b Convex-lens array
121a, 121b Convex lens
221a, 221b Convex lens
23, 23x, 23y Phase diffraction grating
325x Phase diffraction grating
921 Spherical convex lens
32x, 32y Homogenizer
32xa, 32xb, 32ya, 32yb Cylindrical-lens array
321, 321xa, 321xb, 321ya, 321yb Cylindrical lens
100, 110 Illuminator
11 Laser light source
11a Semiconductor substrate
11b Laser light emission point
13 Package
14 Inert gas
15 Light flux
16 Divergent light
17 Irradiation plane
111 Laser light source
112 Laser light source
113 Lens
114 Optical fiber
324 Resist
200, 210 Illuminating optical system
52, 62 Homogenizer
52a, 62a Convex-lens array
52b, 62b Convex-lens array
521, 521a, 621, 621a Convex lens
521b, 621b Convex lens
50, 60 Discharge lamp
51 Parabolic mirror
61 Ellipsoidal mirror
53, 63 Field lens
54 Liquid-crystal display element
55 Projection lens
65 Condenser lens
66 Dichroic mirror

The invention claimed is:

1. A homogenizer, comprising:
a convex-lens array pair including a first convex-lens array disposed on a light entrance side and a second convex-lens array disposed on a light emission side,
wherein the first convex-lens array and the second convex-lens array are disposed so as to face each other such that each of the convex-lens arrays has a lens surface opposed to each other outward or inward, the first convex-lens array includes a plurality of first convex lenses having a same shape which are disposed in an array arrangement on one surface, the second convex-lens array includes a plurality of second convex lenses having a same shape which are disposed in an array arrangement on one surface, the first convex lenses and the second convex lenses form convex-lens pairs in each of which the first convex lens and the second convex lens face each other and have a common symmetry axis, the first convex lens, in a lens cross-section including the symmetry axis, has an average internal transmission angle for incident light entering a lens-surface center region in the lens cross-section and being in parallel with the symmetry axis, and the average internal transmission angle is equal to or more than 1.3 times an average internal transmission angle in a lens-surface center region of a spherical convex lens having an approximately same maximum diffusion angle as the first convex lens.

2. A homogenizer, comprising:
two convex-lens array pairs each including a first convex-lens array disposed on a light entrance side and a second convex-lens array disposed on a light emission side,
wherein in each of the convex-lens array pairs, the first convex-lens array and the second convex-lens array are disposed so as to face each other such that each of the convex-lens arrays has a lens surface opposed to each other outward or inward, the first convex-lens array includes a plurality of first convex lenses having a same shape which are disposed in an array arrangement on one surface, each of the first convex lenses is a convex cylindrical lens, the plurality of first convex lenses is disposed such that lens-function axes of the first convex lenses are parallel with each other, the second convex-lens array includes a plurality of second convex lenses having a same shape which are disposed in an array arrangement on one surface, each of the second convex lenses is a convex cylindrical lens, the plurality of second convex lenses is disposed such that lens-function axes of the second convex lenses are parallel with each other, the first convex lenses and the second convex lenses in each of the convex-lens array pairs form convex-lens pairs in each of which the first convex lens and the second convex lens face each other and have a common symmetry axis, the two convex-lens array pairs are serially disposed along an optical-axis direction, which is a traveling direction of incident light, such that the two convex-lens array pairs differ from each other in lens-function axis direction by 90°, in each of the convex-lens array pairs, when a cross-section of each convex lens which is perpendicular to a base-line direction of the convex lens is referred to as a lens cross-section and a position of a symmetry plane in the lens cross-section is referred to as symmetry axis, the first convex lens has an average internal transmission angle for incident light entering a lens-surface center region in the lens cross-section and being in parallel with the symmetry axis, and the average internal transmission angle is equal to or more than 1.3 times an average internal transmission angle in a lens-surface center region of a spherical convex lens having an approximately same maximum diffusion angle as the first convex lens.

3. The homogenizer according to claim 1, wherein when: a maximum width along a direction perpendicular to the symmetry axis in the lens cross-section of the first convex lens is $W_{max}$; a radial distance from the symmetry axis in the lens cross-section is r; the lens-surface center region is defined by $0 \le r/(W_{max}/2) \le \chi$; a lens-surface peripheral region is defined by $(1-\chi) \le r/(W_{max}/2) \le 1$; a ratio of the average internal transmission angle in the lens-surface center region to the average internal transmission angle in a lens-surface center region of the spherical convex lens is $Ar_1$; and a ratio of the average internal transmission angle in the lens-surface peripheral region to the average internal transmission angle in a lens-surface peripheral region of the spherical convex lens is $Ar_2$, relationships, $0 < \chi \le 0.2$, $1.3 \le Ar_1 \le 3.2$, and $0.6 \le Ar_2 \le 1.1$ are satisfied.

4. The homogenizer according to claim 1, wherein when: a radius of curvature of the first convex lens in the lens cross-section is $R_1$; a conic constant of the first convex lens in the lens cross-section is $k_1$; a radius of curvature of the second convex lens in the cross-section is $R_2$; and a conic constant of the second convex lens in the cross-section is $k_2$, relationships, $0.3 \le R_1/R_2 \le 0.7$, $-3 \le k_2 \le 0$, and $k_1 \le k_2$, are satisfied.

5. The homogenizer according to claim 1, wherein the first convex lens includes a phase diffraction grating in the lens-surface center region.

6. The homogenizer according to claim 4, wherein both of the conic constant $k_1$ and the conic constant $k_2$ are within a range of −3 to 0.

7. The homogenizer according to claim 1, further comprising:
a light-transmitting substrate including a first surface lying on the light entrance side and a second surface opposed to the first surface,
wherein the first convex-lens array is disposed on the first-surface side of the light-transmitting substrate and the second convex-lens array is disposed on the second-surface side of the light-transmitting substrate.

8. The homogenizer according to claim 7, wherein at least one of the light-transmitting substrate, the first convex-lens array, and the second convex-lens array is made of a light-transmitting inorganic material.

9. The homogenizer according to claim 1, wherein at least one of the first convex-lens array and the second convex-lens array is made of a light-transmitting inorganic material having a refractive index, in a wavelength range of the incident light, of 1.6 to 2.1.

10. The homogenizer according to claim 1, wherein the first convex lenses and the second convex lenses have a maximum width $W_{max}$, along a direction perpendicular to the symmetry axis in the lens cross-section, within a range of 0.05 mm to 0.5 mm.

11. The homogenizer according to claim 1, wherein in a case where a diffused light having an uneven light-intensity distribution emitted by a laser light source enters the homogenizer, a light-intensity distribution of an emitted light from the homogenizer on a given irradiation plane is 85% or higher.

12. An illuminating optical system, comprising:
a laser light source configured to emit a divergent light having an uneven light-intensity distribution and the homogenizer of claim 1,
wherein the divergent light emitted by the laser light source enters the homogenizer, is emitted as more widely diffused divergent light from the homogenizer, and is expanded and projected on a given irradiation plane with an even light-intensity distribution.

13. The illuminating optical system according to claim 12, wherein the divergent light emitted by the laser light source is a divergent light having a light-intensity distribution approximated to a Gaussian distribution having a maximum diffusion angle α of 12° or less, and the divergent light emitted by the homogenizer is a divergent light having a maximum diffusion angle β of 12° or more, and having a light-intensity distribution on a given irradiation plane of 85% or higher.

14. The illuminating optical system according to claim 12, wherein the light-intensity distribution on the irradiation plane is 90% or higher.

15. An illuminator, comprising:
the illuminating optical system of claim 12.

16. The homogenizer according to claim 3, wherein the first convex lens includes a phase diffraction grating in the lens-surface center region.

17. The homogenizer according to claim 3, further comprising:
a light-transmitting substrate including a first surface lying on the light entrance side and a second surface opposed to the first surface,
wherein the first convex-lens array is disposed on the first-surface side of the light-transmitting substrate and the second convex-lens array is disposed on the second-surface side of the light-transmitting substrate.

18. The homogenizer according to claim 3, wherein at least one of the first convex-lens array and the second convex-lens array is made of a light-transmitting inorganic material having a refractive index, in a wavelength range of the incident light, of 1.6 to 2.1.

19. The homogenizer according to claim 3, wherein the first convex lenses and the second convex lenses have a maximum width $W_{max}$, along a direction perpendicular to the symmetry axis in the lens cross-section, within a range of 0.05 mm to 0.5 mm.

20. The homogenizer according to claim 3, wherein in a case where a diffused light having an uneven light-intensity distribution emitted by a laser light source enters the homogenizer, a light-intensity distribution of an emitted light from the homogenizer on a given irradiation plane is 85% or higher.

* * * * *